US012720624B2

(12) United States Patent
Sun

(10) Patent No.: US 12,720,624 B2
(45) Date of Patent: Aug. 25, 2026

(54) COMMUNICATION METHOD, COMMUNICATION SYSTEM, AND ELECTRONIC DEVICE

(71) Applicant: Honor Device Co., Ltd., Shenzhen (CN)

(72) Inventor: Xiaoyu Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 310 days.

(21) Appl. No.: 18/697,646

(22) PCT Filed: Apr. 21, 2023

(86) PCT No.: PCT/CN2023/089700
§ 371 (c)(1),
(2) Date: Apr. 1, 2024

(87) PCT Pub. No.: WO2023/226645
PCT Pub. Date: Nov. 30, 2023

(65) Prior Publication Data

US 2024/0414787 A1 Dec. 12, 2024

(30) Foreign Application Priority Data

May 25, 2022 (CN) ......................... 202210576424.7

(51) Int. Cl.
*H04W 76/14* (2018.01)
*H04W 52/02* (2009.01)
*H04W 88/06* (2009.01)

(52) U.S. Cl.
CPC ........ *H04W 76/14* (2018.02); *H04W 52/0258* (2013.01); *H04W 88/06* (2013.01)

(58) Field of Classification Search
CPC ... H04W 52/0235; H04W 4/90; H04W 52/02; H04W 52/0229; H04W 76/14; H04W 52/0258; H04W 88/06; Y02D 30/70
See application file for complete search history.

(56) References Cited

U.S. PATENT DOCUMENTS

2008/0227427 A1* 9/2008 Kadavallur .......... G08B 25/004 455/554.2
2016/0323818 A1 11/2016 Senarath et al.
(Continued)

FOREIGN PATENT DOCUMENTS

CN 101790145 A 7/2010
CN 101335680 B 6/2011
(Continued)

OTHER PUBLICATIONS

X. Liu et al., "PhoneJoule: An Energy Management System for Android-Based Smartphones," 2013 IEEE International Conference on Green Computing and Communications and IEEE Internet of Things and IEEE Cyber, Physical and Social Computing, Beijing, China, Aug. 2013, pp. 1996-2001.
(Continued)

*Primary Examiner* — Congvan Tran
(74) *Attorney, Agent, or Firm* — Slater Matsil, LLP

(57) ABSTRACT

A communication method, a communication system, and an electronic device are provided. In a communication process, the electronic device may control time ratios of the electronic device for transmitting a signal, intercepting a signal, and sleeping based on a working mode selected by a user, and establish communication connection with another electronic device in a different working mode by planning a working cycle of the electronic device.

14 Claims, 13 Drawing Sheets

(56) References Cited

U.S. PATENT DOCUMENTS

| | | | | |
|---|---|---|---|---|
| 2017/0153694 | A1 | 6/2017 | Baldwin et al. | |
| 2018/0000346 | A1* | 1/2018 | Cronin | A61B 5/00 |
| 2020/0280827 | A1* | 9/2020 | Fechtel | H04W 8/08 |
| 2020/0413398 | A1 | 12/2020 | Hwang | |
| 2022/0070971 | A1* | 3/2022 | Wang | H04W 48/08 |
| 2022/0108595 | A1* | 4/2022 | Jiang | G08B 25/016 |
| 2023/0262110 | A1* | 8/2023 | Yang | G06F 9/453<br>715/740 |

FOREIGN PATENT DOCUMENTS

| | | | |
|---|---|---|---|
| CN | 102802140 | A | 11/2012 |
| CN | 207321562 | U | 5/2018 |
| CN | 108419219 | A | 8/2018 |
| CN | 112181054 | A | 1/2021 |
| CN | 113507703 | A | 10/2021 |
| WO | 2016177192 | A1 | 11/2016 |
| WO | 2022062786 | A1 | 3/2022 |

OTHER PUBLICATIONS

Lin Xingqin et al: "An overview of 3GPP device-to-device proximity services", IEEE Communications Magazine, IEEE Service Center, Piscataway, US, vol. 52, No. 4, Apr. 1, 2014 (Apr. 1, 2014), pp. 40-48.

* cited by examiner

COMMUNICATION METHOD, COMMUNICATION SYSTEM, AND ELECTRONIC DEVICE

CROSS-REFERENCE TO RELATED APPLICATIONS

This application is a National Stage of International Application No. PCT/CN2023/089700, filed on Apr. 21, 2023, which claims priority to Chinese Patent Application No. 202210576424.7, filed on May 25, 2022. The disclosures of both of the aforementioned applications are hereby incorporated by reference in their entireties.

TECHNICAL FIELD

This application relates to the field of terminal technologies, and in particular, to a communication method, a communication system, and an electronic device.

BACKGROUND

Because of people's work and entertainment needs, people are often trapped in areas with complex terrain and no public network signal coverage, such as mountains and underground. At this time, help-seekers and rescuers can establish an inter-device communication link through mobile terminals to complete rescue communication.

However, most of the mobile terminals held by the help-seekers or the rescuers are terminals with small battery capacity, such as mobile phones and tablets, and search and rescue of the trapped people often needs to go through a long process. In this process, if the mobile terminals held by the help-seekers or the rescuers are shut down due to electric power exhaustion, the search and rescue process will be blocked or even failed.

Therefore, in the search and rescue process, how to make the mobile terminals held by the help-seekers or the rescuers work more permanently is an urgent problem to be solved in this field.

SUMMARY

This application is to provide a communication method, a communication system, and an electronic device. The electronic device may control time ratios of the electronic device for transmitting a signal, intercepting a signal, and sleeping based on a working mode selected by a user, and establish communication connection with another electronic device in a different working mode by planning a working cycle of the electronic device. This can effectively overcome a situation that a link cannot be successfully built between two electronic devices due to synchronization of periodic work while saving electric energy of the electronic devices, and improve a success rate of link building between the electronic device and another device.

The above and other objects will be achieved based on features in the independent claims. Further implementations are embodied in the dependent claims, the specification and the drawings.

According to a first aspect, this application provides a communication method. The method is applied to a first terminal. The method includes: receiving an operation instruction of a user to determine and start a help-seeking mode of the first terminal, where the help-seeking mode includes a low power consumption help-seeking mode and a strong help-seeking mode; and the first terminal establishes a first network link with a second terminal, where the second terminal is in a basic rescue mode or a strong rescue mode; in same working duration, power consumption of the first terminal working in the low power consumption help-seeking mode is less than power consumption of the first terminal working in the strong help-seeking mode; and power consumption of the second terminal working in the basic rescue mode is less than power consumption of the second terminal working in the strong rescue mode.

In the method, the first terminal may be referred to as a help-seeking terminal and the second terminal may be referred to as a rescue terminal. In addition, in the method, the first terminal may work in the low power consumption help-seeking mode or the strong help-seeking mode, and when the first terminal works in the low power consumption help-seeking mode, the first terminal may be referred to as a low power consumption help-seeking terminal; or when the first terminal works in the strong help-seeking mode, the first terminal may be referred to as a strong help-seeking terminal. Similarly, the second terminal may work in the basic rescue mode or the strong help-seeking mode, and when the second terminal works in the basic rescue mode, the second terminal may be referred to as a basic rescue terminal; or when the second terminal works in the strong rescue mode, the first terminal may be referred to as a strong rescue terminal.

When the first terminal attempts to establish a communication connection with the second terminal, the first terminal in the low power consumption help-seeking mode may perform working processes such as intercepting a signal and sleeping, and the first terminal in the strong help-seeking mode may perform working processes such as intercepting a signal, sending a signal, and sleeping. It can be understood that, compared to continuous receiving and sending of signals, the first terminal and the second terminal in the method adjust time ratios for transmitting a signal, intercepting a signal, and sleeping in a process of the link establishment (namely, establishing the communication connection). This can effectively reduce electric energy consumption of the two terminals in the process of the link establishment and prevent a link establishment failure due to electric power exhaustion of the two terminals before the link establishment. In addition, for the two working modes (namely, the low power consumption help-seeking mode and the strong help-seeking mode) of the help-seeking terminal and the two working modes (namely, the basic rescue mode and the strong rescue mode) of the rescue terminal, the biggest difference lies in ratios of duration in which the help-seeking terminal and the rescue terminal send signals in their entire working cycles. In the low power consumption help-seeking mode, the first terminal will not send a help-seeking signal outward, and in the basic rescue mode, the second terminal will not send a rescue signal outward (but may send a synchronization signal). In the same time, electric energy consumed by a terminal intercepting a signal is far less than electric energy consumed by the terminal sending a signal outward. Therefore, in an embodiment of this application, the power consumption of the first terminal working in the low power consumption help-seeking mode is less than the power consumption of the first terminal working in the strong help-seeking mode; and the power consumption of the second terminal working in the basic rescue mode is less than the power consumption of the second terminal working in the strong rescue mode. When electric power of the first terminal is low, a trapped person may use the low power consumption help-seeking mode for help-seeking. This reduces an electric power consumption rate of the first terminal to improve a success rate of search and rescue.

Furthermore, in the method, the first network link may be used to construct a communication network between the first terminal and the second terminal. The communication network can support direct communication between two nodes, namely, the first terminal and the second terminal, that is, when communicating, neither the first terminal nor the second terminal need to complete the communication process therebetween through a local area network like a cellular network or a wireless network, or a wide area network.

With reference to the first aspect, in a possible implementation, the first terminal alternately sends, when the first terminal is in the strong help-seeking mode in a cycle of first duration, a first signal and intercepts a second signal sent by the second terminal, where at least two groups of operations of alternately performing interception and sending by the first terminal are included in each cycle, there is second duration between the two groups of operations of alternately performing interception and sending by the first terminal, where the second duration is less than a sum of duration required for the first terminal to send the first signal and duration required for the first terminal to intercept the second signal, and the first signal and the second signal are used for establishing the first network link with the second terminal; or when the first terminal is in the low power consumption help-seeking mode, the first terminal intercepts whether the second signal sent by the second terminal exists in an environment, where duration of the interception performed by the first terminal is third duration; and if the first terminal intercepts no second signal, the first terminal intercepts again whether the second signal exists in the environment at an interval of fourth duration with an offset of fifth duration at the end of the interception, until the first terminal intercepts the second signal.

It can be understood that, compared to continuous receiving and sending of signals, the first terminal and the second terminal in the method adjust time ratios for transmitting a signal, intercepting a signal, and sleeping in a process of the link establishment (namely, establishing the communication connection). This can effectively reduce electric energy consumption of the two terminals in the process of the link establishment and prevent a link establishment failure due to electric power exhaustion of the two terminals before the link establishment. However, because during the process of the link establishment, the two terminals have a dormant period, and the first terminal and the second terminal may be in a state of synchronously intercepting signals or synchronously sending signals, for example, if during a process of the first terminal intercepting a signal (or sending a signal), the second terminal is also in a state of intercepting a signal (or sending a signal) or in a state of sleeping, the first terminal will not be able to successfully intercept the second signal sent by the second terminal, and the communication link between the two terminals will not be successfully established; or if a cycle of the first terminal intercepting the signal is the same as a cycle of the second terminal sending the first signal, the first terminal and the second terminal may not successfully establish the communication link in each subsequent cycle.

Therefore, in this implementation, when the first terminal is in the strong help-seeking mode, the first terminal may perform at least two groups of alternate interception and sending operations in each working cycle, and the two groups of alternate interception and sending operations have offset duration (namely, the second duration), and the offset duration is less than a sum of duration required for the first terminal to intercept the first signal and duration required for the first terminal to send the second signal. It can be understood that, when the second terminal works in the strong rescue mode, if in a cycle, a first time period in which the second terminal alternately intercepts and sends signals is the same as a first time period in which the first terminal alternately intercepts and sends signals (that is, in a process in which the first terminal sends the second signal, the second terminal also sends the first signal, and in a process in which the first terminal intercepts the first signal, the second terminal also intercepts the signal), due to the fact that the first terminal offsets a time period for intercepting and sending the signal in a second time period for alternately intercepting and sending the signals, while the first terminal does not perform such operations in a second time period for alternately intercepting and sending the signals, in the second time period in which the first terminal alternately intercepts and sends the signals, the second terminal is in a state of sending the first signal in a process in which the first terminal intercepts the first signal. If the second terminal is in a state of sending the second signal in a process in which the first terminal sends the second signal, the communication connection between the two terminals can be successfully established.

Similarly, in a case in which the first terminal is in the low power consumption help-seeking mode, when the first terminal fails to intercept the first signal sent by the second terminal, the first terminal intercepts again whether the first signal sent by the second terminal exists in the environment at an interval of third duration with an offset of fourth duration at the end of the interception, until the first signal sent by the second terminal is intercepted. The offset of the fourth duration may be that the first terminal enters a dormant state at the end of the interception, and then continues to sleep for the fourth duration after sleeping for the third duration. In this way, a moment when the first terminal intercepts a signal each time can be avoided from being staggered with a moment when the second terminal sends a signal each time, and the electric energy of the first terminal and the electric energy of the second terminal can be saved while it is ensured that the two terminals can successfully establish the link.

With reference to the first aspect, in a possible implementation, that the first terminal establishes a first network link with a second terminal includes: After intercepting the second signal sent by the second terminal in the strong rescue mode, the first terminal returns a response signal to the second terminal; and when the second terminal accesses a channel under an indication of the response signal, the first terminal establishes the first network link with the second terminal, where the second signal is a second request signal for requesting the establishment of the communication connection with the first terminal; or after intercepting the second signal sent by the second terminal, the first terminal sends an access request to the second terminal in a channel indicated by the second signal; and after the second terminal responds to the access request, the first terminal establishes the first network link with the second terminal, where the second signal is a synchronization signal sent by the second terminal; or after the first signal sent by the first terminal in the strong help-seeking mode is intercepted by the second terminal, the first terminal accesses a channel under an indication of a response signal returned by the second terminal, and the first terminal establishes the first network link with the second terminal, where the first signal is a first request signal that is sent by the first terminal and is used to request for the establishment of the communication connection with the second terminal.

In this implementation, the second terminal may be a synchronization node or a master node, and the second terminal may be a terminal in a basic rescue mode, which periodically sends the synchronization signal outward and intercepts the first signal. In addition, the second terminal may alternatively be a terminal in a strong rescue mode, which periodically sends the synchronization signal or the second request signal outward and intercepts the first signal. Therefore, in this implementation, the second signal may be the synchronization signal or the second request signal sent by the second terminal. In some embodiments of this application, the first request signal and the second request signal may also be referred to as emergency rescue link establishment request frames (where the second request signal and the first request signal sent by the first terminal are different in frame format, for details, refer to the subsequent relevant descriptions, and details will not be described here).

After the first terminal intercepts the second request signal sent by the second terminal, the first terminal may return the response signal and perform interception on all access channels and emergency rescue channels thereafter. The first terminal may calculate positions of the access channel and the rescue channel, and initiate random access on the access channel and the rescue channel to complete the link establishment. An open system authentication mode is adopted between the two terminals, includes two steps: open system access request and access response, and does not need authentication.

Alternatively, after the synchronization signal sent by the second terminal is received by the first terminal, the first terminal may send an access request in a random access channel indicated by the synchronization signal, and an open system authentication mode is adopted between the two terminals, includes two steps: open system access request and access response, and does not need authentication. After the second terminal responds to the access request, the first network link may be established between the first terminal and the second terminal.

Alternatively, after the first request signal sent by the first terminal is intercepted by the second terminal, the second terminal may return the response signal and perform interception on all access channels and emergency rescue channels thereafter. In some embodiments of this application, the response signal may also be referred to as an emergency rescue link establishment response frame. The second terminal may calculate positions of the access channel and the rescue channel, and initiate random access on the access channel and the rescue channel to complete the link establishment. An open system authentication mode is adopted between the two terminals, includes two steps: open system access request and access response, and does not need authentication.

With reference to the first aspect, in a possible implementation, that the first terminal sends, when the first terminal is in the strong help-seeking mode in a cycle of first duration, a first signal and intercepts a second signal sent by the second terminal includes: In a corresponding first time period in each cycle, the first terminal continuously alternately sends the first signal and intercepts the second signal for sixth duration; and if the first terminal fails to intercept the second signal in the first time period, and the second terminal fails to receive the first signal in the first time period, the first terminal enters a dormant state at the end of the first time period, and after the second duration, the first terminal continuously alternately sends the first signal and intercepts the second signal in a corresponding second time period of each cycle for seventh duration. That the first terminal intercepts again, when the first terminal is in the low power consumption help-seeking mode, whether the second signal exists in the environment at an interval of fourth duration with an offset of fifth duration at the end of the interception includes: The first terminal enters the dormant state at the end of the interception; after the fourth duration and the fifth duration, the first terminal wakes up from the dormant state and intercepts again whether the second signal exists in the environment, where duration of the first terminal performing the interception is the third duration.

In this implementation, when the first terminal is in the strong help-seeking mode, if the first terminal fails to intercept the first signal in the first time period and the second terminal fails to receive the second signal in the first time period, the first terminal will enter the dormant state at the end of each interception, and in the dormant state, the first terminal no longer intercepts and sends signals. The first terminal continuously alternately intercepts the first signal and sends the second signal again until eighth duration elapses and sleeping ends. In this way, a link establishment failure caused by overlapping of signal receiving and sending time periods of the two terminals can be avoided, and the first terminal can successfully establish the link with the second terminal as quickly as possible.

When the first terminal is in the low power consumption help-seeking mode, in a case in which the first terminal fails to intercept the first signal sent by the second terminal, the first terminal will enter a dormant state at the end of each interception for a sum of the fourth duration and the fifth duration, and in the dormant state, the first terminal will no longer intercept the signal. Until the end of sleeping, the first terminal continues intercepting a signal, and duration of continuous intercepting is also the third duration. That is, before the first terminal successfully establishes the link with the second terminal, time for each interception by the first terminal is the third duration. Thus, since the cycle of transmitting the first signal by the second terminal is unchanged, the first terminal can successfully establish the link with the second terminal as quickly as possible.

With reference to the first aspect, in a possible implementation, the sixth duration is equal to the seventh duration, and/or the eighth duration is twice the seventh duration. The eighth duration is a sum of duration required for the first terminal to send the first signal and intercept the second signal in the strong help-seeking mode.

In this implementation, duration of the first terminal in the strong help-seeking mode alternately intercepting the first signal and duration of the first terminal in the strong help-seeking mode sending the second signal in each working cycle (namely, the sixth duration and the seventh duration) are the same. In addition, an offset duration (namely, the second duration) between the two segments of duration may be half of a sum (namely, the eighth duration) of duration of intercepting the first signal once and duration of sending the second signal once. In this way, if the first terminal fails to intercept the first signal in the first time period and the second terminal fails to receive the second signal in the first time period, the first terminal can stagger a sending and intercepting time period of the first terminal with a sending and intercepting time period of the second terminal in the second time period as soon as possible through the offset operation, so as to ensure that the two terminals can successfully establish the link in the second time period as much as possible. This is beneficial to further shortening time required for the two terminals to complete the link establishment.

With reference to the first aspect, in a possible implementation, the third duration is equal to the fifth duration, and/or the third duration is equal to the eighth duration.

In this implementation, duration (namely, the third duration) for the first terminal in the low power consumption help-seeking mode to intercept a signal each time is the same as duration (namely, the fifth duration) of each offset by the first terminal in the low power consumption help-seeking mode. In addition, duration (namely, the eighth duration) for the first terminal to alternately intercept and send signals once each time may also be the same as the third duration. Thus, when the first terminal fails to intercept the first signal sent by the second terminal, the first terminal may shorten a time difference between a time period for the first terminal to perform interception and a time period for the second terminal to send the signal in a subsequent cycle by the offset operation as soon as possible until the link establishment with the second terminal is successful. In addition, if duration of the second terminal alternately intercepting and sending signals once each time (where the duration is also equal to the eighth duration) is the same as the third duration, the first terminal can certainly intercept the first signal sent by the second terminal as long as a time period for the first terminal to intercept the first signal is included a time period for the second terminal to alternately perform interception and sending operations. This is beneficial to further shortening the time required for the two terminals to complete the link establishment.

According to a second aspect, this application provides a communication method. The method is applied to a second terminal. The method includes: receiving an operation instruction of a user to determine and start a rescue mode of the second terminal, where the rescue mode includes a basic rescue mode and a strong help-seeking mode; and the second terminal establishes a first network link with a first terminal, where the first terminal is in a low power consumption help-seeking mode or a strong help-seeking mode; and under same working duration, power consumption of the second terminal working in the basic rescue mode is less than power consumption of the second terminal working in the strong rescue mode, and power consumption of the first terminal working in the low power consumption help-seeking mode is less than power consumption of the first terminal working in the strong help-seeking mode.

In the method, the second terminal may be referred to as a rescue terminal and the first terminal may be referred to as a help-seeking terminal. In addition, in the method, the second terminal may work in the basic rescue mode or the strong help-seeking mode, and when the second terminal works in the basic rescue mode, the second terminal may be referred to as a basic rescue terminal; or when the second terminal works in the strong rescue mode, the first terminal may be referred to as a strong rescue terminal. Similarly, the first terminal may work in the low power consumption help-seeking mode or the strong help-seeking mode, and when the first terminal works in the low power consumption help-seeking mode, the first terminal may be referred to as a low power consumption help-seeking terminal; or when the first terminal works in the strong help-seeking mode, the first terminal may be referred to as a strong help-seeking terminal.

When the second terminal attempts to establish a first network link with the first terminal, the second terminal in the basic help-seeking mode may perform working processes such as intercepting a signal and sleeping, and the second terminal in the strong rescue mode may perform working processes such as intercepting a signal, sending a signal, and sleeping. It can be understood that, compared to continuous receiving and sending of signals, the first terminal and the second terminal in the method adjust time ratios for transmitting a signal, intercepting a signal, and sleeping in a process of the link establishment (namely, establishing the communication connection). This can effectively reduce electric energy consumption of the two terminals in the process of the link establishment and prevent a link establishment failure due to electric power exhaustion of the two terminals before the link establishment. In addition, for the two working modes (namely, the basic rescue mode and the strong rescue mode) of the rescue terminal and the two working modes (namely, the low power consumption help-seeking mode and the strong help-seeking mode) of the help-seeking terminal, the biggest difference lies in ratios of duration in which the help-seeking terminal and the rescue terminal send signals in their entire working cycles. In the low power consumption help-seeking mode, the first terminal will not send a help-seeking signal outward, and in the basic rescue mode, the second terminal will not send a rescue signal outward (but may send a synchronization signal). Because electric energy consumed by a terminal intercepting a signal is far less than electric energy consumed by a terminal sending a signal outward in the same time, in an embodiment of this application, the power consumption of the second terminal working in the basic rescue mode is less than the power consumption of the second terminal working in the strong rescue mode. The power consumption of the first terminal working in the low power consumption help-seeking mode is less than the power consumption of the first terminal working in the strong help-seeking mode. When electric power of the second terminal is low, search and rescue personnel may use the basic rescue mode for help-seeking. This reduces an electric power consumption rate of the second terminal to improve a success rate of search and rescue.

Furthermore, in the method, the first network link may be used to construct a communication network between the first terminal and the second terminal. The communication network can support direct communication between two nodes, namely, the first terminal and the second terminal, that is, when communicating, neither the first terminal nor the second terminal need to complete the communication process therebetween through a local area network like a cellular network or a wireless network, or a wide area network.

With reference to the second aspect, in a possible implementation, when the second terminal is in the strong rescue mode, the second terminal alternately sends a second signal and intercepts a first signal in a cycle of first duration, where duration of the second terminal alternately sending the second signal and intercepting the first signal within each cycle is ninth duration; and the second signal includes a second request signal and a synchronization signal; if the second terminal fails to intercept the first signal and the second signal is not intercepted by the first terminal in a corresponding time period, the second terminal sleeps for tenth duration until the end of the current cycle, and alternately sends the second signal and intercepts the first signal again until the second terminal intercepts the first signal or the second signal is intercepted by the first terminal, where the second request signal is a signal that is sent by the second terminal and is used to request for the establishment of the communication connection with the first terminal; and the first signal is a first request signal that is sent by the first terminal and is used to request for the establishment of the communication connection with the second terminal; or when the second terminal is in the basic rescue mode, the second terminal intercepts the first signal in a cycle of the first duration, where each cycle includes at least one time period for the second terminal to intercept the first signal; and if the second terminal fails to intercept the first signal in the corresponding time period, the second terminal sleeps for the tenth duration until the end of the current cycle, and intercepts the first signal again until the second terminal intercepts the first signal.

It can be understood that, compared to continuous receiving and sending of signals, the first terminal and the second terminal in the method adjust time ratios for transmitting a signal, intercepting a signal, and sleeping in a process of the link establishment (namely, establishing the communication connection). This can effectively reduce electric energy consumption of the two terminals in the process of the link establishment and prevent a link establishment failure due to electric power exhaustion of the two terminals before the link establishment. However, because during the process of the link establishment, the two terminals have a dormant period, and the first terminal and the second terminal may be in a state of synchronously intercepting signals or synchronously sending signals, for example, if during a process of the first terminal intercepting a signal (or sending a signal), the second terminal is also in a state of intercepting a signal (or sending a signal) or in a state of sleeping, the first terminal will not be able to successfully intercept the second signal sent by the second terminal, and the communication link between the two terminals will not be successfully established; or if a cycle of the first terminal intercepting the signal is the same as a cycle of the second terminal sending the first signal, the first terminal and the second terminal may not successfully establish the communication link in each subsequent cycle.

Therefore, With reference to the foregoing descriptions, it can be seen that in order to overcome the above defects, when the first terminal is in the strong help-seeking mode, the first terminal may perform at least two groups of alternate interception and sending operations in each working cycle, and the two groups of alternate interception and sending operations have offset duration (namely, the second duration), and the offset duration is less than a sum of duration required for the first terminal to intercept the first signal and duration required for the first terminal to send the second signal. Similarly, in a case in which the first terminal is in the low power consumption help-seeking mode, when the first terminal fails to intercept the first signal sent by the second terminal, the first terminal intercepts again whether the first signal sent by the second terminal exists in the environment at an interval of third duration with an offset of fourth duration at the end of the interception, until the first signal sent by the second terminal is intercepted. The offset of the fourth duration may be that the first terminal enters a dormant state at the end of the interception, and then continues to sleep for the fourth duration after sleeping for the third duration. In this way, a moment when the first terminal intercepts a signal each time can be avoided from being staggered with a moment when the second terminal sends a signal each time, and the electric energy of the first terminal and the electric energy of the second terminal can be saved while it is ensured that the two terminals can successfully establish the link.

Therefore, in order to match a work flow of the first terminal, when the second terminal is in the strong rescue mode, the second terminal alternately sends the second signal and intercepts the first signal in the cycle of the first duration, and duration is ninth duration. If the second terminal fails to intercept the first signal and the second signal is not intercepted by the first terminal in the corresponding time period, the second terminal sleeps for the tenth duration until the end of the current cycle, and alternately sends the second signal and intercepts the first signal again until the second terminal intercepts the first signal or the second signal is intercepted by the first terminal. In this way, the second terminal in the strong rescue mode can fully cooperate with a working time sequence of the first terminal (whether it is in the strong help-seeking mode or the low power consumption help-seeking mode), and successfully establish the link with the first terminal.

Similarly, when the second terminal is in the basic rescue mode, the second terminal intercepts the first signal in the cycle of the first duration. In addition, each cycle includes at least one time period for the second terminal to intercept the first signal; and if the second terminal fails to intercept the first signal in the corresponding time period, the second terminal sleeps for the tenth duration until the end of the current cycle, and intercepts the first signal again until the second terminal intercepts the first signal. In this way, the second terminal in the strong rescue mode can fully cooperate with a working time sequence of the first terminal (whether it is in the strong help-seeking mode or the low power consumption help-seeking mode), and successfully establish the link with the first terminal.

With reference to the second aspect, in a possible implementation, the second terminal is an on-line device, when the second terminal is in the basic rescue mode, the second terminal also sends the synchronization signal in the cycle of the first duration, and each cycle includes at least one time period for the second terminal to send the synchronization signal.

In this implementation, the second terminal is a synchronization node or a master node, and the second terminal may periodically sends the synchronization signal or the request signal outward. Therefore, in this implementation, the second signal is the synchronization signal or the second request signal that are sent by the second terminal (where the request signal and the first request signal sent by the first terminal are different in frame format, for details, refer to the subsequent relevant descriptions, and details will not be described here). In this implementation, when the second terminal is a terminal in the basic rescue mode, the second terminal may still send the synchronization signal to the first terminal. After the first terminal receives the synchronization signal sent by the second terminal, the first terminal may send an access request in a random access channel indicated by the synchronization signal. The two terminals adopt an open system authentication mode, and the open system authentication mode includes two steps: open system access request and access response, and does not need authentication. After the second terminal responds to the access request, the first network link may be established between the first terminal and the second terminal.

With reference to the second aspect, in a possible implementation, that the second terminal establishes a first network link with a first terminal includes: after intercepting the first request signal sent by the first terminal in the strong help-seeking mode, the second terminal returns a response signal to the first terminal; and when the first terminal accesses a channel under an indication of the response signal, the second terminal establishes the first network link with the first terminal; or after intercepting the synchronization signal sent by the second terminal, the second terminal sends an access request to the second terminal in a channel indicated by the synchronization signal; and after the second terminal responds to the access request, the second terminal establishes the first network link with the first terminal; or after the second request signal sent by the second terminal in the strong rescue mode is intercepted by the first terminal, the second terminal accesses a channel under an indication of a response signal returned by the first terminal, and the second terminal establishes the first network link with the first terminal.

With reference to the second aspect, in a possible implementation, the tenth duration is greater than the ninth duration.

The tenth duration is duration in which the second terminal in the strong rescue mode sleeps in each cycle, and the ninth duration is duration in which the second terminal alternately sends the second signal and intercepts the first signal in each cycle. In this implementation, the tenth duration is greater than the ninth duration, that is, working time of the second terminal in the strong rescue mode is less than the dormant time in each cycle. This is beneficial to further saving electric energy and improving a success rate of the search and rescue process.

In a third aspect, this application provides a communication system. The communication system includes a first terminal and a second terminal. The first terminal and the second terminal establish a first network link when a first trigger condition is met. The first trigger condition is one of the following conditions: the first terminal is in a strong help-seeking mode and the second terminal is in a strong rescue mode; the first terminal is in a strong help-seeking mode and the second terminal is in a basic rescue mode; the first terminal is in a low power consumption help-seeking mode and the second terminal is in a strong help-seeking mode; the first terminal is in a low power consumption help-seeking mode and the second terminal is in a basic help-seeking mode; or under same working duration, power consumption of the second terminal working in the basic rescue mode is less than power consumption of the second terminal working in the strong rescue mode, and power consumption of the first terminal working in the low power consumption help-seeking mode is less than power consumption of the first terminal working in the strong help-seeking mode.

With reference to the third aspect, in a possible implementation, the first terminal alternately sends, when the first terminal is in the strong help-seeking mode in a cycle of first duration, a first signal and intercepts a second signal sent by the second terminal, where at least two groups of operations of alternately performing interception and sending by the first terminal are included in each cycle, there is second duration between the two groups of operations of alternately performing interception and sending by the first terminal, where the second duration is less than a sum of duration required for the first terminal to send the first signal and duration required for the first terminal to intercept the second signal, and the first signal and the second signal are used for establishing the network link with the second terminal; or when the first terminal is in the low power consumption help-seeking mode, the first terminal intercepts whether the second signal sent by the second terminal exists in an environment, where duration of the interception performed by the first terminal is third duration; and if the first terminal intercepts no second signal, the first terminal intercepts again whether the second signal exists in the environment at an interval of fourth duration with an offset of fifth duration at the end of the interception, until the first terminal intercepts the second signal; and when the second terminal is in the strong rescue mode, the second terminal alternately sends the second signal and intercepts the first signal in the cycle of the first duration, where duration of the second terminal alternately sending the second signal and intercepting the first signal within each cycle is ninth duration; and the second signal includes a second request signal and a synchronization signal; if the second terminal fails to intercept the first signal and the second signal is not intercepted by the first terminal in a corresponding time period, the second terminal sleeps for tenth duration until the end of the current cycle, and alternately sends the second signal and intercepts the first signal again until the second terminal intercepts the first signal or the second signal is intercepted by the first terminal, where the second request signal is a signal that is sent by the second terminal and is used to request for the establishment of the communication connection with the first terminal; and the first signal is a first request signal that is sent by the first terminal and is used to request for the establishment of the communication connection with the second terminal; or when the second terminal is in the basic rescue mode, the second terminal intercepts the first signal in a cycle of the first duration, where each cycle includes at least one time period for the second terminal to intercept the first signal; and if the second terminal fails to intercept the first signal in the corresponding time period, the second terminal sleeps for the tenth duration until the end of the current cycle, and intercepts the first signal again until the second terminal intercepts the first signal.

With reference to the third aspect, in a possible implementation, that the first terminal establishes the first network link with the second terminal includes: The second terminal in the strong rescue mode sends the second signal, and the first terminal in the low power consumption help-seeking mode or the strong help-seeking modeing mode returns a first response signal to the second terminal after intercepting the second signal; and after the second terminal accesses a channel under an indication of the first response signal, the first terminal establishes the first network link with the second terminal, where the second signal is a second request signal for requesting the establishment of the first network link with the first terminal; or the second terminal sends the second signal, and after intercepting the second signal, the first terminal in the low power consumption help-seeking mode or the strong help-seeking modeing mode sends an access request to the second terminal in a channel indicated by the second signal; and after the second terminal responds to the access request, the second terminal establishes the first network link; or the second signal is a synchronization signal sent by the second terminal; or the first terminal in the strong help-seeking mode sends the first signal, the second terminal in the low power consumption rescue mode or the strong help-seeking mode returns a second response signal to the first terminal after intercepting the first signal, the first terminal accesses a channel under an indication of the second response signal, and the first terminal establishes the first network link with the second terminal. The first signal is a first request signal that is sent by the first terminal and is used to request for the establishment of the first network link with the second terminal.

According to a fourth aspect, this application provides a working mode selection method, applied to an electronic device, where the method includes: displaying a first user interface in response to a user instruction, where the first user interface includes a first control, a second control, a third control, and a fourth control; the electronic device enters a strong help-seeking mode in response to a first operation instruction of a user to the first control; the electronic device enters a low power consumption help-seeking mode in response to a second operation instruction of a user to the second control; the electronic device enters a strong rescue mode in response to a third operation instruction of a user to the third control; or the electronic device enters a basic rescue mode in response to a fourth operation instruction of a user to the fourth control, where under same working duration, power consumption of the electronic device working in the basic rescue mode is less than power consumption of the electronic device working in the strong rescue mode, and power consumption of the electronic device working in the low power consumption help-seeking mode is less than power consumption of the electronic device working in the strong help-seeking mode.

With reference to the fourth aspect, in a possible implementation, the first user interface further includes a fifth control, and the method further includes: The electronic device automatically enters the low power consumption help-seeking mode or the strong help-seeking mode based on current electric power of the electronic device and/or current vital sign information of the user in response to a fifth operation instruction of the user to the fifth control.

With reference to the fourth aspect, in a possible implementation, the first user interface further includes a sixth control, and the method further includes: The electronic device displays a second user interface in response to a sixth operation instruction of the user to the sixth control, where the second user interface includes at least one text box for displaying personal information of the user and a seventh control; and the electronic device stores, in response to a seventh operation instruction to the seventh control, the personal information of the user displayed in the at least one text box.

According to a fifth aspect, this application provides an electronic device, where the electronic device includes: one or more processors, a memory, and a display, where the memory is coupled to the one or more processors, the memory is configured to store computer program code, the computer program code includes computer instructions, and the one or more processors invoke the computer instructions to enable the electronic device to perform the method according to any one of the first aspect or the second aspect.

According to a sixth aspect, this application provides a chip system. The chip system is applied to an electronic device. The chip system includes one or more processors, and the processors are configured to invoke computer instructions to enable the electronic device to perform the method according to any one of the first aspect or the second aspect.

According to a seventh aspect, this application provides a computer program product including instructions, and when the computer program product runs on an electronic device, the electronic device is enabled to perform the method according to any one of the first aspect or the second aspect.

According to an eighth aspect, this application provides a computer-readable storage medium including instructions, and when the instructions are run on an electronic device, the electronic device is enabled to perform the method according to any one of the first aspect or the second aspect.

For beneficial effect of technical solutions provided by the third aspect to the eighth aspect in this application, refer to beneficial effect of technical solutions provided by the first aspect or the second aspect. Details are not described herein again.

DETAILED DESCRIPTION OF THE EMBODIMENTS

Figure 1:
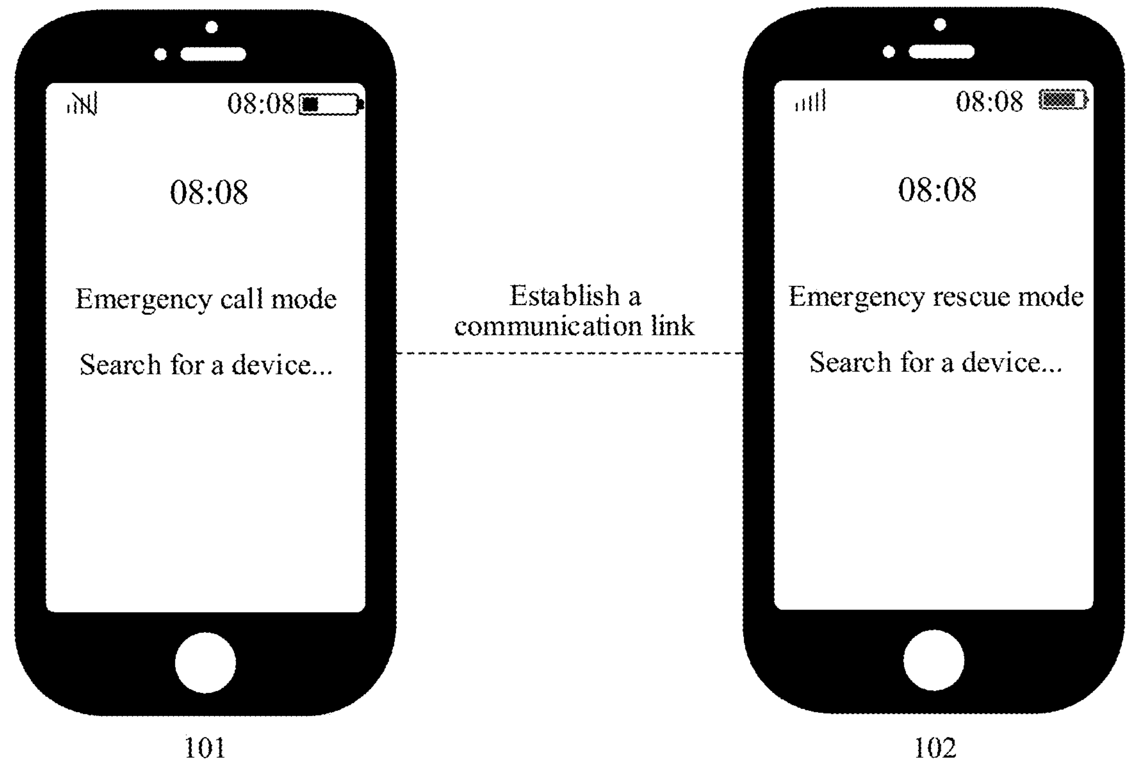
FIG. 1 is a schematic diagram of a communication system according to an embodiment of this application.

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items.

Because embodiments of this application relate to a communication method, an electronic device, and a communication system, in order to facilitate understanding, the following first describes related terms involved in embodiments of this application.

(1) Help-Seeking Terminal and Rescue Terminal

In a search and rescue process, even if there is no public network coverage, a help-seeking party or a search and rescue party may still send a signal to the other party through a terminal device carried by the help-seeking party or the search and rescue party to establish a communication connection. In this application, a terminal held by the help-seeking party (namely, a trapped party) is referred to as a help-seeking terminal, and a terminal held by the search and rescue party is referred to as a rescue terminal.

(2) Active Help-Seeking, Active Rescue, and Passive Interception

In this application, a help-seeking mode of a help-seeking terminal in a search and rescue process can be divided into two types, namely, active help-seeking or passive interception (passive help-seeking). A rescue mode of a rescue terminal in the search and rescue process may also be divided into two ways, namely active rescue or passive interception (passive rescue).

In an active help-seeking working mode, the help-seeking terminal may periodically send a help-seeking signal and periodically intercept whether there is a rescue signal or a synchronization signal sent by the rescue terminal around, while in a passive interception (passive rescue) working mode, the help-seeking terminal only periodically intercepts whether the rescue signal or the synchronization signal sent by the rescue terminal exists around. Similarly, in an active rescue working mode, the rescue terminal periodically sends a rescue signal and periodically intercepts whether a help-seeking signal sent by the help-seeking terminal exists around, while in a passive interception (passive rescue) working mode, the rescue terminal only periodically intercepts whether the help-seeking signal sent by the help-seeking terminal exists around. It should be noted that when the rescue terminal is a master node or a synchronization node, in the search and rescue process, the rescue terminal may further send a synchronization frame (also referred to as a synchronization signal) outward. The synchronization frame may be received by the help-seeking terminal and a corresponding channel may be accessed based on the synchronization frame, to complete a communication connection with the rescue terminal. In this application, establishing the communication connection can be referred to as "link establishment". A process of establishing the communication connection can be referred to as a "link establishment process".

(3) Emergency Rescue Link Establishment Request Frame and Emergency Rescue Link Establishment Response Frame The emergency rescue link establishment request frame is a signal that a terminal actively requests another terminal to establish a communication connection with the terminal, and correspondingly, the emergency rescue link establishment response frame is a signal that the terminal sends to the other terminal to agree the other terminal to establish the communication connection with the terminal in response to the received emergency rescue link establishment request frame sent by the other terminal.

In a search and rescue process, a help-seeking signal sent by a help-seeking terminal and a rescue signal sent by a rescue terminal can be referred to as emergency rescue link establishment request frames. However, there is a difference in frame format between an emergency rescue link establishment request frame sent by the help-seeking terminal and an emergency rescue link establishment request frame sent by the rescue terminal. The difference enable a terminal to identify whether a received emergency rescue link establishment request frame is sent by the rescue terminal or the help-seeking terminal. This prevents a terminal which is also a rescue terminal from redundantly processing an emergency rescue link establishment request frame sent by another rescue terminal, and also prevents a terminal which is also a help-seeking terminal from redundantly processing an emergency rescue link establishment request frame sent by another help-seeking terminal. The difference in frame format between the emergency rescue link establishment request frame sent by the help-seeking terminal and the emergency rescue link establishment request frame sent by the rescue terminal will be explained in detail later. Details are not described here.

Similarly, in the search and rescue process, a response signal sent by the help-seeking terminal to the rescue terminal after receiving a link establishment request frame of the rescue terminal and a response signal sent by the rescue terminal to the help-seeking terminal after receiving a link establishment request frame of the help-seeking terminal can be referred to as emergency rescue link establishment response frames.

(4) Synchronization Node and Synchronization Frame

The synchronization node refers to a node responsible for receiving and sending a synchronization frame in a synchronization network. A synchronization mechanism allows all devices in the network to meet periodically at agreed time and in an agreed channel, and complete functions such as clock correction, peripheral network environment perception, device discovery, and node election.

The synchronization frame is a kind of synchronization signal sent out periodically by a master node and the synchronization node. The synchronization frame includes a precise timestamp and node information of a sending end node, and based on the precise timestamp and the node information, a device receiving the synchronization frame may calculate a time-frequency position of the sending end node in each working channel and establish a connection with the sending end node at the corresponding time-frequency position. Therefore, two devices may establish a communication connection with the support of one of the devices sending a synchronization frame.

In an area without public network signal coverage, when a user encounters danger, the help-seeker and a rescuer may establish an inter-device communication link through mobile terminals to complete rescue communication. Most of existing emergency rescue communication solutions rely on dedicated outdoor communication terminal devices such as walkie-talkies. This kind of device has long transmission distance and large battery power, so optimization on terminal power consumption is less. However, in an actual outdoor help-seeking scenario, a rescuer and even a rescuer does not carry a dedicated outdoor communication terminal device with them, so it is necessary to establish an inter-device emergency rescue communication link through mobile terminals to complete rescue communication.

As shown in FIG. 1, a help-seeking terminal 101 is a terminal held by a help-seeker and a rescue terminal 102 is a terminal held by a rescuer. As can be seen from a status bar in a display of the help-seeking terminal 101, if the help-seeking terminal 101 is not successfully connected to a public network at present, the help-seeking terminal 101 cannot contact the rescue terminal 102 by using a short message or making a phone call. Therefore, the help-seeking terminal 101 needs to establish an inter-device emergency rescue communication link to complete rescue communication with the rescue terminal 102. In a conventional link establishment process, the help-seeking terminal 101 and the rescue terminal 102 need to continuously send and receive signals. For example, the help-seeking terminal 101 needs to send a help-seeking signal all the time, while the rescue terminal 102 needs to intercept a signal in an environment all the time until a distance between the help-seeking terminal 101 and the rescue terminal 102 is short to a degree, so that the help-seeking signal sent by the help-seeking terminal 101 may be successfully intercepted by the rescue terminal 102, and an emergency rescue communication link can be established between two terminal devices to complete the rescue communication.

However, in a rescue process, the help-seeker is generally unable to engage in large-scale activities and can only rely on the rescuer to conduct extensive searches to advance the rescue process. Therefore, a search and rescue process often takes a long time. However, most of mobile terminals held by the help-seeker or rescuer are terminals with a small battery capacity, such as mobile phones and tablets. In this process, if a mobile terminal held by the help-seeker or the rescuer is always in a state of sending and receiving signals, the help-seeking terminal and the rescue terminal are likely to be shut down due to electric power exhaustion before a link is successfully established, and the search and rescue process will be blocked or even failed, and life safety of the help-seeker will be seriously threatened. Therefore, important optimization objectives of mobile terminal emergency rescue schemes are to reduce power consumption of the mobile terminals establishing an inter-device emergency rescue communication link and provide an optimal trade-off method between the power consumption and waiting time for the link establishment.

Due to trade-off between the terminal power consumption and search and rescue efficiency, it is necessary to design a working mode, a link establishment process and a function interface for emergency rescue communication to meet entire scenario requirements of help-seekers and rescuers in scenarios with different purposes and different electric power. Based on the above scenarios and requirements, the invention discloses a communication method, an electronic device, and a communication system. The electronic device and the communication system may be used to realize the communication method. The method realizes switching between power consumption priority and efficiency priority by controlling time ratios of transmission, interception and sleep of the electronic device in a search and rescue process. In addition, when the method is implemented, terminals held by a help-seeker and a rescuer may select two rescue modes of high power consumption and low power consumption, and a user may flexibly select a help-seeking mode based on a terminal electric power consumption of the user. This provides greater guarantee for a success rate of a rescue operation and life safety of trapped people.

An electronic device provided in an embodiment of this application is described first.

The electronic device may be a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a dedicated camera (for example, a digital single lens reflex or a card camera), or the like. A specific type of the electronic device is not limited in this application.

Figure 2:
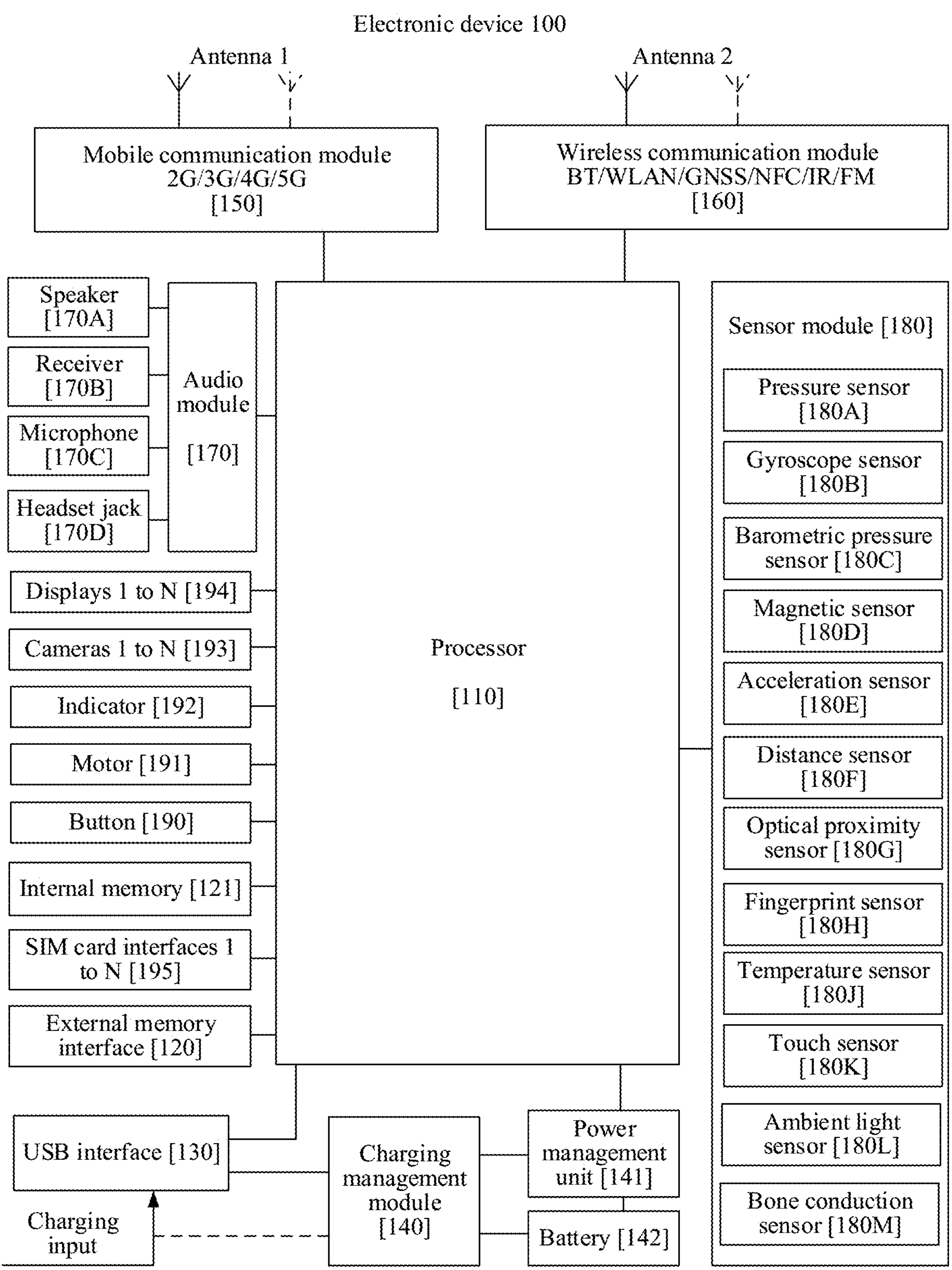
FIG. 2 is a schematic diagram of a structure of an electronic device 100 according to an embodiment of this application.

FIG. 2 show an example structure of the electronic device 100.

As shown in FIG. 2, the electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a display 194, a subscriber identification module (subscriber identification module, SIM) card interface 195, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

In some embodiments, the processor 110 like the controller or the GPU, may be used to automatically select a specific help-seeking mode based on the current electric power value of the electronic device 100 after the user turns on "one-tap help-seeking".

In some other embodiments, the processor 110 like the controller or the GPU may alternatively be used to switch a working mode of the electronic device 100 to a power saving mode when the electronic device 100 is in a help-seeking mode. In the power saving mode, screen brightness of the electronic device 100 is low, and in some embodiments, Bluetooth and Wi-Fi and applications with high electric power consumption when running in the background of the electronic device 100 will be turned off in the power saving mode.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache memory. The memory may store instructions or data recently used or cyclically used by the processor 110. If the processor 110 needs to use the instructions or the data again, the processor may directly invoke the instructions or the data from the memory, repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/ transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of I2C buses. The processor 110 may be coupled to the touch sensor 180K, a charger, a flash, a camera 193, and the like by using different I2C bus interfaces respectively. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of I2S buses. The processor 110 may be coupled to the audio module 170 through the I2S bus to implement communication between the processor 110 and the audio module 170. In some embodiments, the audio module 170 may transfer an audio signal to the wireless communication module 160 through the I2S interface, to perform a function of answering a call through a Bluetooth headset.

The PCM interface may also be configured to perform audio communication, to sample, quantize, and encode an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to perform the function of answering a call through the Bluetooth headset. Both the I2S interface and the PCM interface may be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using the UART interface, to perform a function of playing music through the Bluetooth headset.

The MIPI interface may be configured to connect the processor 110 to a peripheral device like the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may also be configured as an I2C interface, an I2S interface, a UART interface, a MIPI interface, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the electronic device 100, or may be used for data transmission between the electronic device 100 and the peripheral device, and may also be configured to connect to a headset to play audio through the headset. The interface may alternatively be configured to be connected to another electronic device like an AR device.

It may be understood that a schematic interface connection relationship between the modules in embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger by using the USB interface 130. In some embodiments of wireless charging, the charging management module 140 may receive a wireless charging input by using a wireless charging coil of the electronic device 100. While the charging management module 140 charges the battery 142, the power management module 141 may also supply power to the electronic device.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may also be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation.

The wireless communication module 160 may provide a solution to wireless communication, for example, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology, applied to the electronic device 100. The wireless communication module 160 may be one or more components into which at least one communication processing module is integrated. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 of the electronic device 100 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation systems, SBASs).

In some embodiments when the electronic device 100 is a synchronization node or a master node, the electronic device 100 may periodically send a synchronization frame outward through the mobile communication module 150 or the wireless communication module 160. The synchronization frame can also be referred to as a synchronization signal to provide a same time reference signal to a device that needs to process information synchronously, for example, all TV broadcasts and mobile phone communication. Another electronic device may establish a communication connection with the electronic device with the support of the electronic device 100 sending the synchronization frame.

The electronic device 100 implements a display function by using the GPU, the display 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, quantum dot light emitting diodes (quantum dot light emitting diodes, QLEDs), and the like. In some embodiments, the electronic device 100 may include 1 or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and the electrical signal is converted into an image visible to a naked eye. The ISP may also optimize algorithms of noise point, brightness, and skin tone of an image. The ISP may also optimize parameters such as exposure and color temperature of a photographed scene. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format of RGB, YUV, or the like.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor that processes input information rapidly by referring to a structure of a biological neural network, for example, by referring to a transfer mode between human brain neurons, and can further perform self-learning continuously. The NPU may be used to implement an application like intelligent cognition of the electronic device 100, for example, image recognition, facial recognition, voice recognition, and text understanding. The NPU may further be used to implement the decision model provided in embodiments of this application.

The external memory interface 120 may be configured to be connected to an external storage card like a micro SD card, to expand a storage capability of the electronic device 100. The external storage card communicates with the processor 110 by using the external memory interface 120, to implement a data storage function, for example, store files such as music and a video into the external storage card.

The internal memory 121 may be configured to store computer executable program code, where the executable program code includes instructions. The processor 110 runs the instructions stored in the internal memory 121, to implement various functional applications and data processing of the electronic device 100. The internal memory 121 may include a program storage area and a data storage area. The program storage area may store an operating system, an application required by at least one function (for example, a sound playback function and an image display function), and the like. The data storage region may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS).

The electronic device 100 may implement an audio function like music playing or recording by using the audio module 170, the speaker 170A, the receiver 170B, the microphone 170C, the headset jack 170D, the application processor, and the like The audio module 170 is configured to convert digital audio information into an analog audio signal output, and is also configured to convert an analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. The electronic device 100 can be used to listen to music, sound in videos, or hands-free calls through the speaker 170A. In embodiments of this application, a quantity of speakers 170A may be one or two or more.

The receiver 170B, also referred to as "earphone", is configured to convert an electrical audio signal into a sound signal. When the electronic device 100 is configured to answer a call or receive voice information, the receiver 170B may be put close to a human ear to receive a voice.

The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. At least one microphone 170C may be disposed in the electronic device 100. In some other embodiments, two microphones 170C may be disposed in the electronic device 100, to acquire a sound signal and implement a noise reduction function. In some other embodiments, three, four, or more microphones 170C may be alternatively disposed in the electronic device 100, to acquire a sound signal, implement noise reduction, recognize a sound source, implement a directional recording function, and the like.

The headset jack 170D is configured to be connected to a wired headset. The headset jack 170D may be a USB interface 130, or may be a 3.5 mm open mobile terminal platform (open mobile terminal platform, OMTP) standard interface or cellular telecommunication industry association of the USA (cellular telecommunication industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having conductive materials. In a case that a force is applied onto the pressure sensor 180A, a capacitance between electrodes changes. The electronic device 100 determines pressure strength based on a change in the capacitance. When a touch operation is performed on the display 194, the electronic device 100 detects strength of the touch operation by using the pressure sensor 180A. The electronic device 100 may also calculate a touch position based on a detection signal of the pressure sensor 180A.

The gyroscope sensor 180B may be configured to determine a motion posture of the electronic device 100. In some embodiments, an angular velocity of the electronic device 100 around three axes (namely, x, y, and z axes) may be determined by using the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, thereby implementing image stabilization. The gyroscope sensor 180B may also be used in navigation and a motion sensing game scenario.

The barometric pressure sensor 180C is configured to measure a barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip leather cover by using the magnetic sensor 180D. In some embodiments, when the electronic device 100 is a flip phone, the electronic device 100 may detect opening and closing of a flip cover based on the magnetic sensor 180D. Further, features such as automatic unlocking of the flip cover are set based on the detected opening and closing states of the leather cover or opening and closing states of the flip cover.

The acceleration sensor 180E may detect an acceleration value of the electronic device 100 in each direction (generally three axes). When the electronic device 100 is stationary, a magnitude and a direction of a gravity may be detected. The acceleration sensor may be further configured to recognize a posture of the electronic device, and is applied to applications such as switching between landscape and portrait modes and a pedometer.

The distance sensor 180F is configured to measure a distance. The electronic device 100 may measure a distance by using infrared light or laser. In some embodiments, in a photographing scenario, the electronic device 100 may measure a distance by using the distance sensor 180F, to implement quick focusing.

The optical proximity sensor 180G may include, for example, a light-emitting diode (LED) and a light detector, for example, a photodiode. The light-emitting diode may be an infrared light-emitting diode. The electronic device 100 emits infrared light by using the light emitting diode. The electronic device 100 detects reflected infrared light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, so as to implement automatic screen-off to save power. The optical proximity sensor 180G may be further configured to automatically unlock and lock the screen in a leather cover mode and a pocket mode.

The ambient light sensor 180L is configured to perceive ambient light brightness. The electronic device 100 may adaptively adjust a luminance of the display 194 based on the perceived ambient light brightness. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to acquire a fingerprint. The electronic device 100 may implement fingerprint unlock, application lock accessing, fingerprint photographing, fingerprint-based call answering, and the like by using a feature of the acquired fingerprint.

The temperature sensor 180J is configured to detect a temperature. In some embodiments, the electronic device 100 executes a temperature processing policy by using a temperature detected by the temperature sensor 180J. For example, when a temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142 to prevent an abnormal shutdown caused by a low temperature.

The touch sensor 180K is also referred to as a “touch panel”. The touch sensor 180K may be disposed on the display 194. The touch sensor 180K and the display 194 form a touchscreen, which is also referred to as a “touch screen”. The touch sensor 180K is configured to detect a touch operation on or near the touch sensor 180K. The touch sensor may transfer the detected touch operation to the application processor to determine a type of the touch event. The touch sensor may provide a visual output related to the touch operation by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a vocal-cord part of a human body. The bone conduction sensor 180M may also come into contact with a human pulse to receive a blood pressure beating signal. In some embodiments, the bone conduction sensor 180M may also be disposed in the headset, to combine into a bone conduction headset. The audio module 170 may obtain a voice signal through parsing based on the vibration signal of the vibration bone of the vocal-cord part that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or a touch-type button. The electronic device 100 may receive a button input, and generate a button signal input related to user setting and function control of the electronic device 100.

The motor 191 may generate a vibration prompt. The motor 191 may be used for an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and an electric power change, or may be configured to indicate a message, a missed call, a notification, and the like.

The SIM card interface 195 is configured to connect a SIM card. The SIM card may be inserted into the SIM card interface 195 or plugged from the SIM card interface 195, to come into contact with or be separated from the electronic device 100. The electronic device 100 may support one or more SIM card interfaces. The SIM card interface 195 can support a nano SIM card, a micro SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may also be compatible with an external storage card. The electronic device 100 interacts with a network by using a SIM card, to implement functions such as a call and data communication. In some embodiments, the electronic device 100 uses an eSIM, namely, an embedded SIM card. The eSIM card may be embedded in the electronic device 100 and cannot be separated from the electronic device 100.

The electronic device 100 may implement a photographing function by using the ISP, the camera 193, the video codec, the GPU, the display 194, the application processor, and the like.

The ISP is configured to process data fed back by the camera 193. For example, during photographing, the shutter is enabled, light is transferred to the camera photosensitive element by using the lens, an optical signal is converted into an electrical signal, and the camera photosensitive element transfers the electrical signal to the ISP for processing, to convert the electrical signal into an image visible to a naked eye. The ISP may also optimize algorithms of noise point, brightness, and skin tone of an image. The ISP may also optimize parameters such as exposure and color temperature of a photographed scene. Not limited to being integrated into the processor 110, the ISP may alternatively be disposed in the camera 193.

The video codec is configured to compress or decompress a digital image. The electronic device 100 may support one or more image codecs. In this way, the electronic device 100 may play or record images or videos in a plurality of encoding formats.

The electronic device 100 may implement a display function by using the GPU, the display 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute program instructions to generate or change display information.

The display 194 is configured to display an image, a video, and the like. The display 194 includes a display panel. The display panel may adopt a liquid crystal display (liquid crystal display, LCD), an organic light-emitting diode (organic light-emitting diode, OLED), an active matrix organic light emitting diode (active-matrix organic light emitting diode, AMOLED), a flexible light-emitting diode (flexible light-emitting diode, FLED), a mini LED, a micro LED, a micro OLED, quantum dot light emitting diodes (quantum dot light emitting diodes, QLEDs), and the like. In some embodiment, the electronic device 100 may include one or more displays 194.

The electronic device 100 may be a help-seeking terminal or a rescue terminal.

In some embodiments, when the electronic device 100 is the help-seeking terminal, a help-seeking mode of the electronic device 100 may be divided into a strong help-seeking mode and a low power consumption help-seeking mode. In the strong help-seeking mode, the electronic device 100 periodically sends an emergency rescue link establishment request frame outward and periodically intercepts whether an emergency rescue link establishment request frame sent by another device (the rescue terminal) exists in an environment. In the low power consumption help-seeking mode, the electronic device 100 periodically intercepts whether the emergency rescue link establishment request frame sent by the another device (the rescue terminal) exists in the environment without sending the emergency rescue link establishment request frame outward.

In some embodiments, when the electronic device 100 is the rescue terminal, a rescue mode of the electronic device 100 may be divided into a strong rescue mode and a basic rescue mode. In the strong rescue mode, the electronic device 100 periodically sends an emergency rescue link establishment request frame outward and periodically intercepts whether an emergency rescue link establishment request frame sent by another device (the help-seeking terminal) exists in an environment. In the basic help-seeking mode, the electronic device 100 periodically intercepts whether the emergency rescue link establishment request frame sent by the another device (the help-seeking terminal) exists in the environment without sending the emergency rescue link establishment request frame outward.

In addition, in some embodiments, when the electronic device 100 is the rescue terminal and the electronic device 100 is an online synchronization node or an online master node, the electronic device 100 may periodically send a synchronization frame outward regardless of whether the electronic device is in the strong rescue mode or the basic rescue mode.

When the electronic device 100 establishes a communication connection with another terminal, the electronic device 100 in the low power consumption help-seeking mode may perform working processes such as intercepting a signal and sleeping, and the electronic device 100 in the strong help-seeking mode may perform working processes such as intercepting a signal, sending a signal, and sleeping. It can be understood that, compared to continuous receiving and sending of signals, the electronic device 100 adjusts time ratios for transmitting a signal, intercepting a signal, and sleeping in a process of link establishment (namely, establishing the communication connection). This can effectively reduce electric energy consumption of the electronic device 100 in the process of the link establishment. In addition, for the four working modes (namely, the low power consumption help-seeking mode and the strong help-seeking mode, and the basic rescue mode and the strong rescue mode) of the electronic device 100, the biggest difference lies in ratios of duration in which terminals send signals in their entire working cycles. In the low power consumption help-seeking mode, the electronic device 100 will not send a help-seeking signal outward, and in the basic rescue mode, the electronic device 100 will not send a rescue signal outward (but may send a synchronization signal). In the same time, electric energy consumed by the electronic device 100 intercepting a signal is far less than electric energy consumed by the electronic device 100 sending a signal outward. Therefore, in an embodiment of this application, power consumption of the electronic device 100 working in the low power consumption help-seeking mode is less than power consumption of the electronic device 100 working in the strong help-seeking mode, and power consumption of the electronic device 100 working in the basic rescue mode is less than the power consumption of the electronic device 100 working in the strong rescue mode.

The following describes user interfaces provided in this embodiment of this application.

A user interface involved in an emergency rescue mode is first described.

Figure 3:
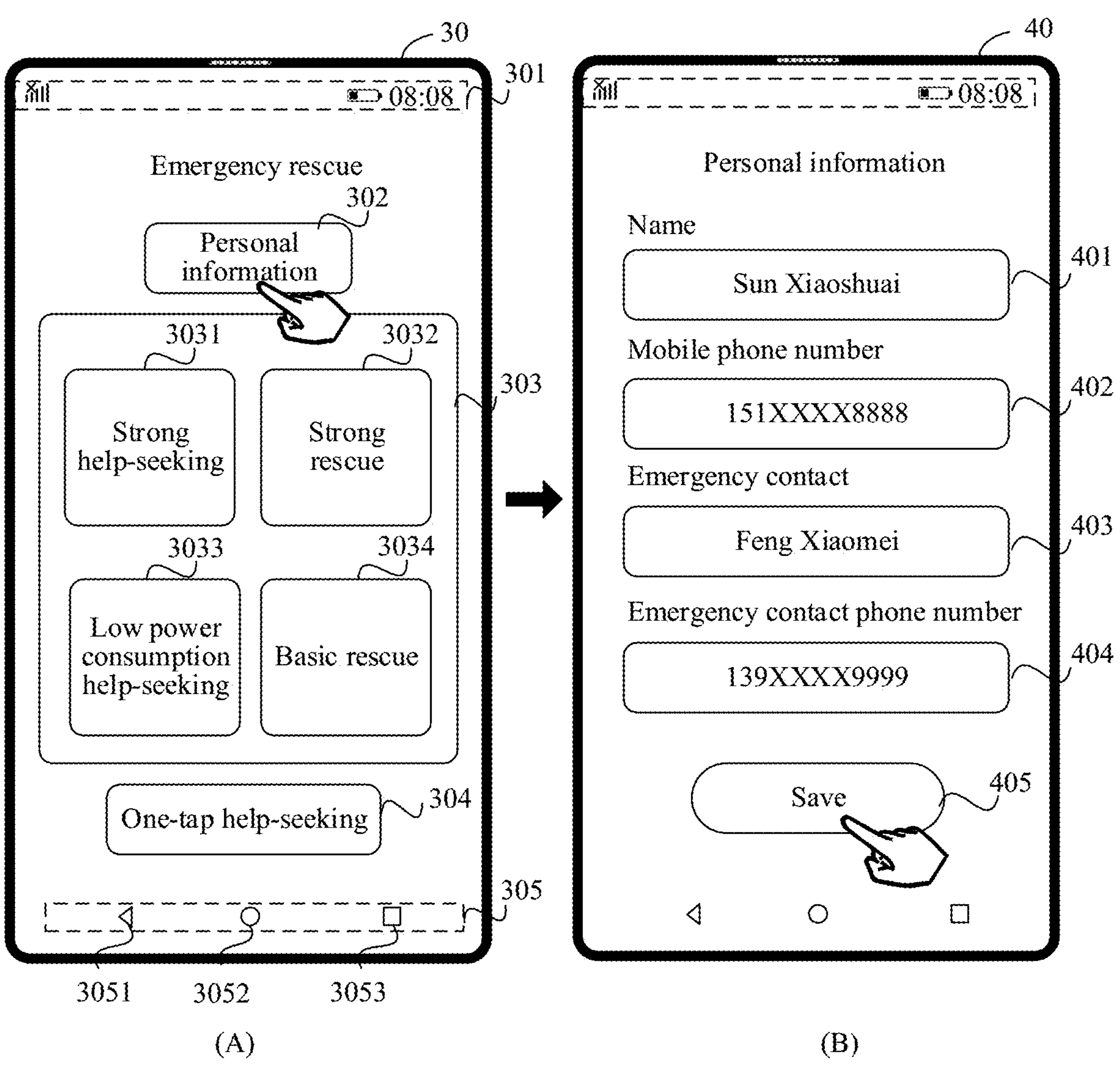
FIG. 3 is a schematic diagram of some user interfaces according to an embodiment of this application.

As shown in (A) in FIG. 3, (A) in FIG. 3 exemplarily shows an example user interface 30 after an electronic device 100 enters the emergency rescue mode. In some embodiments, the electronic device 100 may automatically enter the "emergency rescue mode" after being disconnected from a public network. In some other embodiments, the electronic device may enter the "emergency rescue mode" in response to a detected user operation. For example, a switch of the "emergency rescue mode" may be disposed in a drop-down menu bar of the electronic device, and when a user taps an "emergency rescue mode" option in the drop-down menu bar, the electronic device 100 displays the user interface 30. Alternatively, the electronic device 100 may be provided with a physical button for turning on and off the "emergency rescue mode", and when the button is pressed by the user, the electronic device 100 displays the user interface 30. Not limited thereto, the electronic device 100 may also enter the "emergency rescue mode" in other manners. For example, the electronic device 100 may also enter the "emergency rescue mode" according to a voice command of the user. This is not limited by embodiments of this application.

As shown in (A) in FIG. 3, the user interface 30 (where in some embodiments of this application, the user interface 30 may also be referred to as a first user interface) includes a status bar 301 and a "personal information" control 302, a mode selection bar 303, a "one-tap help-seeking" control 304, and a navigation bar 305.

The status bar 301 may include time, signal strength, and current remaining electric power. As can be seen from (A) in FIG. 3, at this time, the electronic device 100 is in a disconnected state and cannot be connected to a network opened by an operator. After the electronic device 100 is successfully connected to the network opened by the operator, a name of the operator (for example, China Mobile) may also be displayed in the status bar 301.

The "personal information" control 302 is used for a user to view and modify personal information stored in the electronic device 100, and the electronic device 100 can immediately send the personal information to another rescue terminal after the user is trapped and successfully communicates with the rescue terminal. In some embodiments of this application, the "personal information" control 302 may also be referred to as a "sixth control", and an operation instruction of the user to the control may be referred to as a "sixth operation instruction".

The mode selection bar 303 may include a "strong help-seeking" control 3031, a "strong rescue" control 3032, a "low power consumption help-seeking" control 3033, and a "basic rescue" control 3034. In some embodiments of this application, the "strong help-seeking" control 3031 may also be referred to as a "first control", and an operation instruction of the user to the control may be referred to as a "first operation instruction". The "strong rescue" control 3032 may also be referred to as a "second control", and an operation instruction of the user to the control may be referred to as a "second operation instruction". The "low power consumption help-seeking" control 3033 may also be referred to as a "third control", and an operation instruction of the user to the control may be referred to as a "third operation instruction". The "basic rescue" control 3034 may also be referred to as a "fourth control", and an operation instruction of the user to the control may be referred to as a "fourth operation instruction". Any option control can be used to respond to a user operation like a touch operation, so that the electronic device 100 enables a help-seeking or rescue mode corresponding to the control. Under different help-seeking or rescue modes, time ratios for transmitting a signal, intercepting a signal, and sleeping by the electronic device 100 in a search and rescue process are different. This will be described in detail in subsequent embodiments, and is not described repeatedly here.

The "one-tap help-seeking" control 304 may provide a quick help-seeking option for the user if the user is a help-seeking party. In some embodiments of this application, the "one-tap help-seeking" control 304 may also be referred to as a "fifth control", and an operation instruction of the user to the control may be referred to as a "fifth operation instruction". In some embodiments, after the electronic device 100 detects an operation performed by the user on the "one-tap help-seeking" control 304, the electronic device 100 may randomly enter the strong help-seeking mode or the low power consumption help-seeking mode. However, in some embodiments, after the electronic device 100 detects an operation performed by the user on the "one-tap help-seeking" control 304, the electronic device 100 may selectively enter the strong help-seeking mode or the low power consumption help-seeking mode based on electric power of the electronic device 100. For example, when the electric power of the electronic device 100 is greater than a threshold (for example, 50%), the electronic device 100 enters the strong help-seeking mode, and when the electric power of the electronic device 100 is less than or equal to the threshold, the electronic device 100 will enter the low power consumption help-seeking mode.

The navigation bar 305 may include: system navigation buttons such as a return button 3051, a home screen (home screen) button 3052, and a call out task history button 3053. When it is detected that a user taps the return button 3051, the electronic device 100 may display a previous user interface of a current user interface. When it is detected that the user taps the home screen button 3052, the electronic device 100 may display a home screen interface. When it is detected that the user taps the call out task history button 3053, the electronic device 100 may display a task recently opened by a first user. The navigation buttons may alternatively be named in another manner. For example, 3051 may be named a back button, 3052 may be named a home button, and 3053 may be named a menu button. This is not limited in this application. The navigation buttons in the navigation bar 305 are not limited to virtual buttons, and may alternatively be implemented as physical buttons.

It may be understood that (A) in FIG. 3 merely exemplary shows a user interface on the electronic device 100 and should not constitute a limitation on embodiments of this application.

(B) in FIG. 3 exemplarily shows a user interface 40 for a user to view and edit personal information. In some embodiments of this application, the user interface 40 may also be referred to as a second user interface.

For example, the electronic device 100 may detect a touch operation performed on the "personal information" control 302 as shown in (A) in FIG. 3 and enter the user interface 40 in response to the operation. As shown in (B) in FIG. 3, the user interface 40 may include a name information bar 401, a mobile phone number information bar 402, an emergency contact information bar 403, an emergency contact phone number information bar 404, and a save control 405.

The name information bar 401 is used for displaying a user name.

The mobile phone number information bar 402 is used for displaying a phone number of the user.

The emergency contact information bar 403 is used for displaying names of relatives or friends of the user.

The emergency contact phone number information bar 404 is used for displaying phone numbers of relatives or friends.

The user may perform an operation on the name information bar 401, the mobile phone number information bar 402, the emergency contact information bar 403, and the emergency contact phone number information bar 404, for example, a touch operation, to re-edit a text in a corresponding information bar.

The save control 405 may be used to save information in each current information bar in response to a user operation like a touch operation shown in (B) in FIG. 3. In some embodiments of this application, the save control 405 may also be referred to as a "seventh control", and an operation instruction of the user to the control may be referred to as a "seventh operation instruction".

In this application, the electronic device 100 may be a help-seeking terminal or a rescue terminal. When the electronic device 100 is the help-seeking terminal, a help-seeking mode of the electronic device 100 may be divided into a strong help-seeking mode and a low power consumption help-seeking mode. When the electronic device 100 is the rescue terminal, a rescue mode of the electronic device 100 may be divided into a strong rescue mode and a basic rescue mode. In this application, a search and rescue process of the electronic device is a periodic process. In a search and rescue working cycle, working content of the above four modes may include stages such as signal transmission, signal interception, and sleeping. The signal transmission includes an active request process of a device and a synchronization frame sending process. The active request process is a process in which the electronic device 100 acts as the rescue terminal to send a link establishment request frame to another help-seeking terminal, or the electronic device 100 acts as the help-seeking terminal to send a link establishment request frame to another rescue terminal. The synchronization frame sending process is a process in which the electronic device 100 acts as an online rescue terminal to periodically send a synchronization signal outward. The signal interception may also be referred to as passive interception, that is, when the electronic device 100 acts as the help-seeking terminal, the electronic device 100 intercepts whether a link establishment request frame sent by another rescue terminal exists outside, or when the electronic device 100 acts as the rescue terminal, the electronic device 100 intercepts whether a link establishment request frame sent by another help-seeking terminal exists outside. However, the sleep process is a process in which the electronic device 100 neither intercepts a signal nor sends a signal outward.

In the above four working modes, time ratios of transmitting a signal, intercepting a signal, and sleeping of each working mode in one search and rescue working cycle. Next, a specific working manner of the electronic device 100 in one search and rescue working cycle in these four working modes is described in conjunction with FIG. 4.

Figure 4:
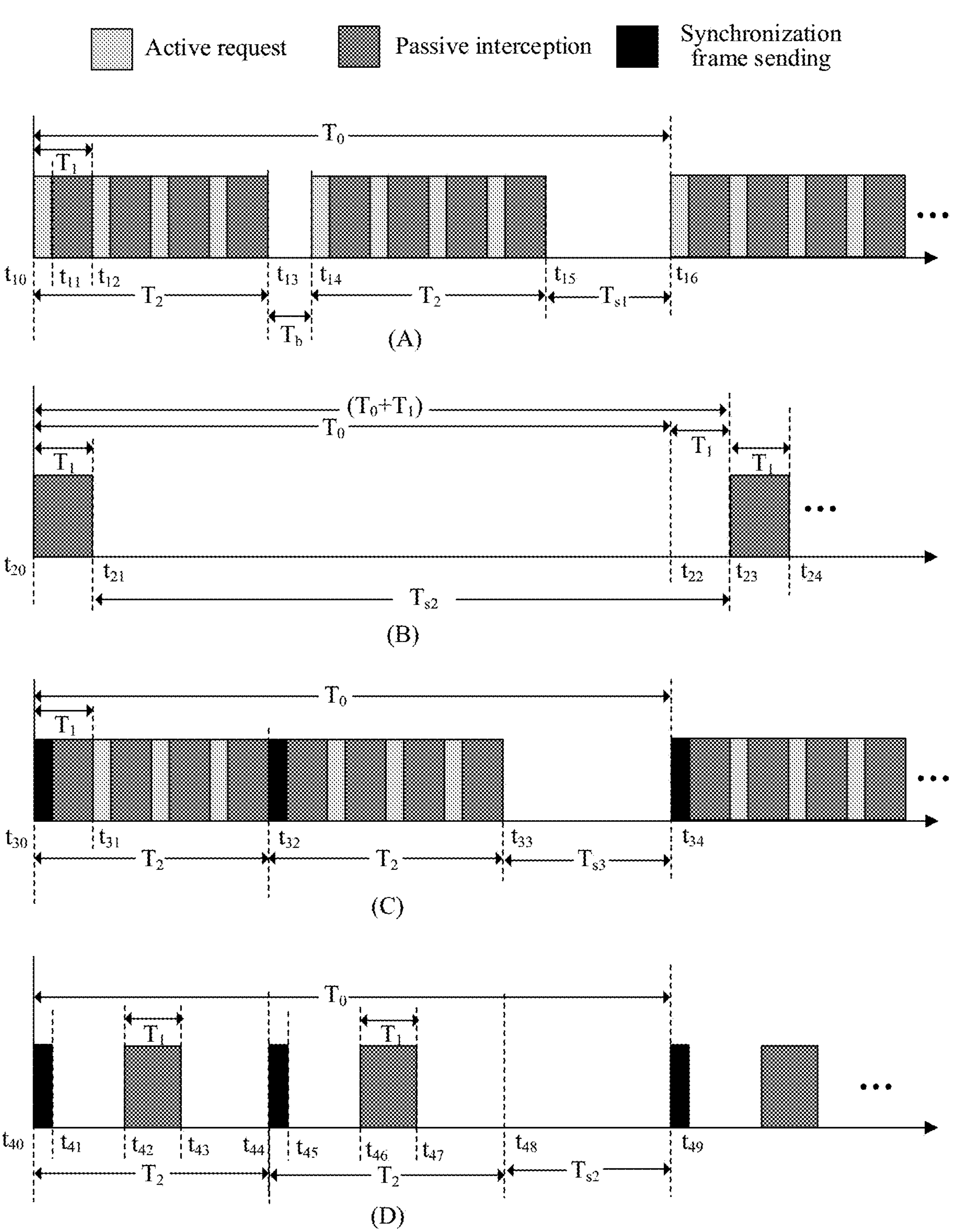
FIG. 4 is a working timing diagram of an electronic device in different working modes according to an embodiment of this application.

Before a working manner of each mode is described, some of elements and symbols in FIG. 4 are described first. In FIG. 4, transverse coordinate axes denote time axes, and an intersection of a dotted line perpendicular to each time axis and the corresponding time axis denotes a moment on the time axis, and may be denoted by a lowercase letter t plus a specific subscript, for example, a moment $t_{10}$ indicated in (A) in FIG. 4 or a moment $t_{20}$ indicated in (B) in FIG. 4. While there is duration between two specific moments on the time axis. The duration may be denoted by a capital letter T plus a specific subscript, for example, duration $T_0$ shown in (A) in FIG. 4 or duration $T_b$ shown in (A) in FIG. 4. Further, in FIG. 4, light gray rectangles on respective coordinate axes denote active request processes of the electronic device, dark gray rectangles denote passive interception processes, and black rectangles denote synchronization frame sending processes. The same symbol in FIG. 4 denotes the same moment or the same duration, for example, the duration $T_0$ shown in (A) in FIG. 4 and the duration $T_0$ shown in (B) in FIG. 4 denote the same duration.

(1) Strong Help-Seeking Mode

First, a working manner of the electronic device 100 in the strong help-seeking mode is described. The electronic device 100 may enter the strong help-seeking mode in response to a user operation, for example, a touch operation of the user to the "strong help-seeking" control 3031 shown in (A) in FIG. 3.

As can be seen from the foregoing descriptions, in the strong help-seeking mode, the electronic device 100 periodically sends an emergency rescue link establishment request frame outward and periodically intercepts whether an emergency rescue link establishment request frame sent by another device (the rescue terminal) exists in an environment. Specifically, for a specific working manner of the electronic device 100 in one search and rescue working cycle in the strong help-seeking mode, refer to a timing diagram shown in (A) in FIG. 4.

As shown in (A) in FIG. 4, after the electronic device 100 enables the strong help-seeking mode, the electronic device 100 will start to work in one search and rescue working cycle of the duration $T_0$. For example, duration between a moment $t_{10}$ and a moment $t_{16}$ shown in (A) in FIG. 4 is a complete search and rescue working cycle $T_0$ of the electronic device 100 in the strong help-seeking mode. In some embodiments of this application, the duration $T_0$ may be referred to as "first duration". Specifically, $T_0$ may be any one of duration values such as 8192 ms and 2048 ms. This is not limited in embodiments of this application.

Duration $T_2$ from the moment $t_{10}$ to a moment $t_{13}$ can be referred to as a slicing cycle. Similarly, a time period with duration $T_2$ from a moment $t_{14}$ to a moment $t_{15}$ is also a slicing cycle, and the slicing cycle can be considered as a small working cycle in the complete search and rescue working cycle $T_0$. In some embodiments of this application, the duration $T_2$ from the moment $t_{10}$ to the moment $t_{13}$ can be referred to as "sixth duration", and the duration $T_2$ from the moment $t_{14}$ to the moment $t_{15}$ can be referred to as "seventh duration". During one slicing cycle, the electronic device 100 will continuously alternate an active request process and a passive interception process. For example, in a slicing cycle from the moment $t_{10}$ to the moment $t_{13}$, the electronic device 100 will first send an emergency rescue link establishment request frame on an emergency rescue channel at the moment $t_{10}$, which usually takes several milliseconds to complete, namely, duration from the moment $t_{10}$ to a moment $t_{11}$. After that, at the moment $t_{11}$, the electronic device 100 will end the active request process, start the passive interception process, and continuously perform interception for a segment of duration, namely, duration from the moment $t_{11}$ to a moment $t_{12}$. Then, at the moment $t_{12}$, the electronic device 100 ends the passive interception process, and at the moment $t_{12}$, starts the active request process again. These operations are alternated until the end of the slicing cycle.

In addition, in the strong help-seeking mode, duration required for the electronic device 100 to perform one active request process plus duration required for performing one passive interception process may be referred to as one emergency rescue frame cycle, duration of which is $T_1$. In some embodiments of this application, duration $T_1$ from the moment $t_{10}$ to the moment $t_{12}$ is "eighth duration". For example, the duration from the moment $t_{10}$ to the moment $t_{13}$ is one emergency rescue frame cycle. There may be several emergency rescue frame cycles in one slicing cycle. For a terminal device, electric energy consumed by sending a signal is far greater than electric energy consumed by intercepting a signal. Therefore, in an emergency rescue frame cycle, the electronic device only performs the active request process momentarily, and performs the passive interception process in remaining longer duration. That is, in an emergency rescue frame cycle corresponding to the duration from the moment $t_{10}$ to the moment $t_{12}$, the duration from the moment $t_{10}$ to the moment $t_{11}$ is far less than the duration from the moment $t_{11}$ to the moment $t_{12}$.

It can be seen that a complete search and rescue working cycle $T_0$ of the strong help-seeking mode, duration in which the electronic device 100 actually performs signal receiving and sending operations is two slicing cycles. Furthermore, as can be seen from (A) in FIG. 4, there may be offset duration, for example, duration from the moment $t_{13}$ to the moment $t_{14}$, between the two slicing cycles. That is, in a complete cycle $T_0$, the two slicing cycles are originally continuous, that is, after a first slicing cycle ends at the moment $t_{13}$, originally, the next slicing cycle should start at the moment $t_{13}$ immediately. The electronic device 100 will continue to send the emergency rescue link establishment request frame on the emergency rescue channel at the moment $t_{13}$. However, because the help-seeking terminal and the rescue terminal may receive signals synchronously or send signals synchronously in respective search and rescue working cycles, the two terminals cannot successfully establish the link. Therefore, when the electronic device 100 acts as the help-seeking terminal, when the electronic device 100 cannot successfully establish a link with another device in the first slicing cycle, in order to eliminate a link establishment failure due to the above situation, the electronic device 100 may offset the whole of a next slicing cycle in the working cycle by one segment of duration, namely, duration $T_b$, and the next offset cycle will start at the moment $t_{14}$. In some embodiments of this application, the duration $T_b$ may be referred to as second "duration". Specifically, Specific duration of $T_b$ may be half of the emergency rescue frame cycle, that is, $T_1=2T_b$.

After the second slicing cycle ends, if the electronic device 100 has not successfully established the link with another rescue terminal, at the moment $t_{15}$, the electronic device 100 will be in a dormant period. That is, in duration from $t_{15}$ to $t_{16}$, in order to save electric power, the electronic device 100 will stop the active request process and the passive interception process until a next search and rescue working cycle starts.

To sum up the above descriptions, in the strong help-seeking mode, the electronic device 100 works in the working cycle of the duration $T_0$. In a complete working cycle $T_0$, the electronic device 100 continuously alternates active request and passive interception for first duration $T_2$. In this first duration $T_2$, the electronic device 100 periodically sends the emergency rescue link establishment request frame on the emergency rescue channel. If a synchronization frame sent by another device is received in an interception process, an access is attempted to be initiated on an access channel indicated by the synchronization frame. In the interception process, if an emergency rescue link establishment request frame sent by another device is received, an emergency rescue link establishment response frame is returned. In the interception process, if an emergency rescue link establishment response frame sent by another device is received, an authentication request is sent on an access channel indicated by the emergency rescue link establishment response frame to start an access process. If the link is not successfully established after the end of the first duration $T_2$, the electronic device 100 continuously alternates the active request and the passive interception for second duration $T_2$ after the electronic device 100 offsets a cycle sending time point of the emergency rescue link establishment request frame backward by the duration $T_b$, and if finally, the link is not successfully established, the electronic device 100 ends the operation and goes to sleep. In a continuous interception stage of strong help-seeking, a synchronization frame and an emergency rescue link establishment request frame sent by any rescue terminal around the help-seeking terminal, whether in "strong rescue" or "basic rescue", will be processed and fed back. This results in a faster rescue speed.

It may be understood that (A) in FIG. 4 only exemplarily shows a timing diagram for sending and receiving signals when the electronic device 100 works in the strong help-seeking mode. A specific form of the diagram is for the convenience of understanding of readers only, and should not constitute a limitation on embodiments of this application. In an actual scenario, a dormant period of the electronic device 100 in one search and rescue working cycle and a specific time period corresponding to two slicing cycles of alternately sending and receiving signals can be in other forms. For example, at the beginning of one search and rescue working cycle, the electronic device may first enter a dormant period and then carry out the process of alternately sending and receiving signals for duration of the two slicing cycles. In addition, one slicing cycle shown in (A) in FIG. 4 includes four emergency rescue frame cycles, while in some embodiments one slicing cycle may include more or fewer emergency rescue frame cycles. Similarly, a specific form of a timing diagram mentioned in the subsequent embodiments is also for the convenience of understanding of readers only, and should not constitute a limitation on embodiments of this application.

(2) Low Power Consumption Help-Seeking Mode

The electronic device 100 may enter the low power consumption help-seeking mode in response to a user operation, for example, a touch operation of the user to the "low power consumption help-seeking" control 3033 shown in (A) in FIG. 3.

As can be seen from the foregoing descriptions, in the low power consumption help-seeking mode, the electronic device 100 periodically intercepts whether the emergency rescue link establishment request frame sent by the another device (the rescue terminal) exists in the environment without sending the emergency rescue link establishment request frame outward. Specifically, for a specific working manner of the electronic device 100 in one search and rescue working cycle in the low power consumption help-seeking mode, refer to a timing diagram shown in (B) in FIG. 4.

As shown in (B) in FIG. 4, after the electronic device 100 enables the low power consumption help-seeking mode, the electronic device 100 will start to work in one cycle of duration ($T_0+T_1$). For example, duration between a moment $t_{20}$ and a moment $t_{23}$ shown in (B) in FIG. 4 is a complete search and rescue working cycle of the electronic device 100 in the low power consumption help-seeking mode. In fact, duration $T_1$ in the complete search and rescue working cycle ($T_0+T_1$) in the low power consumption mode can be considered as post duration between two continuous search and rescue working cycles $T_0$. That is, the complete search and rescue working cycle of the electronic device 100 in the low power consumption mode may be duration $T_0$ from the moment $t_{20}$ to a moment $t_{22}$ shown in (B) in FIG. 4, and originally, a next search and rescue working cycle should start at the moment $t_{22}$, but in order to prevent a link establishment failure because a surrounding rescue terminal is just in a dormant period when the electronic device acts as the help-seeking terminal to send a link establishment request frame in each cycle, before starting a next search and rescue working cycle, the electronic device 100 offsets a start moment of the next search and rescue working cycle backward by the duration $T_1$, and the electronic device 100 offsets a start moment of a cycle backward by the duration $T_1$ in each subsequent search and rescue working cycle before successfully establishing the link with another rescue terminal, to ensure successful link establishment with the surrounding rescue terminal. This will be described in detail later, and is not described repeatedly here.

In an emergency rescue frame cycle with duration $T_2$ from the moment $t_{20}$ to a moment $t_{21}$, the electronic device 100 continuously intercepts whether the emergency rescue link establishment request frame or the synchronization frame sent by the another rescue terminal exists in the environment, and returns an emergency rescue link establishment response frame if the emergency rescue link establishment request frame sent by the another device is received. The electronic device 100 attempts to initiate access on an access channel indicated by the synchronization frame if the captured synchronization frame sent by the another rescue terminal is received. In some embodiments of this application, the duration $T_1$ from the moment $t_{20}$ to the moment $t_{21}$ is “third duration”. If in an emergency rescue frame cycle corresponding to the moment $t_{20}$ to the moment $t_{21}$, the electronic device 100 fails to establish the link with the another rescue terminal, the electronic device 100 will be in a dormant period of the current search and rescue working cycle, namely, duration $T_{s2}$ from the moment $t_{21}$ to the moment $t_{23}$ shown in (B) in FIG. 4, until the beginning of a next search and rescue working cycle, namely, the moment $t_{23}$, and then the electronic device 100 continues to intercept whether the emergency rescue link establishment request frame or the synchronization frame sent by the another rescue terminal exists in the environment. In some embodiments of this application, the duration $T_{s2}$ from the moment $t_{21}$ to the moment $t_{22}$ can be referred to as “fourth duration”, and duration from the moment $t_{22}$ to the moment $t_{23}$ can be referred to as “fifth duration”.

To sum up the above descriptions, in the low power consumption help-seeking mode, the electronic device 100 works in one search and rescue working cycle of the duration $(T_0+T_1)$, and in one search and rescue working cycle, the electronic device 100 continuously intercepts the emergency rescue link establishment request frame or the synchronization frame sent by the another rescue terminal in the environment for an emergency rescue frame cycle, namely, the duration $T_1$. If a synchronization frame sent by another device is received in an interception process, an access is attempted to be initiated on an access channel indicated by the synchronization frame. In the interception process, if an emergency rescue link establishment request frame sent by another device is received, an emergency rescue link establishment response frame is returned. In a continuous interception stage of low-power help-seeking, an emergency rescue link establishment request frame sent by any terminal in the “strong rescue mode” around the help-seeking terminal will be fed back and the link establishment will be completed with maximum link establishment time $(T_0+T_1)$ ms. If there is a synchronization node terminal in the “basic rescue mode” nearby (where the synchronization node terminal may be a rescue terminal or an ordinary terminal in a non-rescue mode just around a trapped person), a synchronization frame of the synchronization node terminal will also be captured due to an offset of an emergency rescue frame cycle, and then the help-seeking terminal attempts to initiate access on an access channel indicated by the synchronization frame. If, at the end of the search and rescue working cycle, the electronic device 100 has not successfully established the link with the another rescue terminal, the electronic device 100 will start a next search and rescue working cycle.

(3) Strong Rescue Mode

The electronic device 100 may enter the strong rescue mode in response to a user operation, for example, a touch operation of the user to the “strong rescue” control 3032 shown in (A) in FIG. 3.

As can be seen from the foregoing descriptions, in the strong rescue mode, the electronic device 100 periodically sends an emergency rescue link establishment request frame outward and periodically intercepts whether an emergency rescue link establishment request frame sent by another device (the help-seeking terminal) exists in an environment. Specifically, for a specific working manner of the electronic device 100 in one search and rescue working cycle in the strong rescue mode, refer to a timing diagram shown in (C) in FIG. 4.

As shown in (C) in FIG. 4, after the electronic device 100 enables the strong rescue mode, the electronic device 100 will start to work in a cycle of duration $T_0$. Duration from a moment $t_{30}$ to a moment $t_{34}$ shown in (C) in FIG. 4 is a next complete search and rescue working cycle $T_0$ of the electronic device 100 in the strong rescue mode, and one complete search and rescue working cycle $T_0$ includes two slicing cycles with duration $T_2$.

In a slicing cycle with duration $T_2$ from the moment $t_{30}$ to a moment $t_{32}$, the electronic device 100 will continuously alternately perform an active request process and a passive interception process. Here, it is assumed that the electronic device 100 is an online synchronization node, that is, the electronic device 100 periodically sends a synchronization frame outward in a cycle of $T_2$, and the electronic device 100 completes sending of the synchronization frame within a first emergency frame rescue cycle of a first slicing cycle. As shown in (C) in FIG. 4, in a slicing cycle from the moment $t_{30}$ to a moment $t_{31}$, the electronic device 100 will first send the synchronization frame outward at the moment $t_{30}$, which usually takes several milliseconds to complete. Thereafter, the electronic device 100 will continue to perform a passive interception process in remaining duration within the emergency rescue frame cycle. Then, at the beginning of a next emergency rescue frame cycle, namely, at the moment $t_{31}$, the electronic device 100 ends the passive interception process, and starts the active request process again at the moment $t_{31}$. It should be noted that unlike the first emergency rescue frame cycle, the electronic device 100 starts to send, at the moment $t_{31}$, an emergency rescue link establishment request frame outward in an active request manner instead of sending the synchronization frame outward. In a remaining emergency rescue frame cycle within the first slicing cycle, the electronic device 100 no longer sends the synchronization frame, but only sends the emergency rescue link establishment request frame outward in the active request manner until the slicing cycle ends. If the first slicing cycle ends and the electronic device 100 has not successfully established a link with a search and rescue terminal, the electronic device 100 starts work of a second slicing cycle, namely, working content corresponding to the moment $t_{32}$ to a moment $t_{33}$. As can be seen from (C) in FIG. 4, a working manner of the second slicing cycle is the same as the working manner of the first working cycle, and details will not be repeatedly described here. If after the second slicing cycle ends, the electronic device 100 has not successfully established the link with the search and rescue terminal, at the moment $t_{33}$, the electronic device 100 will be enter a dormant period. That is, in duration from the moment $t_{33}$ to the moment $t_{34}$, in order to save electric power, the electronic device 100 will stop the active request process and the passive interception process until a next search and rescue working cycle starts. In some embodiments of this application, duration from the moment $t_{30}$ to the moment $t_{33}$ is twice the duration $T_2$, namely, “ninth duration”, and the duration from the moment $t_{33}$ to the moment $t_{34}$ is the duration $T_{s2}$, namely, “tenth duration”.

To sum up the above, in the strong rescue mode, the electronic device 100 sends the emergency rescue link establishment request frame on the emergency rescue channel in each rescue frame cycle $T_1$, and attempts to establish a link if the emergency rescue link establishment response frame is received from the help-seeking terminal in the environment. At the same time, if the electronic device 100 is a master node or synchronization node of an ad hoc network, the electronic device 100 will periodically send the synchronization frame on a broadcast channel, and the help-seeking terminal in the environment may initiate access through a random access channel indicated by the synchronization frame.

(4) Basic Rescue Mode

The electronic device 100 may enter the basic rescue mode in response to a user operation, for example, a touch operation of the user to the "basic rescue" control 3034 shown in (A) in FIG. 3.

As can be seen from the foregoing descriptions, in the basic rescue mode, the electronic device 100 periodically intercepts whether an emergency rescue link establishment request frame sent by another device (the help-seeking terminal) exists in the environment without sending the emergency rescue link establishment request frame outward. Specifically, for a specific working manner of the electronic device 100 in one search and rescue working cycle in the basic rescue mode, refer to a timing diagram shown in (D) in FIG. 4.

As shown in (D) in FIG. 4, after the electronic device 100 enables the basic rescue mode, the electronic device 100 will start to work in a cycle of duration $T_0$. Duration from a moment $t_{40}$ to a moment $t_{49}$ shown in (D) in FIG. 4 is a next complete search and rescue working cycle $T_0$ of the electronic device 100 in the basic rescue mode, and one complete search and rescue working cycle $T_0$ includes two slicing cycles with duration $T_2$.

It is also assumed here that the electronic device 100 is an online synchronization node, that is, the electronic device 100 will periodically send a synchronization frame outward in a cycle of $T_2$. Therefore, in a slicing cycle with duration $T_2$ from the moment $t_{40}$ to a moment $t_{45}$, the electronic device 100 will sequentially perform a synchronization frame sending process and a passive interception process. Here, it is assumed that, in the slicing cycle, the electronic device 100 sends the synchronization frame prior to performing the passive interception process. As shown in (D) in FIG. 4, in a slicing cycle from the moment $t_{40}$ to a moment $t_{44}$, the electronic device 100 will first send the synchronization frame outward at the moment $t_{40}$, which usually takes several milliseconds (namely, duration from the moment $t_{40}$ to a moment $t_{41}$) to complete. Thereafter, in a time period from a moment $t_{42}$ to a moment $t_{43}$, the electronic device 100 will performed the passive interception process with duration $T_1$. If when a first slicing cycle, namely, the moment $t_{44}$, the electronic device 100 has not successfully established a link with a search and rescue terminal, the electronic device 100 starts work of a second slicing cycle, namely, working content corresponding to the moment $t_{44}$ to a moment $t_{48}$. As can be seen from (D) in FIG. 4, a working manner of the second slicing cycle is the same as the working manner of the first working cycle, and details will not be repeatedly described here. If after the second slicing cycle ends, the electronic device 100 has not successfully established the link with the search and rescue terminal, at the moment $t_{48}$, the electronic device 100 will be in a dormant period with duration $T_{s2}$. That is, in duration from the moment $t_{48}$ to the moment $t_{49}$, in order to save electric power, the electronic device 100 will stop the active request process and the passive interception process until a next search and rescue working cycle starts. In fact, it is not difficult to understand that in a slicing cycle corresponding to the basic rescue mode, if the electronic device 100 fails to successfully establish the link with the search and rescue terminal, in order to save electric power, the electronic device 100 will stop the active request process and the passive interception process until a next search and rescue working cycle starts, and the electronic device will be in a dormant period momentarily in these two slicing cycles. For example, in the slicing cycle from the moment $t_{40}$ to the moment $t_{44}$, if the electronic device 100 fails to successfully establish the link with the search and rescue terminal, two time periods of the moment $t_{41}$ to the moment $t_{42}$ and the moment $t_{43}$ to the moment $t_{44}$ both are dormant periods of the electronic device 100.

To sum up the above, in the basic rescue mode, the electronic device 100 performs continuous passive interception for duration $T_1$ per duration $T_2$, if an emergency rescue link establishment request frame of a rescue frame is received in an interception process, returns an emergency rescue link establishment response frame to indicate an access channel, and if the link is not successfully established at the end of the interception, gives up the link establishment and waits for a next interception cycle. At the same time, if the electronic device 100 is a master node or synchronization node of an ad hoc network, the electronic device 100 will further periodically send the synchronization frame on a broadcast channel for duration $T_2$, and the help-seeking terminal may initiate access through a random access channel indicated by the synchronization frame.

As can be seen from the foregoing descriptions, when the electronic device 100 establishes a communication connection with another terminal, the electronic device 100 in the low power consumption help-seeking mode may perform working processes such as intercepting a signal and sleeping, and the first terminal in the strong help-seeking mode may perform working processes such as intercepting a signal, sending a signal, and sleeping. It can be understood that, compared to continuous receiving and sending of signals, the electronic device 100 adjusts time ratios for transmitting a signal, intercepting a signal, and sleeping in a process of link establishment (namely, establishing the communication connection). This can effectively reduce electric energy consumption of the electronic device 100 in the process of the link establishment. In addition, for the four working modes (namely, the low power consumption help-seeking mode and the strong help-seeking mode, and the basic rescue mode and the strong rescue mode) of the electronic device 100, the biggest difference lies in ratios of duration in which terminals send signals in their entire working cycles. In the low power consumption help-seeking mode, the electronic device 100 will not send a help-seeking signal outward, and in the basic rescue mode, the electronic device 100 will not send a rescue signal outward (but may send a synchronization signal). In the same time, electric energy consumed by the electronic device 100 intercepting a signal is far less than electric energy consumed by the electronic device 100 sending a signal outward. Therefore, in an embodiment of this application, power consumption of the electronic device 100 working in the low power consumption help-seeking mode is less than power consumption of the electronic device 100 working in the strong help-seeking mode, and power consumption of the electronic device 100 working in the basic rescue mode is less than the power consumption of the electronic device 100 working in the strong rescue mode.

As can be seen from the foregoing descriptions, in embodiments of this application, link establishment manners of the help-seeking terminal and the rescue terminal may be divided into the following three types:

(1) After receiving a synchronization frame sent by the rescue terminal, the help-seeking terminal sends an access request on a random access channel indicated by the synchronization frame. An open system authentication mode is adopted between the help-seeking terminal and the rescue terminal, includes two steps of open system access request (Msg1) and access response (Msg2), and does not need authentication.

Open system authentication is mainly used for emergency rescue, which does not need key verification, and any device can be successfully accessed. An open system authentication process is divided into two steps: access request and access response. The access request includes information such as frame control, a long address of a sending device (the help-seeking terminal), a long address of a target device (the rescue terminal), and a name of the sending device (the help-seeking terminal). The access response includes information such as frame control, a long address of a sending device (the rescue terminal), a long address of a target device (the help-seeking terminal), and a name of the sending device (the rescue terminal).

(2) After receiving an emergency rescue link establishment request frame sent by the rescue terminal, the help-seeking terminal reads a timestamp (timestamp) indicated by the rescue terminal from the emergency rescue link establishment request frame and returns an emergency rescue link establishment response frame. After receiving the emergency rescue link establishment response frame, the rescue terminal performs interception on all access channels and emergency rescue channels thereafter. The help-seeking terminal calculates positions of the access channel and the rescue channel based on the timestamp, and initiates random access on the access channel and the rescue channel to complete link establishment. In this manner, an open system authentication mode may be adopted for the random access, includes two steps: open system access request (Msg1) and access response (Msg2), and does not need authentication.

(3) After receiving an emergency rescue link establishment request frame sent by the help-seeking terminal, the rescue terminal returns an emergency rescue link establishment response frame, and a timestamp is included in the emergency rescue link establishment response frame. After receiving the emergency rescue link establishment request frame, the rescue terminal performs interception on all access channels and emergency rescue channels thereafter. The help-seeking terminal calculates positions of the access channel and the rescue channel based on the timestamp, and initiates random access on the access channel and the rescue channel to complete link establishment. In this manner, an open system authentication mode may be adopted for the random access, includes two steps: open system access request (Msg1) and access response (Msg2), and does not need authentication.

In addition, in the above three manners, there is a difference in frame format between an emergency rescue link establishment request frame sent by the help-seeking terminal and an emergency rescue link establishment request frame sent by the rescue terminal. The difference enable a terminal to identify whether a received emergency rescue link establishment request frame is sent by the rescue terminal or the help-seeking terminal. This prevents a terminal which is also a rescue terminal from redundantly processing an emergency rescue link establishment request frame sent by another rescue terminal, and also prevents a terminal which is also a help-seeking terminal from redundantly processing an emergency rescue link establishment request frame sent by another help-seeking terminal.

For a frame format of the emergency rescue link establishment request frame sent by the help-seeking terminal, refer to the following table:

TABLE 1

| Byte number | Field type | Bit number 0 | 1 | 2 | 3 | 4 | 5 | 6 | 7 |
|---|---|---|---|---|---|---|---|---|---|
| 1 | Frame control | Protocol version | | | | Frame type | | | Rsv |
| 2 | | Rsv | Rsv | Rsv | | Rsv | Rescue (0) | | Rsv |
| 3 | Address | | | | | Originating address | | | |
| 4 | | | | | | | | | |
| 5 | | | | | | | | | |
| 6 | | | | | | | | | |
| 7 | Frame check | | | | | Frame check sequence | | | |
| 8 | sequence | | | | | | | | |

However, for a frame format of the emergency rescue link establishment request frame sent by the rescue terminal, refer to the following table:

TABLE 2

| Byte number | Field type | Bit number 0 | 1 | 2 | 3 | 4 | 5 | 6 | 7 |
|---|---|---|---|---|---|---|---|---|---|
| 1 | Frame control | Protocol version | | | | Frame type | | | Rsv |
| 2 | | Rsv | Rsv | Rsv | | Rsv | Rescue (1) | | Rsv |
| 3 | Address | | | | | Originating address | | | |
| 4 | | | | | | | | | |

TABLE 2-continued

| Byte number | Field type | Bit number 0 | 1 | 2 | 3 | 4 | 5 | 6 | 7 |
|---|---|---|---|---|---|---|---|---|---|
| 5 | | | | | | | | | |
| 6 | | | | | | | | | |
| 7 | Timestamp | | | | Slice ID | | | | |
| 8 | | | Slice ID | | | | Frame ID | | |
| 9 | | | Slot ID | | Moment | | | Rsv | |
| 10 | Frame check | | | | Frame check sequence | | | | |
| 11 | sequence | | | | | | | | |

As shown in Table 1 and Table 2 above, the emergency rescue link establishment request frame sent by the help-seeking terminal and the emergency rescue link establishment request frame sent by the rescue terminal may be identified by a "Rescue" bit in the frame type information. Among them, 1 identifies the rescue terminal, and 0 identifies the help-seeking terminal. In a rescue process, after the help-seeking terminal receives the emergency rescue link establishment request frame, the help-seeking terminal may determine whether the emergency rescue link establishment request frame is sent by the rescue terminal based on a "Rescue" bit identifier of the emergency rescue link establishment request frame. Under a condition in which the emergency rescue link establishment request frame is sent by the rescue terminal, the help-seeking terminal may send the emergency rescue link establishment response frame to the rescue terminal to complete the link establishment. When the emergency rescue link establishment request frame is sent by another terminal which is also a help-seeking terminal, without processing the emergency rescue link establishment request frame. Similarly, when the rescue terminal receives the emergency rescue link establishment request frame, the rescue terminal may send, when the emergency rescue link establishment request frame is sent by the help-seeking terminal, the emergency rescue link establishment response frame to the help-seeking terminal to complete the link establishment. When the emergency rescue link establishment request frame is sent by another terminal which is also a rescue terminal, the help-seeking terminal ignores the emergency rescue link establishment request frame.

It may be understood that, because there are differences in specific time required for the terminal to sleep, transmit a signal, and perform interception in the four working modes mentioned above (the strong help-seeking mode, the low power consumption help-seeking mode, the strong rescue mode, and the basic rescue mode), in a rescue process, which of the above three link establishment manners is adopted by the rescue terminal and the help-seeking terminal to complete the link establishment, and how long it takes to adopt the above three link establishment manners respectively, mainly depend on working modes adopted by the rescue terminal and the help-seeking terminal in the rescue process. Next, with reference to FIG. 5 to FIG. 8, manners and processes of the link establishment of the help-seeking terminal and the rescue terminal under different working mode combinations will be introduced respectively.

In FIG. 5 to FIG. 8, a transverse coordinate axis represents a time axis, and an intersection of a dotted line perpendicular to each time axis and the corresponding time axis denotes a moment on the time axis, and may be denoted by a lowercase letter t plus a specific subscript, and there is corresponding duration between two specific moments on the time axis, which may be denoted by an uppercase letter T plus a specific subscript. Further, in FIG. 5 to FIG. 8, light gray rectangles on respective coordinate axes denote active request processes of the electronic device, dark gray rectangles denote passive interception processes, and black rectangles denote synchronization frame sending processes. The light gray rectangle and the black rectangle are marked by a letter "S", which indicates that the electronic device is in a state of sending (send) a signal outward in the process. The dark gray rectangle is marked by a letter "R", which indicates that the electronic device is in a state of receiving (receive) a signal in the process. In FIG. 5 to FIG. 8, a same symbol denotes a same moment or same duration. For details, refer to the above-mentioned descriptions of FIG. 4. This will not be repeatedly described here.

Here it is assumed that the electronic device 100 is a help-seeking terminal, an electronic device 200 is a rescue terminal, and the electronic device 200 is an online synchronization node which may periodically send a synchronization frame outward. Like the electronic device 100, the electronic device 200 is also a terminal supporting the above-mentioned four working modes. In a search and rescue process, the electronic device 200 may work as a rescue terminal in the above-mentioned strong rescue mode or in the basic rescue mode. For a specific architecture of the electronic device 200, refer to the foregoing related descriptions for the electronic device 100. Details are not described herein again.

The electronic device 100 acts as the help-seeking terminal, and the electronic device 200 acts as the rescue terminal. In the search and rescue process, the electronic device 100 and the electronic device 200 may complete the link establishment in the following four different mode combinations.

1. Strong Help-Seeking Mode and Strong Rescue Mode

In this mode combination, the electronic device 100 works in the strong help-seeking mode, and the electronic device 200 works in the strong rescue mode. At this time, the electronic device 100 may be referred to as a strong help-seeking terminal, and the electronic device 200 may be referred to as a strong rescue terminal. For details of a link establishment manner and process of the electronic device 100 and the electronic device 200 in this mode combination, refer to FIG. 5.

Figure 5:
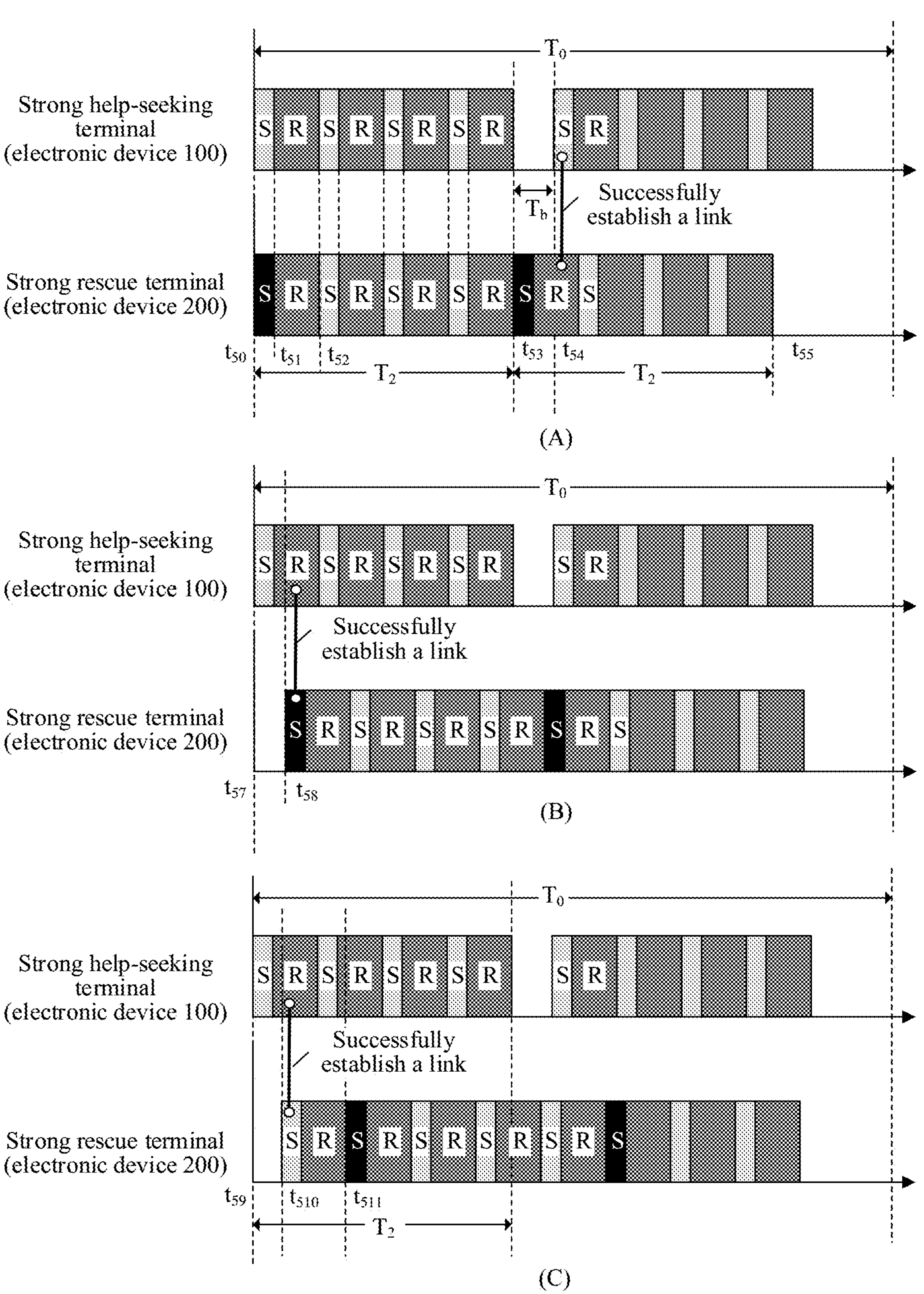
FIG. 5 is a schematic diagram of a process of establishing a link between a help-seeking terminal and a rescue terminal according to an embodiment of this application.

(A) in FIG. 5 shows a process in which the electronic device 100 sends an emergency rescue link establishment request frame, the electronic device 200 returns an emergency rescue link establishment response frame to the electronic device 100 after receiving the emergency rescue link establishment request frame, and the electronic device 100 successfully establishes a communication connection with the electronic device 200 after receiving the emergency rescue link establishment response frame.

As shown in (A) in FIG. 5, it is assumed that at a moment $t_{50}$, the electronic device 100 and the electronic device 200 start at the same time, one search and rescue working cycle with duration $T_0$. As can be seen from the foregoing descriptions of FIG. 4, in a first slicing cycle of the electronic device 100 and the electronic device 200, because time periods of the electronic device 100 and the electronic device 200 sending signals and intercepting signals are consistent, the electronic device 100 and the electronic device 200 cannot successfully establish a link in the first slicing cycle. For example, a time period from the moment $t_{50}$ to a moment $t_{51}$, the electronic device 100 sends the emergency rescue link establishment request frame outward, and the electronic device 200 sends a synchronization frame outward, so that the two devices cannot successfully establish the link. However, a time period from the moment $t_{51}$ to a moment $t_{52}$, the electronic device 100 intercepts whether a signal sent by the rescue terminal exists, and the electronic device 200 also intercepts whether a signal sent by the help-seeking terminal exists in an environment, so that the two devices cannot successfully establish the link. However, there is post-offset duration $T_b$ between two slicing cycles of the help-seeking terminal in the strong help-seeking mode. Thus, in a next cycle, the time periods of the electronic device 100 and the electronic device 200 sending the signals and intercepting the signals will be staggered, that is, at a moment $t_{54}$ shown in (A) in FIG. 5, the electronic device 100 starts a second slicing cycle and is sending the emergency rescue link establishment request frame outward at this time. However, the electronic device 200 has already started a second slicing cycle at a moment $t_{53}$ before the moment $t_{54}$, so at the moment $t_{54}$, the electronic device 200 is intercepting whether a signal sent by the help-seeking terminal exists in the environment. Accordingly, the electronic device 200 may thereafter receive the emergency rescue link establishment request frame sent by the electronic device 100 and return the emergency rescue link establishment response frame to complete establishment of the communication connection with the electronic device 100.

(B) in FIG. 5 shows a process in which the electronic device 200 sends a synchronization frame and the electronic device 100 receives the synchronization frame sent by the electronic device 200 and establishes the communication connection with the electronic device 200 under an indication of the synchronization frame.

As shown in (B) in FIG. 5, it is assumed that at a moment $t_{57}$, the electronic device 100 starts a search and rescue working cycle with duration $T_0$, and at a moment $t_{58}$, the electronic device 100 and the electronic device 200 start each search and rescue working cycle with duration $T_0$. As can be seen from the timing diagram when the two electronic devices works as shown in (B) in FIG. 5, at the moment $t_{58}$, the electronic device 100 is intercepting whether a signal sent by a rescue terminal exists in the environment, and the electronic device 200 is sending the synchronization frame outward. Accordingly, the electronic device 100 may receive the synchronization frame sent by the electronic device 200 and establish the communication connection with the electronic device 200 under the indication of the synchronization frame.

(C) in FIG. 5 shows a process in which the electronic device 200 sends an emergency rescue link establishment request frame, the electronic device 100 returns an emergency rescue link establishment response frame to the electronic device 200 after receiving the emergency rescue link establishment request frame, and the electronic device 200 successfully establishes a communication connection with the electronic device 100 after receiving the emergency rescue link establishment response frame.

Different from time at which the electronic device 200 sends the synchronization frame in a signal receiving and sending process as shown in (A) and (B) in FIG. 5, in (C) in FIG. 5, in one slicing cycle, the electronic device 200 may not immediately send the synchronization frame at the start of the slicing cycle, but may send the synchronization frame after several emergency rescue frame cycles. As shown in (C) in FIG. 5, the electronic device 200 starts a search and rescue working cycle with duration $T_0$ at a moment $t_{510}$, and in a first slicing cycle of the search and rescue working cycle, the electronic device 200 first starts to send the emergency rescue link establishment request frame at the moment $t_{510}$. After that, at a moment $t_{511}$, the electronic device 200 starts to send the synchronization frame. However, the electronic device 200 starts a search and rescue working cycle with duration $T_0$ at a moment $t_{59}$, and at the moment $t_{510}$, the electronic device 100 is intercepting whether a signal sent by the rescue terminal exists in the environment. Therefore, after the moment $t_{510}$, the electronic device 100 may receive the emergency rescue link establishment request frame sent by the electronic device 200 and return the emergency rescue link establishment response frame to the electronic device 200. After receiving the emergency rescue link establishment response frame, the electronic device 200 may successfully establish the communication connection with the electronic device 100.

2. Strong Help-Seeking Mode and Basic Rescue Mode

In this mode combination, the electronic device 100 works in the strong help-seeking mode, and the electronic device 200 works in the basic rescue mode. At this time, the electronic device 100 may be referred to as a strong help-seeking terminal, and the electronic device 200 may be referred to as a basic rescue terminal. For details of a link establishment manner and process of the electronic device 100 and the electronic device 200 in this mode combination, refer to FIG. 6.

Figure 6:
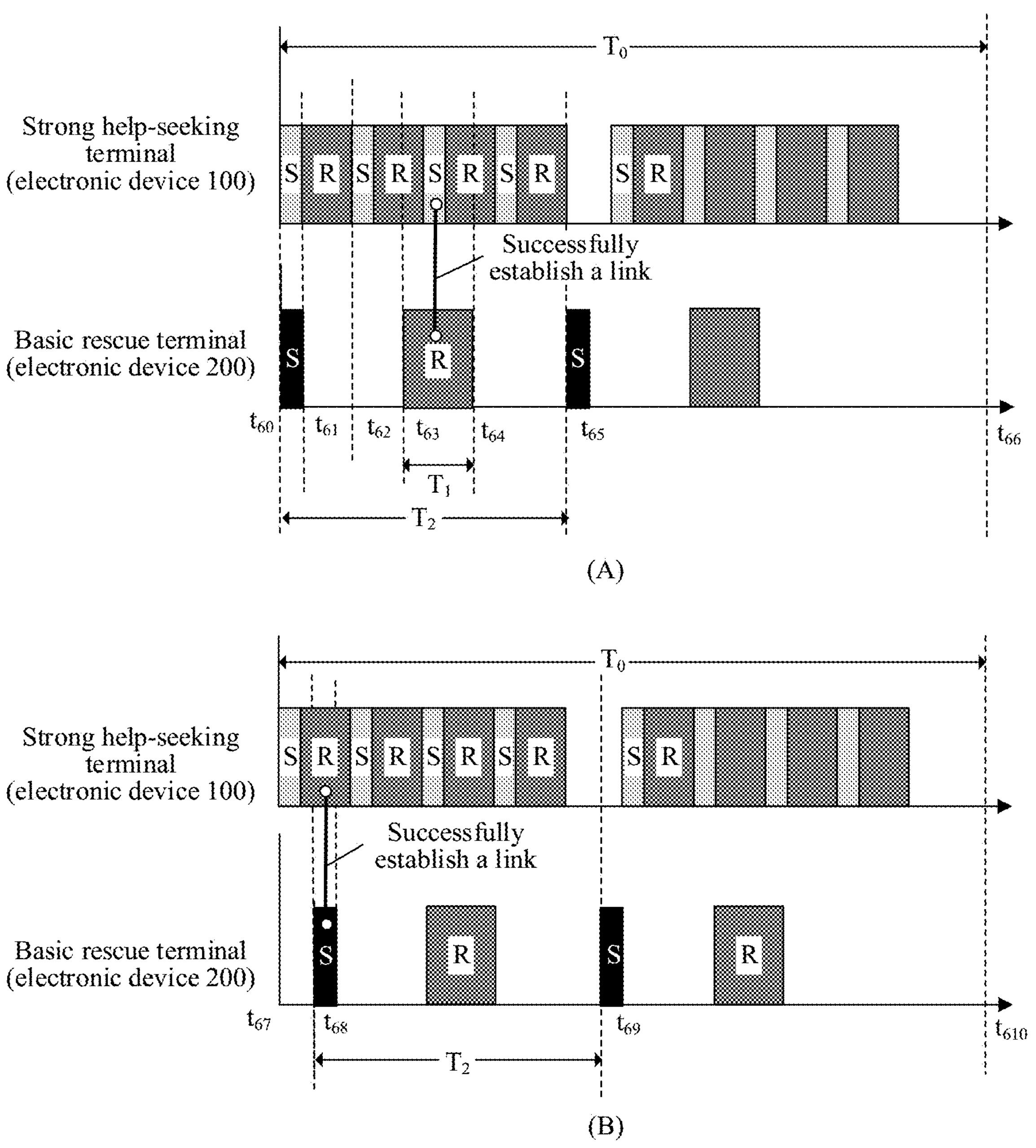
FIG. 6 is a schematic diagram of a process of establishing a link between a help-seeking terminal and a rescue terminal according to an embodiment of this application.

(A) in FIG. 6 shows a process in which the electronic device 100 sends an emergency rescue link establishment request frame, the electronic device 200 returns an emergency rescue link establishment response frame to the electronic device 100 after receiving the emergency rescue link establishment request frame, and the electronic device 100 successfully establishes a communication connection with the electronic device 200 after receiving the emergency rescue link establishment response frame.

As shown in (A) in FIG. 6, it is assumed that at a moment $t_{60}$, the electronic device 100 and the electronic device 200 start at the same time, one search and rescue working cycle with duration $T_0$. With reference to the foregoing descriptions of FIG. 4, it can be seen that in a time period from a moment $t_{60}$ to a moment $t_{61}$ of the electronic device 100 and the electronic device 200, because time periods of the electronic device 100 and the electronic device 200 sending signals and intercepting signals are consistent, that is, the electronic device 100 sends the emergency rescue link establishment request frame outward, and the electronic device 200 also transmits the synchronization frame outward, the electronic device 100 and the electronic device 200 cannot successfully establish a link. However, in a time period from the moment $t_{61}$ to a moment $t_{63}$, although the electronic device 100 continues to alternately perform an active request process and a passive interception process, the electronic device 200 is in a dormant state in this time period, so the electronic device 100 and the electronic device 200 still cannot successfully establish the link. At the moment $t_{63}$, the electronic device 200 starts to intercept whether a signal sent by the help-seeking terminal exists in an environment, and will perform continuous interception for one emergency rescue frame cycle $T_1$, namely, a time period from the moment $t_{63}$ to a moment $t_{64}$. It can be understood that in the strong rescue mode, duration required for the electronic device 100 to perform one active request process plus duration required for the electronic device 100 to perform one passive interception process is one emergency rescue frame cycle. Therefore, when the electronic device 200 intercepts, in the environment for one emergency rescue frame cycle $T_1$, whether the help-seeking terminal sends a signal, the electronic device 100 will definitely send the emergency rescue link establishment request frame during this process. The electronic device 200 may receive the emergency rescue link establishment request frame sent by the electronic device 100 and return the emergency rescue link establishment response frame to the electronic device 100. After receiving the emergency rescue link establishment response frame, the electronic device 100 successfully establishes the communication connection with the electronic device 200.

(B) in FIG. 6 shows a process in which the electronic device 200 sends a synchronization frame and the electronic device 100 receives the synchronization frame sent by the electronic device 200 and establishes the communication connection with the electronic device 200 under an indication of the synchronization frame.

As shown in (B) in FIG. 6, it is assumed that at a moment $t_{67}$, the electronic device 100 starts a search and rescue working cycle with duration $T_0$, and at a moment $t_{68}$, the electronic device 100 and the electronic device 200 start each search and rescue working cycle with duration $T_0$. As can be seen from the timing diagram when the two electronic devices works as shown in (B) of FIG. 6, at the moment $t_{68}$, the electronic device 100 is intercepting whether a signal sent by a rescue terminal exists in the environment, and the electronic device 200 is sending the synchronization frame outward. Accordingly, the electronic device 100 may receive the synchronization frame sent by the electronic device 200 and establish the communication connection with the electronic device 200 under the indication of the synchronization frame.

3. Low Power Consumption Help-Seeking Mode and Strong Rescue Mode

In this mode combination, the electronic device 100 works in the low power consumption help-seeking mode, and the electronic device 200 works in the strong rescue mode. At this time, the electronic device 100 may be referred to as a low power consumption help-seeking terminal, and the electronic device 200 may be referred to as a strong rescue terminal. For details of a link establishment manner and process of the electronic device 100 and the electronic device 200 in this mode combination, refer to FIG. 7.

Figure 7:
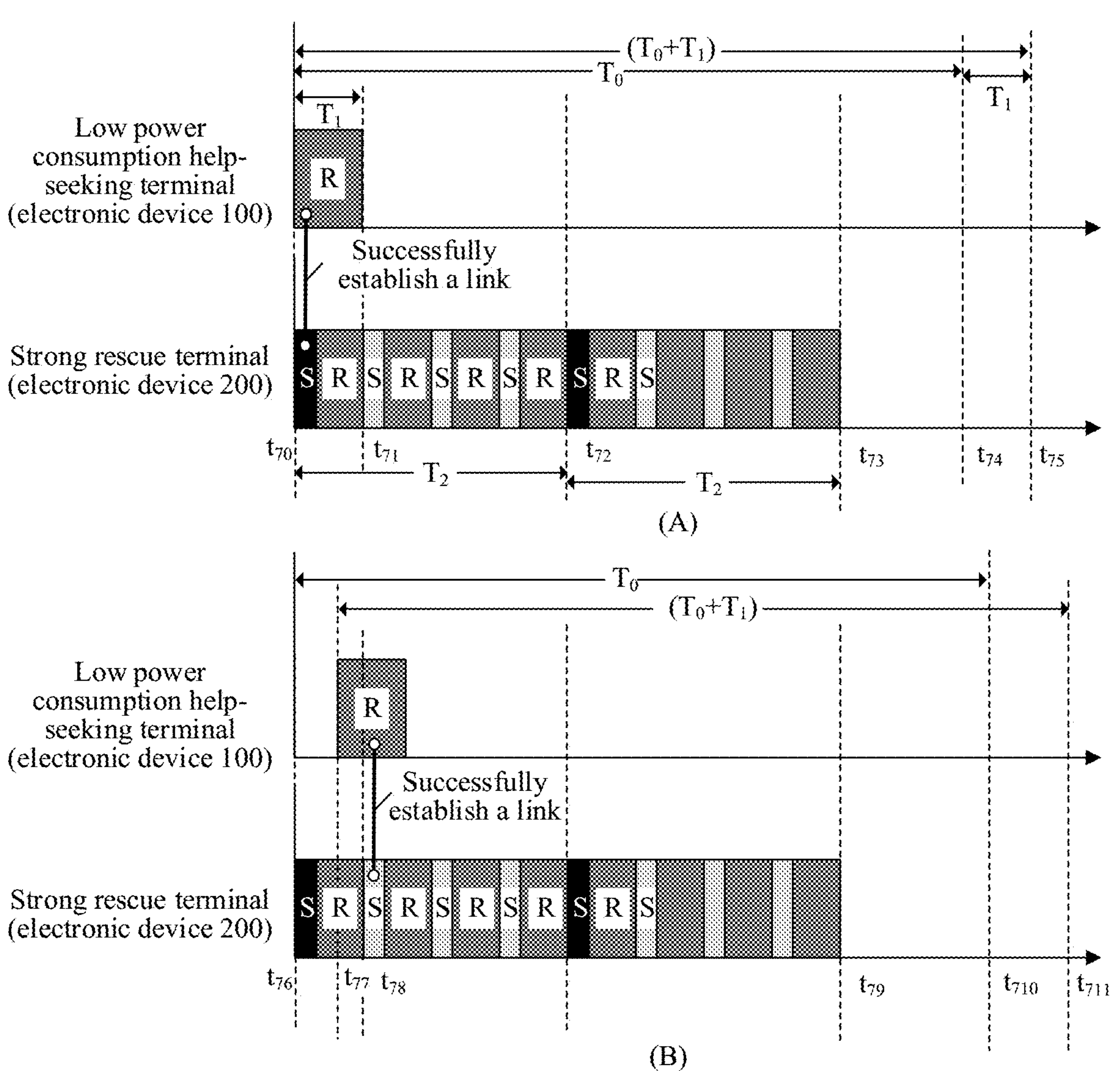
FIG. 7 is a schematic diagram of a process of establishing a link between a help-seeking terminal and a rescue terminal according to an embodiment of this application.

(A) in FIG. 7 shows a process in which the electronic device 200 sends a synchronization frame and the electronic device 100 receives the synchronization frame sent by the electronic device 200 and establishes a communication connection with the electronic device 200 under an indication of the synchronization frame.

As shown in (A) in FIG. 7, it is assumed that at a moment $t_{70}$, the electronic device 100 starts a search and rescue working cycle with cycle duration $(T_0+T_1)$, and the electronic device 200 starts, at the same time, a search and rescue working cycle with duration $T_0$. As can be seen from the timing diagram when the two electronic devices works as shown in (A) in FIG. 7, at the moment $t_{70}$, the electronic device 100 is intercepting whether a signal sent by a rescue terminal exists in the environment, and the electronic device 200 is sending the synchronization frame outward. Accordingly, the electronic device 100 may receive the synchronization frame sent by the electronic device 200 and establish the communication connection with the electronic device 200 under the indication of the synchronization frame.

(B) in FIG. 7 shows a process in which the electronic device 200 sends an emergency rescue link establishment request frame, the electronic device 100 returns an emergency rescue link establishment response frame to the electronic device 200 after receiving the emergency rescue link establishment request frame, and the electronic device 200 successfully establishes the communication connection with the electronic device 100 after receiving the emergency rescue link establishment response frame.

As shown in (B) in FIG. 7, the electronic device 200 starts a search and rescue working cycle with duration $(T_0+T_1)$ at a moment $t_{76}$, while the electronic device 100 starts a search and rescue working cycle with duration $T_0$ at a moment $t_{77}$. At the moment $t_{77}$, the electronic device 100 starts to intercept whether a signal sent by the rescue terminal exists in the environment, while the electronic device 200 is sending the emergency rescue link establishment request frame outward at this time. Therefore, after the moment $t_{77}$, the electronic device 100 may receive the emergency rescue link establishment request frame sent by the electronic device 200 and return the emergency rescue link establishment response frame to the electronic device 200. After receiving the emergency rescue link establishment response frame, the electronic device 200 may successfully establish the communication connection with the electronic device 100.

4. Low Power Consumption Help-Seeking Mode and Basic Rescue Mode

In this mode combination, the electronic device 100 works in the low power consumption help-seeking mode, and the electronic device 200 works in the basic rescue mode. At this time, the electronic device 100 may be referred to as a low power consumption help-seeking terminal, and the electronic device 200 may be referred to as a basic rescue terminal. For details of a link establishment manner and process of the electronic device 100 and the electronic device 200 in this mode combination, refer to FIG. 8.

Figure 8:
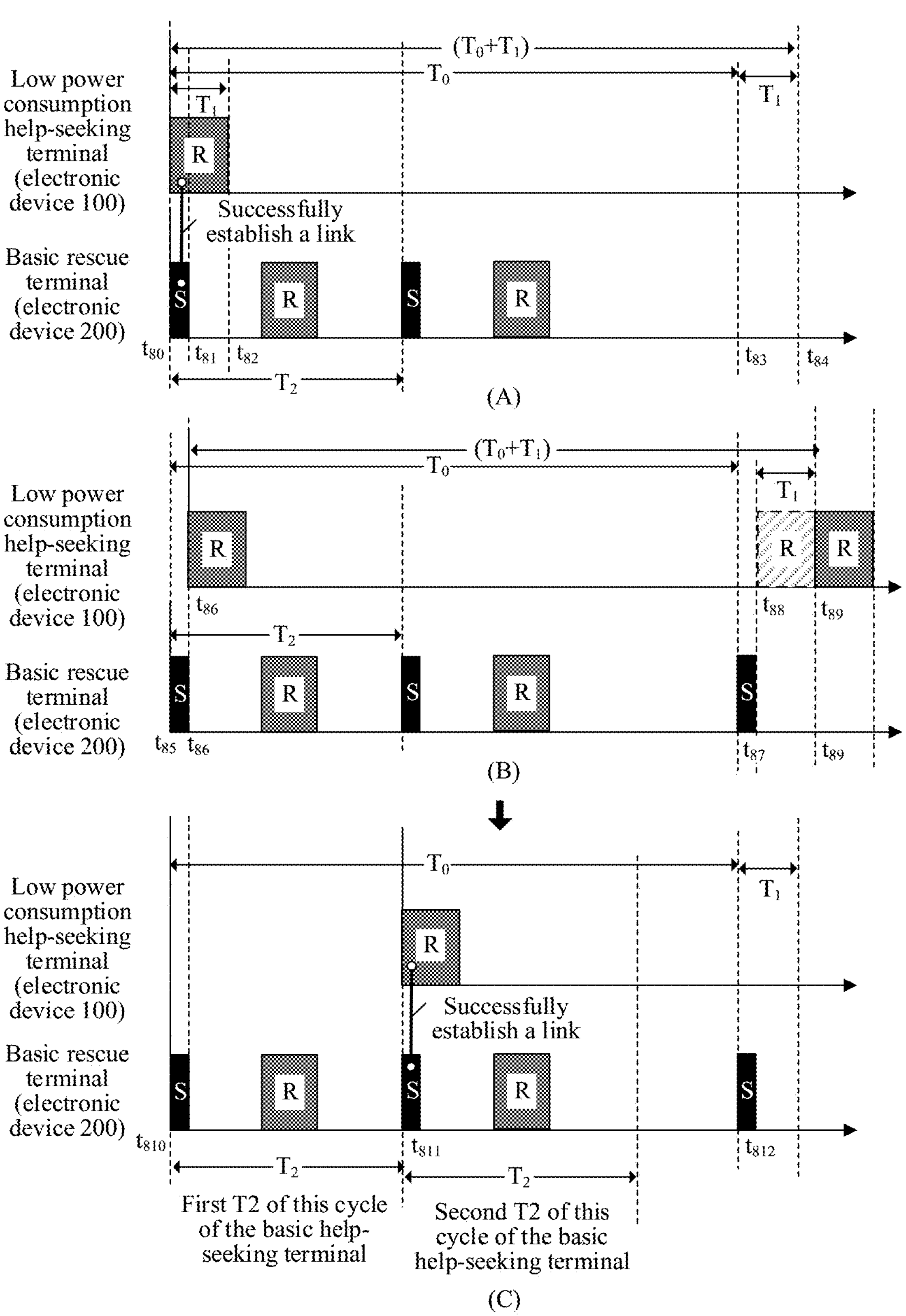
FIG. 8 is a schematic diagram of a process of establishing a link between a help-seeking terminal and a rescue terminal according to an embodiment of this application.

(A) in FIG. 8 shows a process in which, in the most ideal (shortest time) scenario for this mode combination, the electronic device 200 sends a synchronization frame and the electronic device 100 receives the synchronization frame sent by the electronic device 200 and establishes a communication connection with the electronic device 200 under an indication of the synchronization frame.

As shown in (A) in FIG. 8, it is assumed that at a moment $t_{80}$, the electronic device 100 starts a search and rescue working cycle with cycle duration $(T_0+T_1)$, and the electronic device 200 starts, at the same time, a search and rescue working cycle with duration $T_0$. As can be seen from the timing diagram when the two electronic devices works as shown in (A) of FIG. 8, at the moment $t_{80}$, the electronic device 100 is intercepting whether a signal sent by a rescue terminal exists in the environment, and the electronic device 200 is sending the synchronization frame outward. Accordingly, the electronic device 100 may receive the synchronization frame sent by the electronic device 200 and establish the communication connection with the electronic device 200 under the indication of the synchronization frame. Since it takes only several milliseconds for the electronic device 200 to send the synchronization frame, an entire link establishment process may be completed in a short time starting from the moment $t_{80}$.

It should be understood that in an actual search and rescue process, when a rescue terminal in a basic rescue mode just finished sending of a synchronization frame, a help-seeking terminal in a low power consumption help-seeking mode may just start intercepting of the signal. In this case, it takes a long time to establish a link between the rescue terminal and the help-seeking terminal. For details, refer to link establishment processes shown in (B) and (C) in FIG. 8.

As shown in (B) in FIG. 8, at a moment $t_{85}$, the electronic device starts a search and rescue working cycle with cycle duration $T_0$, namely, the moment $t_{85}$ to a moment $t_{87}$. However, at a moment $t_{86}$, the electronic device 100 starts a search and rescue working cycle with cycle duration ($T_0$+$T_1$), namely, a moment $t_{86}$ to the moment $t_{87}$ As can be seen from (B) in FIG. 8, at the moment $t_{85}$, the electronic device 200 starts to send the synchronization frame, while at the moment $t_{86}$, the electronic device 200 ends a synchronization frame sending process, and the electronic device 100 just starts to intercept a signal. Since the electronic device 100 is in the low power consumption help-seeking mode, at a time period from the moment $t_{86}$ to the a moment $t_{89}$, the electronic device will be in a dormant state, but a first search and rescue working cycle of the electronic device 200 ends at the moment $t_{87}$, that is, the electronic device 200 cannot successfully establish the link with the electronic device 100 in the first search and rescue working cycle.

However, with reference to the foregoing descriptions of FIG. 4, it can be seen that in the low power consumption help-seeking mode, duration $T_1$ in one complete search and rescue working cycle ($T_0$+$T_1$) of the rescue terminal may be considered as post duration between the complete search and rescue working cycle and a next search and rescue working cycle. When this post duration does not exist, search and rescue working cycles of the help-seeking terminal and the rescue terminal are the same, then for a case shown in (B) in FIG. 8, the electronic device 200 will start the next search and rescue working cycle at the moment $t_{87}$, starts to intercept sending of the synchronization frame, and ends a synchronization frame sending process of at a moment $t_{88}$, while the electronic device 100 just starts to intercept the signal at the moment $t_{88}$. In this way, the electronic device 200 and the electronic device 100 will never be able to successfully establish the link in a subsequent working cycle.

When this post duration exists between two search and rescue working cycles of the help-seeking terminal, a next search and rescue working cycle of the electronic device 100 should start at the moment $t_{89}$, while the electronic device 200 is still start a next search and rescue working cycle at the moment $t_{87}$. Although the electronic device 100 is still unable to successfully establish the link with the electronic device 200 in the search and rescue working cycle, and an interval between the moment $t_{89}$ and a moment at which the electronic device 200 sends the synchronization frame last time, namely, the moment $t_{88}$, is longer, in several subsequent search and rescue working cycles of the electronic device 100 and the electronic device 200, a moment at which the electronic device 100 performs passive interception will be delayed due to continuous accumulation of post duration between cycles. It is assumed that the moment $t_{86}$ to the moment $t_{89}$ are a first search and rescue working cycle of the electronic device 100, because a cycle in which the base rescue terminal sends the synchronization frame is $T_2$, a moment at which the electronic device 100 starts to perform passive interception in a $(T_2/T_1)^{th}$ search and rescue working cycle of the electronic device 100 is exactly a moment in which the electronic device 200 starts to send the synchronization frame in a second slicing cycle in a $(T_2/T_1)^{th}$ search and rescue working cycle of the electronic device 200. As shown in (C) in FIG. 8, at a moment $t_{810}$, the electronic device 200 starts the $(T_2/T_1)^{th}$ search and rescue working cycle, and at a moment $t_{811}$, the electronic device 200 ends a first slicing cycle of the $(T_2/T_1)^{th}$ search and rescue working cycle, and starts work of the second slicing cycle, that is, at the moment $t_{811}$, the electronic device 200 starts to send the synchronization frame outward. At the same time, at the moment $t_{811}$, the electronic device 100 starts the $(T_2/T_1)^{th}$ search and rescue working cycle, that is, at the moment $t_{811}$, the electronic device 100 starts interception of a signal. Accordingly, after the moment $t_{811}$, the electronic device 100 may receive the synchronization frame sent by the electronic device 200 and establish the communication connection with the electronic device 200 under an indication of the synchronization frame.

It may be understood that FIG. 5 to FIG. 8 only exemplarily show process in which the electronic device 100 and the electronic device 200 in a working mode combination establish a link. A specific form of the process is for the convenience of understanding of readers only, and should not constitute a limitation on embodiments of this application. In an actual scenario, manners and time consuming of establishing the link by the electronic device 100 and the electronic device 200 in various working mode combinations may be changed based on start moments of respective search and rescue working cycles of the electronic device 100 and the electronic device 200, an alternate order of signal sending and receiving in the respective search and rescue working cycles of the electronic device 100 and the electronic device 200, and a sleep time period.

Next, specific workflows of an electronic device under the above four working modes is described with reference to FIG. 9 to FIG. 12.

Figure 9:
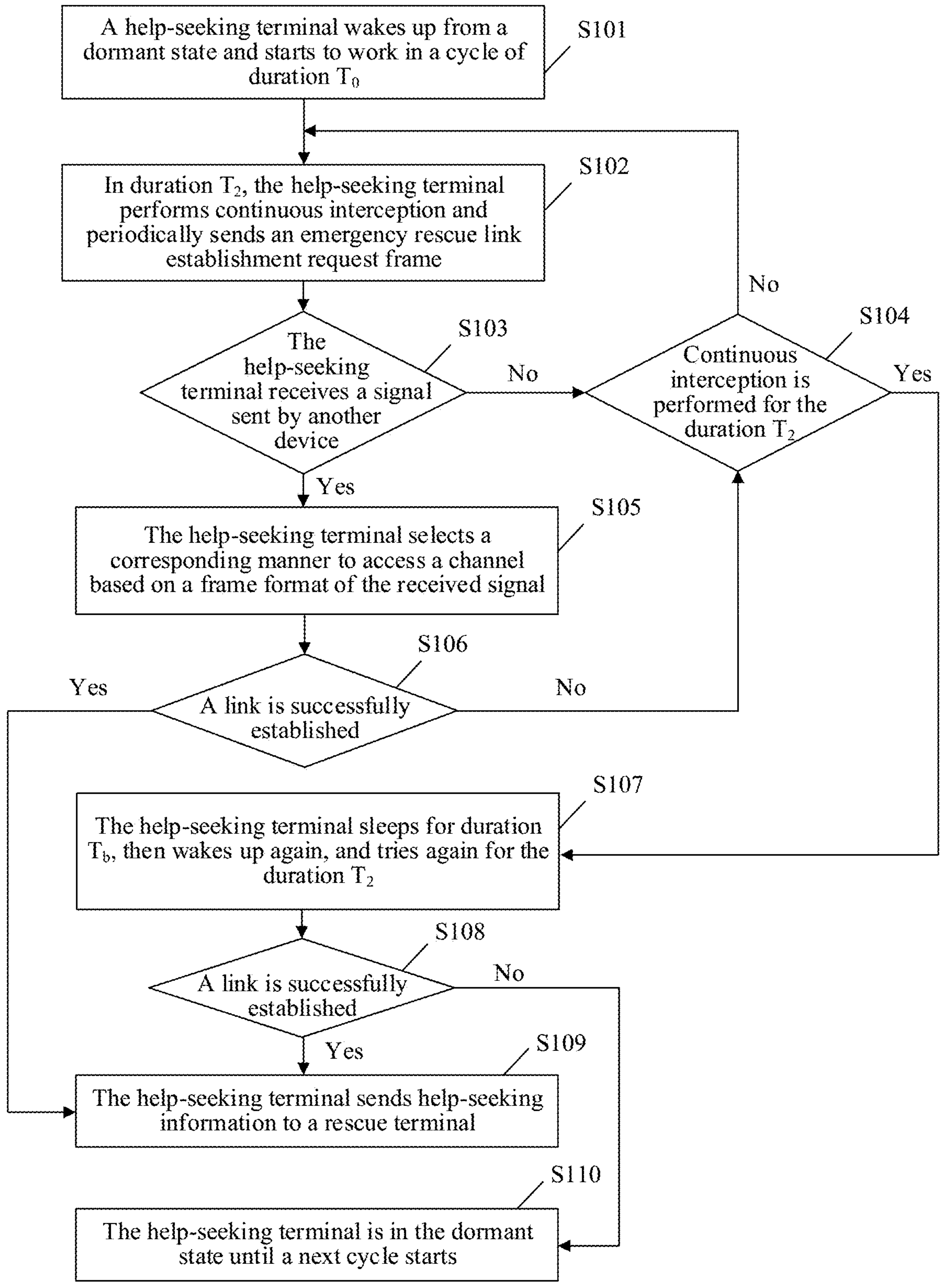
FIG. 9 is a flowchart of a communication method according to an embodiment of this application.

FIG. 9 is a flowchart of a communication method according to an embodiment of this application. The method may be implemented based on the above-mentioned electronic device 100 or electronic device 200 in a working mode of a strong help-seeking mode. A terminal used for implementing the method may be referred to as a strong help-seeking terminal. When implementing the method, the strong help-seeking terminal periodically carries out search and rescue work, and effectively plans time ratios of sending, interception, and sleeping of the strong help-seeking terminal in one search and rescue working cycle. This helps save electric power of the help-seeking terminal and results in a faster rescue speed when a synchronization frame and an emergency rescue link establishment request frame sent by any rescue terminal around the help-seeking terminal, whether in "strong rescue" or "basic rescue", will be processed and fed back in a continuous interception stage of strong help-seeking. As shown in FIG. 9, the method provided in embodiments of this application may include:

S101: A help-seeking terminal wakes up from a dormant state and starts to work in a cycle of duration $T_0$.

The help-seeking terminal may be the electronic device 100 or the electronic device 200 described above.

Specifically, the help-seeking terminal may receive an operation instruction of a user, to determine and start a help-seeking mode of the help-seeking terminal as a strong help-seeking mode.

In embodiments of this application, before the help-seeking terminal successfully establishes a link with another rescue terminal or electric power is exhausted, the help-seeking terminal will periodically perform processes such as alternate receiving and sending of signals and sleeping in the cycle of the duration $T_0$. Here, $T_0$ may be any duration, for example, 8192 ms.

S102: In duration $T_2$, the help-seeking terminal performs continuous interception and periodically sends an emergency rescue link establishment request frame.

When the help-seeking terminal enters a working cycle when the dormant state ends, in one complete search and rescue working cycle with the duration $T_0$, the help-seeking terminal will continuously intercept a signal in an environment in a time period with duration $T_2$ in the cycle. In the time period with the duration $T_2$, the help-seeking terminal will periodically actively send the emergency rescue link establishment request frame outward, and the emergency rescue link establishment request frame may be received by a rescue terminal in the environment. After receiving the emergency rescue link establishment request frame, the rescue terminal may send an emergency rescue link establishment response frame to the help-seeking terminal, so as to complete establishment of a communication connection between each other. Here, $T_2$ may be any duration, for example, 512 ms.

It should be understood that in the above duration $T_2$, actions of intercepting a signal and sending the emergency rescue link establishment request frame by the help-seeking terminal are alternately carried out, that is, when the help-seeking terminal is intercepting the signal, the help-seeking terminal will not send the emergency rescue link establishment request frame, and when the help-seeking terminal starts to send the emergency rescue link establishment request frame, the help-seeking terminal will temporarily suspend a signal interception process. For a specific process, refer to the related descriptions of (A) in FIG. 4.

In addition, in the above duration $T_2$, processes of intercepting the signal and sending the emergency rescue link establishment request frame by the help-seeking terminal may be continuous, that is, in a process of intercepting the signal and sending the emergency rescue link establishment request frame alternately by the help-seeking terminal, when the help-seeking terminal finishes sending the emergency rescue link establishment request frame, the help-seeking terminal may immediately start to intercept the signal. It is assumed here that a sum of duration of interception and request frame sending that are continuously performed by the help-seeking terminal once is $T_1$, $T_1$ can be referred to as one emergency rescue frame cycle. Electric power consumed by the help-seeking terminal to intercept the signal is far less than electric power consumed by the help-seeking terminal to send the signal. Therefore, in one emergency rescue frame cycle, the help-seeking terminal only spends very little time to send the emergency rescue link establishment request frame, and the rest time is used for interception. For example, the above $T_1$ may be 64 ms, of which 3 ms to 5 ms are used to send the emergency rescue link establishment request frame, and the remaining approximately 60 ms are used to intercept the signal in the environment.

S103: The help-seeking terminal determines whether a signal sent by another device is received.

S104: The help-seeking terminal determines whether continuous interception is performed for the duration $T_2$.

The help-seeking terminal continuously alternately intercepts the signal and sends the emergency rescue link establishment request frame in the duration $T_2$. In the duration $T_2$, when the help-seeking terminal intercepts a signal frame sent by the rescue terminal (where the signal frame may be an emergency rescue link establishment request frame sent by the rescue terminal, a synchronization frame sent by the rescue terminal, or an emergency rescue link establishment response frame returned by the rescue terminal after receiving the emergency rescue link establishment request frame sent by the help-seeking terminal), the rescue terminal may then perform a subsequent step S105. If a time period corresponding to the duration $T_2$ ends, when the help-seeking terminal fails to successfully establish a link with another rescue terminal, help-seeking terminal will perform a subsequent step S107.

S105: The help-seeking terminal selects a corresponding manner to access a channel based on a frame format of the received signal.

With reference to the above descriptions, it can be seen that the signal that is sent by the rescue terminal and that is received by the help-seeking terminal may include: the emergency rescue link establishment request frame sent by the rescue terminal, the synchronization frame sent by the rescue terminal, or the emergency rescue link establishment response frame returned by the rescue terminal after receiving the emergency rescue link establishment request frame sent by the help-seeking terminal. Different signal frames have different frame formats, and the help-seeking terminal may determine a signal type based on the frame format of the received signal, and adopt a corresponding link establishment manner to establish the link with the rescue terminal. When the help-seeking terminal may receive a signal frame and a “Rescue” bit in a frame format of the signal frame is marked as “1”, the rescue terminal may determine that the signal is the emergency rescue link establishment request frame sent by the rescue terminal.

After receiving the signal sent by the rescue device, the help-seeking terminal may select a corresponding manner to access a channel based on the frame format of the signal. For details, refer to the foregoing related descriptions of FIG. 5 and FIG. 6. Details are not described herein again.

In addition, in an actual rescue process, there are likely to be other trapped persons in the environment, so there are also likely to be emergency rescue link establishment request frames sent by other help-seeking terminals in the environment. Although the help-seeking terminal may also receive the emergency rescue link establishment request frames sent by the other help-seeking terminals, the help-seeking terminal may also distinguish whether the emergency rescue link establishment request frame is sent by the other help-seeking terminals or the rescue terminal based on the frame format. When the emergency rescue link establishment request frame is sent by another terminal which is also a help-seeking terminal, without processing the emergency rescue link establishment request frame.

S106: The help-seeking terminal determines whether the link is successfully established.

After receiving the signal sent by the rescue terminal and attempting to establish the link with the rescue terminal with the support of the signal, if the help-seeking terminal successfully establishes the link with the rescue terminal, the help-seeking terminal may perform a step S109. Alternatively, after the help-seeking terminal receives the signal sent by the rescue terminal, due to some other reasons (such as signal delay and interference between signals), if the link between the two terminals cannot be successfully established, and if the help-seeking terminal does not perform continuous interception for the duration $T_2$ at this time, before interception duration has not reached the above duration $T_2$, the help-seeking terminal will continuously alternately intercept the signal and send the emergency rescue link establishment request frame, and continue to work based on an execution flow of the aforementioned steps S102 to S106.

S107: The help-seeking terminal sleeps for duration $T_b$, then wakes up again, and tries again for the duration $T_2$.

If the help-seeking terminal fails to establish the connection with the another rescue terminal after the help-seeking terminal performs continuous interception for the duration $T_2$, the rescue terminal will momentarily sleep for the duration $T_1$, then wake up again, and tries again for the duration $T_2$. It should be understood that in this search and rescue working cycle which may include two slicing cycles with the duration $T_2$, the above steps S102 to S106 are all completed in a first slicing cycle. When the help-seeking terminal fails to establish the connection with the another rescue terminal in the first slicing cycle, the reason why the two terminals cannot successfully establish the link may be that the help-seeking terminal and the rescue terminal have been receiving signals synchronously or sending signals synchronously in respective search and rescue working cycles. Therefore, the help-seeking terminal may repeat a process of sending and receiving the signal again, and offset a start moment of the process of sending and receiving the signal backward by one segment of duration, namely, the duration $T_b$. Specifically, specific duration of $T_b$ may be half of the emergency rescue frame cycle, that is, $T_1=2T_b$. In this way, in a second slicing cycle, the help-seeking terminal may successfully establish the link with the rescue terminal. For details, refer to the related descriptions of (A) in FIG. 5. Details are not described herein again.

S108: The help-seeking terminal determines whether the link is successfully established.

After the second slicing cycle with the duration $T_2$ ends, that is, after the help-seeking terminal performs continuous interception again for the duration $T_2$, if the help-seeking terminal fails to establish the connection with the another rescue terminal, it means that rescue personnel may not approach the trapped person, there is no rescue terminal in the ambient environment, and then the help-seeking terminal will perform a step S110. If the help-seeking terminal successfully establishes the link with the rescue terminal in the second slicing cycle, the help-seeking terminal may perform a step S109.

S109: The help-seeking terminal sends help-seeking information to the rescue terminal.

If the help-seeking terminal successfully establishes the connection with the rescue terminal in the first slicing cycle (first duration $T_2$) or the second slicing cycle (second duration $T_2$), the help-seeking terminal may send the help-seeking information to the rescue terminal. For example, after the connection is established, the help-seeking terminal may automatically send personal information of the user shown in (B) in FIG. 3 to the rescue terminal; or the help-seeking terminal may send other help-seeking information (for example, a quantity of trapped people or a trapped position) to the rescue terminal in response to another operation of the user. This is not limited in this application.

S110: The help-seeking terminal is in a dormant state until a next cycle starts.

After the second slicing cycle with the duration $T_2$ ends, if the help-seeking terminal fails to establish the connection with the another rescue terminal, it means that rescue personnel may not approach the trapped person, and the help-seeking terminal will be in the dormant state for a long time in order to save electric energy. For example, if the help-seeking terminal performs continuous interception for the duration $T_2$ at the beginning of each search and rescue cycle (that is, as shown in (A) in FIG. 4, a start moment of the first slicing cycle is a start moment of the entire search and rescue working cycle), if the help-seeking terminal fails to establish the connection with the another rescue terminal after the second slicing cycle with the duration $T_2$ ends, the help-seeking terminal will be in a dormant period with duration $(T_0-2T_2-T_b)$, until a next search and rescue working cycle starts.

Figure 10:
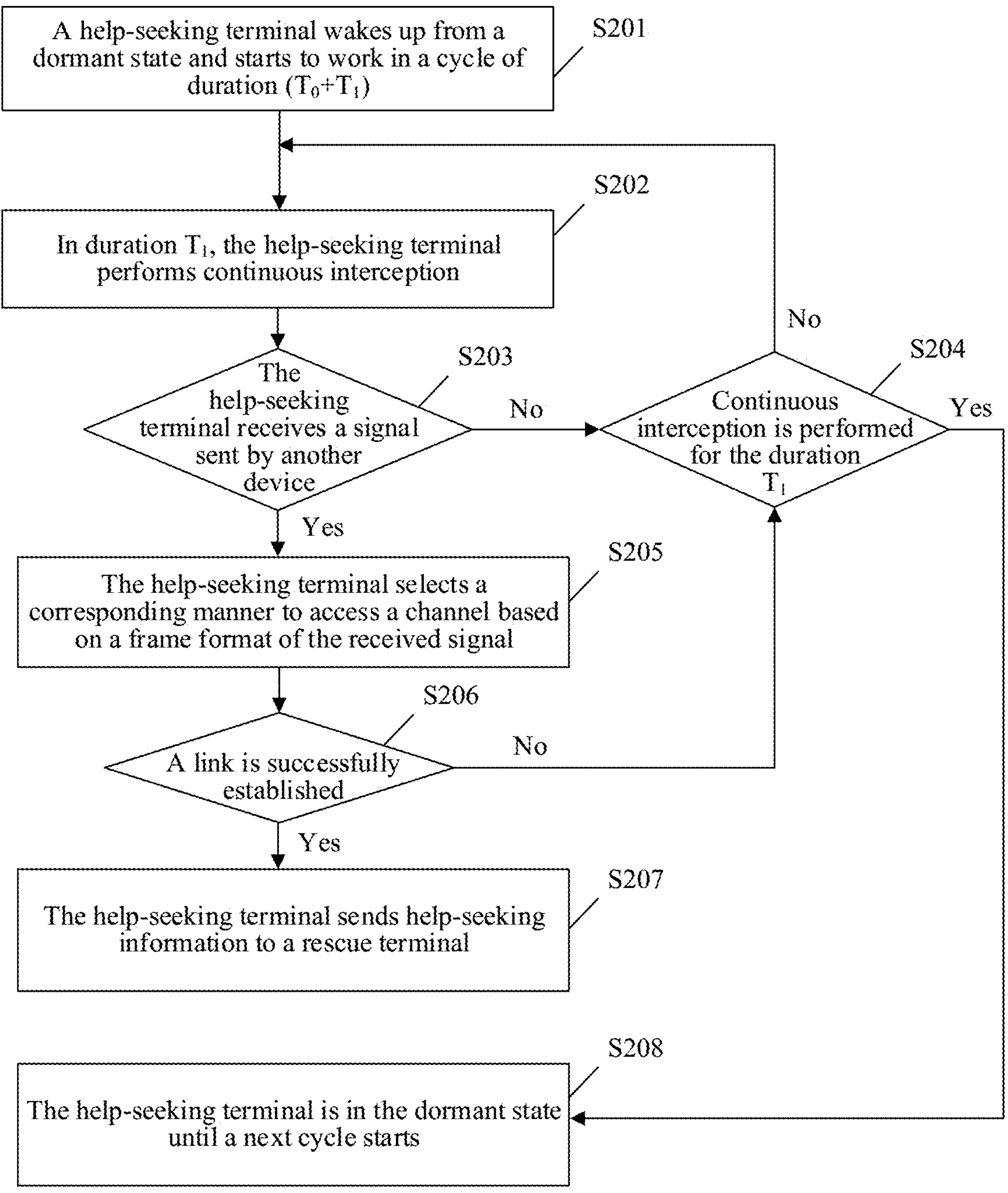
FIG. 10 is a flowchart of a communication method according to an embodiment of this application.

FIG. 10 is a flowchart of a communication method according to an embodiment of this application. The method may be implemented based on the above-mentioned electronic device 100 or electronic device 200 in a working mode of a low power consumption help-seeking mode. A terminal used for implementing the method may be referred to as a low power consumption help-seeking terminal. When implementing the method, the low power consumption help-seeking terminal periodically carries out search and rescue work, and effectively plans time ratios of sending, interception, and sleeping of the low power consumption help-seeking terminal in one search and rescue working cycle, to save electric power of the help-seeking terminal. At the same time, an emergency rescue link establishment request frame sent by any effective terminal that is around the help-seeking terminal and that is in "strong rescue" is fed back, and the link establishment is completed. If there is a synchronization node terminal in "basic rescue" nearby, a synchronization frame will also be captured due to an offset of an emergency rescue frame cycle in a time period, and then access is attempted to be initiated on an access channel indicated by the synchronization frame. As shown in FIG. 10, the method provided in embodiments of this application may include:

S201: A help-seeking terminal wakes up from a dormant state and start to work in a cycle of duration $(T_0+T_1)$.

The help-seeking terminal may be the electronic device 100 or the electronic device 200 described above.

Specifically, the help-seeking terminal may receive an operation instruction of a user, to determine and start a help-seeking mode of the help-seeking terminal as a low power consumption help-seeking mode.

In embodiments of this application, before the help-seeking terminal in the low power consumption help-seeking mode successfully establishes a link with another rescue terminal or electric power is exhausted, the help-seeking terminal will periodically perform processes such as signal interception and sleeping in the cycle of the duration $(T_0+T_1)$. Here, $T_1$ and $T_0$ may be any duration, for example, To may be 8192 ms, and $T_1$ may be 64 ms.

S202: In duration $T_1$, the help-seeking terminal performs continuous interception.

In the duration $T_1$, the help-seeking terminal performs continuous interception and periodically sends an emergency rescue link establishment request frame.

When the help-seeking terminal enters a working cycle when the dormant state ends, in one complete search and rescue working cycle with the duration $(T_0+T_1)$, the help-seeking terminal will continuously intercept a signal in an environment in a time period with duration $T_1$ in the cycle. Here, $T_2$ may be any duration, for example, 512 ms.

It should be understood that in the above duration $T_2$, actions of intercepting a signal and sending the emergency rescue link establishment request frame by the help-seeking terminal are alternately carried out, that is, when the help-seeking terminal is intercepting the signal, the help-seeking terminal will not send the emergency rescue link establishment request frame, but in order to save electric energy, the help-seeking terminal will not actively send the emergency rescue link establishment request frame in the entire working cycle. For a specific process, refer to the related descriptions of (B) in FIG. 4.

S203: The help-seeking terminal determines whether a signal sent by another device is received.

S204: The help-seeking terminal determines whether continuous interception is performed for the duration $T_1$.

Before the end of a time period corresponding to the above duration $T_1$, the help-seeking terminal continuously intercepts the signal in the duration $T_1$. In a time period corresponding to the duration $T_2$, when the help-seeking terminal intercepts a signal frame sent by the rescue terminal (where the signal frame may be an emergency rescue link establishment request frame sent by the rescue terminal or a synchronization frame sent by the rescue terminal), the rescue terminal may then perform a subsequent step S205. If the duration $T_2$ ends, when the help-seeking terminal fails to successfully establish a link with another rescue terminal, the help-seeking terminal will perform a subsequent step S208.

S205: The help-seeking terminal selects a corresponding manner to access a channel based on a frame format of the received signal.

With reference to the above descriptions, it can be seen that the signal that is sent by the rescue terminal and that is received by the help-seeking terminal may include: the emergency rescue link establishment request frame sent by the rescue terminal and the synchronization frame sent by the rescue terminal. Different signal frames have different frame formats, and the help-seeking terminal may determine a signal type based on the frame format of the received signal, and adopt a corresponding link establishment manner to establish the link with the rescue terminal. For details, refer to the foregoing related descriptions of FIG. 7 and FIG. 8. Details are not described herein again.

S206: The help-seeking terminal determines whether the link is successfully established.

After receiving the signal sent by the rescue terminal and attempting to establish the link with the rescue terminal with the support of the signal, if the help-seeking terminal successfully establishes the link with the rescue terminal, the help-seeking terminal may perform a step S207. Alternatively, after the help-seeking terminal receives the signal sent by the rescue terminal, due to some other reasons (such as signal delay and interference between signals), if the link between the two terminals cannot be successfully established, and if the help-seeking terminal does not perform continuous interception for the duration $T_1$ at this time, before interception duration has not reached the above duration $T_1$, the help-seeking terminal will continuously alternately intercept the signal and send the emergency rescue link establishment request frame, and continue to work based on an execution flow of the aforementioned steps S202 to S206.

S207: The help-seeking terminal sends help-seeking information to the rescue terminal.

If the help-seeking terminal successfully establishes the connection with the rescue terminal in the time period corresponding to the above duration $T_1$, the help-seeking terminal may send the help-seeking information to the rescue terminal. For details, refer to the foregoing related descriptions of the step S109. Details are not described herein again.

S208: The help-seeking terminal is in a dormant state until a next cycle starts.

After the time period corresponding to the above duration $T_1$ ends, if the help-seeking terminal fails to establish the connection with the another rescue terminal, the help-seeking terminal will be in the dormant state for a long time in order to save electric energy. For example, if the help-seeking terminal performs continuous interception for the duration $T_1$ at the beginning of each search and rescue cycle (that is, as shown in (B) in FIG. 4, a moment of starting interception by the help-seeking terminal is a start moment of the entire search and rescue working cycle), if the help-seeking terminal fails to establish the connection with the another rescue terminal after the time period corresponding to the above duration $T_1$ ends, the help-seeking terminal will be in a dormant period with the duration $T_0$, until a next search and rescue working cycle starts.

It should be noted that the duration $T_1$ in the complete search and rescue working cycle ($T_0$+$T_1$) of the help-seeking terminal in the low power consumption mode can be considered as post duration between two continuous search and rescue working cycles $T_0$. This post duration may prevent a link establishment failure because a surrounding rescue terminal in the basic rescue mode is just in a dormant period when the electronic device acts as the help-seeking terminal to send a link establishment request frame in each cycle. For details, refer to the foregoing related descriptions of FIG. 8. Details are not described herein again.

Figure 11:
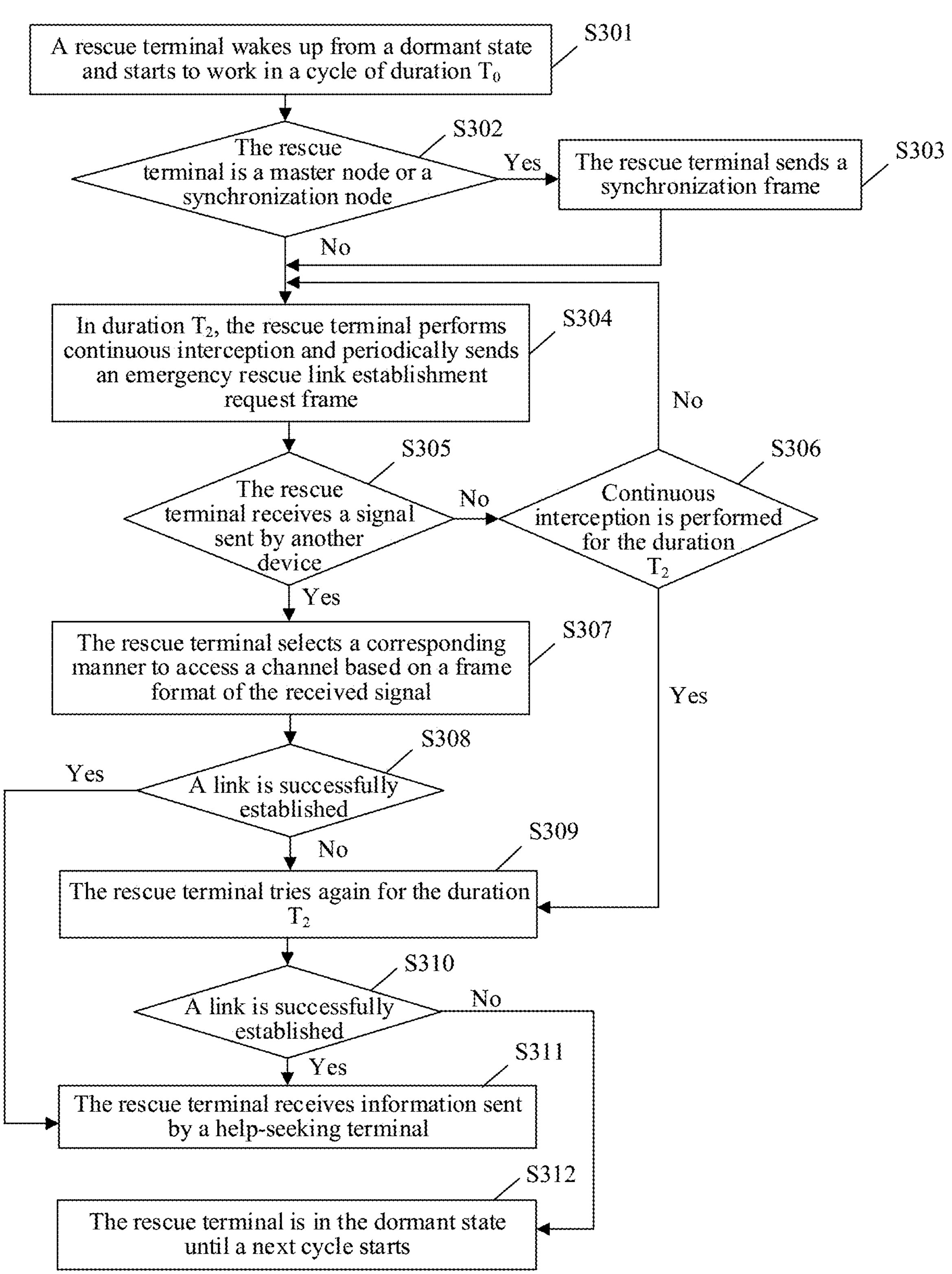
FIG. 11 is a flowchart of a communication method according to an embodiment of this application.

FIG. 11 is a flowchart of a communication method according to an embodiment of this application. The method may be implemented based on the above-mentioned electronic device 100 or electronic device 200 in a working mode of a strong rescue mode. A terminal used for implementing the method can be referred to as a strong rescue terminal. When implementing the method, the strong rescue terminal periodically performs search and rescue work, and effectively plans time ratios of sending, interception, and sleeping of the strong rescue terminal in one search and rescue working cycle, so that the strong rescue terminal can quickly establish a communication connection with a help-seeking terminal in a strong help-seeking mode and a low power consumption help-seeking mode. As shown in FIG. 11, the method provided in embodiments of this application may include:

S301: A rescue terminal wakes up from a dormant state and starts to work in a cycle of duration $T_0$.

The rescue terminal may be the electronic device 100 or the electronic device 200 described above.

Specifically, the rescue terminal may receive an operation instruction of a user, to determine and start a rescue mode of the rescue terminal as a strong rescue mode.

In embodiments of this application, before the help-seeking terminal successfully establishes a link with another rescue terminal or electric power is exhausted, the rescue terminal will periodically perform processes such as alternate receiving and sending of signals and sleeping in the cycle of the duration $T_0$. Here, $T_0$ may be any duration, for example, 8192 ms.

S302: Determine whether the rescue terminal is a master node or a synchronization node.

S303: The rescue terminal sends a synchronization frame.

When the rescue terminal is a master node or synchronization node of an ad hoc network, the rescue terminal will periodically send the synchronization frame on a broadcast channel, and the help-seeking terminal may initiate access on a random access channel indicated by the synchronization frame sent by the rescue terminal. The synchronization frame includes a precise timestamp and node information of a sending end node, and based on the precise timestamp and the node information, a device receiving the synchronization frame (for example, the help-seeking terminal) may calculate a time-frequency position of the sending end node in each working channel and establish a connection with the sending end node at the corresponding time-frequency position. Duration of a sending cycle of the synchronization frame may be duration $T_2$. When the rescue terminal is not the master node or the synchronization node of the ad hoc network, the rescue terminal only sends an emergency rescue link establishment request frame and an emergency rescue link establishment request response frame outward, but does not send the synchronization frame outward, that is, the rescue terminal does not perform a step S303.

S304: In the duration $T_2$, the rescue terminal performs continuous interception and periodically sends the emergency rescue link establishment request frame.

When the rescue terminal enters a working cycle when the dormant state ends, in one complete search and rescue working cycle with the duration $T_0$, the rescue terminal will continuously intercept a signal in an environment in a time period with the duration $T_2$ in the cycle. In the time period with the duration $T_2$, the rescue terminal will periodically actively send the emergency rescue link establishment request frame outward, and the emergency rescue link establishment request frame may be received by a help-seeking terminal in the environment. After receiving the emergency rescue link establishment request frame, the help-seeking terminal may send an emergency rescue link establishment response frame to the rescue terminal, so as to complete establishment of a communication connection between each other. Here, $T_2$ may be any duration, for example, 512 ms.

It should be understood that in the above duration $T_2$, actions of intercepting the signal and sending the emergency rescue link establishment request frame by the rescue terminal are alternately carried out, that is, when the rescue terminal is intercepting the signal, the rescue terminal will not send the emergency rescue link establishment request frame, and when the rescue terminal starts to send the emergency rescue link establishment request frame, the rescue terminal will temporarily suspend a signal interception process. For a specific process, refer to the related descriptions of (C) in FIG. 4.

S305: The rescue terminal determines whether a signal sent by another device is received.

S306: The rescue terminal determines whether continuous interception is performed for the duration $T_2$.

The rescue terminal continuously alternately intercepts the signal and sends the emergency rescue link establishment request frame in the duration $T_2$. In the duration $T_2$, when the rescue terminal intercepts a signal frame sent by the help-seeking terminal (where the signal frame may be an emergency rescue link establishment request frame sent by the help-seeking terminal, an access request signal returned by the help-seeking terminal after receiving the synchronization frame sent by the rescue terminal, or an emergency rescue link establishment response frame returned by the help-seeking terminal after receiving the emergency rescue link establishment request frame sent by the rescue terminal), the rescue terminal may then perform a subsequent step S307. If a time period corresponding to the duration $T_2$ ends, when the rescue terminal fails to successfully establish a link with another help-seeking terminal, the rescue terminal will perform a subsequent step S309.

S307: The rescue terminal selects a corresponding manner to access a channel based on a frame format of the received signal.

With reference to the above descriptions, it can be seen that the signal that is sent by the rescue terminal and that is received by the rescue terminal may include: an emergency rescue link establishment request frame sent by the help-seeking terminal, a response frame returned the help-seeking terminal after receiving the synchronization frame sent by the rescue terminal, or an emergency rescue link establishment response frame returned by the help-seeking terminal after receiving the emergency rescue link establishment request frame sent by the rescue terminal. Different signal frames have different frame formats, and the help-seeking terminal may determine a signal type based on the frame format of the received signal, and adopt a corresponding link establishment manner to establish the link with the rescue terminal.

After receiving the signal sent by the rescue device, the help-seeking terminal may select a corresponding manner to access a channel based on the frame format of the signal. For details, refer to the foregoing related descriptions of FIG. 5 and FIG. 7. Details are not described herein again.

In addition, in an actual rescue process, there are likely to be other trapped persons in the environment, so there are also likely to be emergency rescue link establishment request frames sent by other rescue terminals in the environment. Although the rescue terminal may also receive the emergency rescue link establishment request frames sent by the other help-seeking terminals, the help-seeking terminal may also distinguish whether the emergency rescue link establishment request frame is sent by the other rescue terminals or the help-seeking terminal based on the frame format. When the emergency rescue link establishment request frame is sent by another terminal which is also a rescue terminal, the rescue terminal may ignore the emergency rescue link establishment request frame without processing the emergency rescue link establishment request frame.

S308: The rescue terminal determines whether the link is successfully established.

After receiving the signal sent by the help-seeking terminal and attempting to establish the link with the help-seeking terminal with the support of the signal, if the rescue terminal successfully establishes the link with the help-seeking terminal, the rescue terminal may perform a step S311. Alternatively, after the rescue terminal receives the signal sent by the help-seeking terminal, due to some other reasons (such as signal delay and interference between signals), if the link between the two terminals cannot be successfully established, and if the rescue terminal does not perform continuous interception for the duration $T_2$ at this time, before interception duration has not reached the above duration $T_2$, the rescue terminal will continuously alternately intercept the signal and send the emergency rescue link establishment request frame, and continue to work based on an execution flow of the aforementioned steps S302 to S308.

S309: The rescue terminal tries again for the duration $T_2$.

After the rescue terminal performs continuous interception for the duration $T_2$, if the rescue terminal fails to establish a connection with another help-seeking terminal, the rescue terminal will immediately try to perform interception again for the duration $T_2$ at the end of a time period corresponding to first duration $T_2$. It should be understood that in this search and rescue working cycle which may include two slicing cycles with the duration $T_2$, the above steps S302 to S306 are all completed in a first slicing cycle. When the rescue terminal fails to establish the connection with the another help-seeking terminal in the first slicing cycle, the reason why the two terminals cannot successfully establish the link may be that the help-seeking terminal and the rescue terminal have been receiving signals synchronously or sending signals synchronously in respective search and rescue working cycles. Therefore, because in a second slicing cycle, the help-seeking terminal in the strong help-seeking mode will offset its operation backward for one segment of duration, namely, the aforementioned duration $T_b$, the rescue terminal may successfully establish the link with the help-seeking terminal in the strong help-seeking mode in the second slicing cycle. For details, refer to the related descriptions of (A) in FIG. 5. Details are not described herein again.

S310: The rescue terminal determines whether the link is successfully established.

After the second slicing cycle with the duration $T_2$ ends, that is, after the rescue terminal performs continuous interception again for the duration $T_2$, if the rescue terminal fails to establish the connection with the another help-seeking terminal, it means that rescue personnel may not approach the trapped person, and then the rescue terminal will perform a step S312. If the rescue terminal successfully establishes the link with the help-seeking terminal in the second slicing cycle, the rescue terminal may perform a step S311.

S311: The rescue terminal receives information sent by the help-seeking terminal.

If the rescue terminal successfully establishes the connection with the help-seeking terminal in the first slicing cycle (the first duration $T_2$) or the second slicing cycle (second duration $T_2$), the rescue terminal may receive help-seeking information sent by the help-seeking terminal. For details, refer to the foregoing related descriptions of the step S109. Details are not described herein again.

S312: The rescue terminal is in a dormant state until a next cycle starts.

After the second slicing cycle with the duration $T_2$ ends, if the rescue terminal fails to establish the connection with the another help-seeking terminal, it means that rescue personnel may not approach the trapped person, and the rescue terminal may be in the dormant state for a long time. For example, if the rescue terminal performs continuous interception for the duration $T_2$ at the beginning of each search and rescue cycle (that is, as shown in (C) in FIG. 4, a start moment of the first slicing cycle is a start moment of the entire search and rescue working cycle), if the rescue terminal fails to establish the connection with the another help-seeking terminal after the second slicing cycle with the duration $T_2$ ends, the rescue terminal will be in a dormant period with duration $(T_0-2T_2)$, until a next search and rescue working cycle starts.

Figure 12:
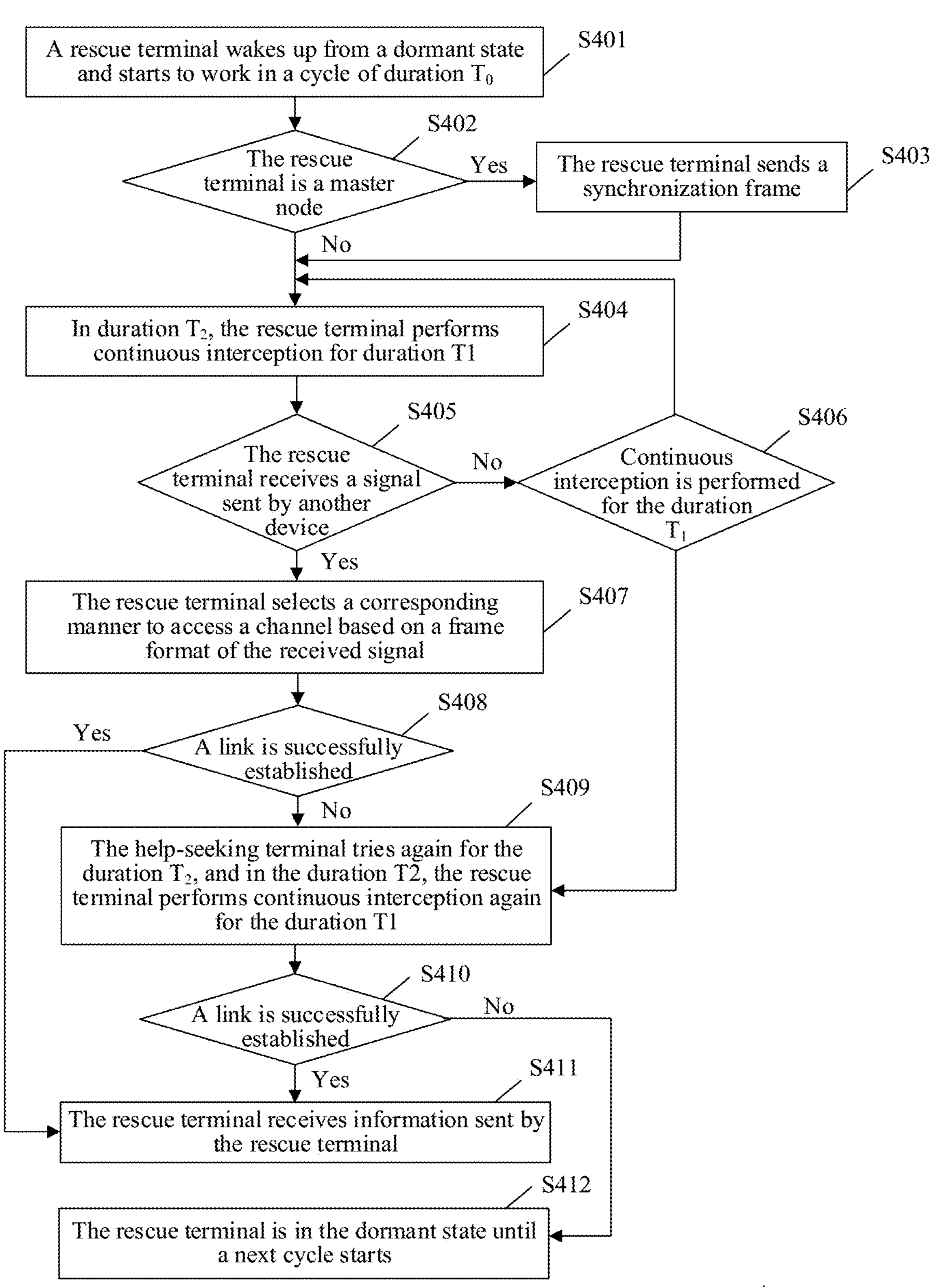
FIG. 12 is a flowchart of a communication method according to an embodiment of this application.

FIG. 12 is a flowchart of a communication method according to an embodiment of this application. The method may be implemented based on the above-mentioned electronic device 100 or electronic device 200 in a working mode of a basic rescue mode. A terminal used for implementing the method can be referred to as a basic rescue terminal. When implementing the method, the basic rescue terminal periodically performs search and rescue work, so that the basic rescue terminal can quickly establish a communication connection with a help-seeking terminal in a strong help-seeking mode on the premise of greatly saving electric energy of the rescue terminal. As shown in FIG. 12, the method provided in embodiments of this application may include:

S401: A rescue terminal wakes up from a dormant state and starts to work in a cycle of duration $T_0$.

The rescue terminal may be the electronic device 100 or the electronic device 200 described above.

Specifically, the rescue terminal may receive an operation instruction of a user, to determine and start a rescue mode of the rescue terminal as a basic rescue mode.

In embodiments of this application, before the help-seeking terminal successfully establishes a link with another rescue terminal or electric power is exhausted, the rescue terminal will periodically perform processes such as alternate receiving and sending of signals and sleeping in the cycle of the duration $T_0$. Here, $T_0$ may be any duration, for example, 8192 ms.

S402: Determine whether the rescue terminal is a synchronization node.

S403: The rescue terminal sends a synchronization frame.

For details of steps S402 and S403, refer to the related descriptions of the steps S302 and S303. Details are not described herein again.

S404: In duration $T_2$, the rescue terminal performs continuous interception for duration $T_1$.

When the rescue terminal enters a working cycle when the dormant state ends, in one complete search and rescue working cycle with the duration $T_0$, the rescue terminal determines a time period with the duration $T_2$ in the cycle as a time period with the duration $T_1$, and continuously intercepts a signal in an environment in the time period with the duration $T_1$. Here, $T_2$ may be any duration, for example, 512 ms. Here, $T_1$ may be any duration shorter than $T_2$, for example, 64 ms. For a specific process, refer to the related descriptions of (D) in FIG. 4.

S405: The rescue terminal determines whether a signal sent by another device is received.

S406: The rescue terminal determines whether continuous interception is performed for the duration $T_1$.

The rescue terminal intercepts the signal in the above duration $T_1$. In the duration $T_1$, when the rescue terminal intercepts a signal frame sent by a help-seeking terminal (where the signal frame may be an emergency rescue link establishment request frame sent by the help-seeking terminal or an access request signal returned by the help-seeking terminal after receiving the synchronization frame sent by the rescue terminal), the rescue terminal may then perform a subsequent step S407. If a time period corresponding to the duration $T_1$ ends, when the rescue terminal fails to successfully establish a link with the another help-seeking terminal, the rescue terminal will perform a subsequent step S409.

S407: The rescue terminal selects a corresponding manner to access a channel based on a frame format of the received signal.

With reference to the above descriptions, it can be seen that the signal that is sent by the help-seeking terminal and that is received by the rescue terminal in the basic rescue mode includes an emergency rescue link establishment request frame or a response frame returned by the help-seeking terminal after receiving the synchronization frame sent by the rescue terminal. The help-seeking terminal may adopt a corresponding link establishment manner to establish the link with the rescue terminal based on the frame format of the received signal.

For details, refer to the foregoing related descriptions of FIG. 6 and FIG. 8. Details are not described herein again.

In addition, in an actual rescue process, there are likely to be other trapped persons in the environment, so there are also likely to be emergency rescue link establishment request frames sent by other rescue terminals in the environment. Although the rescue terminal may also receive the emergency rescue link establishment request frames sent by the other help-seeking terminals, the help-seeking terminal may also distinguish whether the emergency rescue link establishment request frame is sent by the other rescue terminals or the help-seeking terminal based on the frame format. When the emergency rescue link establishment request frame is sent by another terminal which is also a rescue terminal, the rescue terminal may ignore the emergency rescue link establishment request frame without processing the emergency rescue link establishment request frame.

S408: The rescue terminal determines whether the link is successfully established.

After receiving the signal sent by the help-seeking terminal and attempting to establish the link with the rescue terminal with the support of the signal, if the rescue terminal successfully establishes the link with the help-seeking terminal, the rescue terminal may perform a step S411. Alternatively, after the rescue terminal receives the signal sent by the help-seeking terminal, due to some other reasons (such as signal delay and interference between signals), if the link between the two terminals cannot be successfully established, and if the rescue terminal does not perform continuous interception for the duration $T_1$ at this time, before interception duration has not reached the above duration $T_1$, the rescue terminal will continuously alternately intercept the signal, and continue to work based on an execution flow of the aforementioned steps S402 to S408.

S409: The rescue terminal tries again for the duration $T_2$, and in the duration $T_2$, the rescue terminal performs continuous interception again for the duration $T_1$.

After performing continuous interception for the duration $T_1$, the rescue terminal fails to establish the connection with another help-seeking terminal, the rescue terminal will try to perform interception again for the duration $T_1$ in a same time period corresponding to next duration $T_2$ at the end of a time period corresponding to first duration $T_2$. It should be understood that in this search and rescue working cycle which may include two slicing cycles with the duration $T_2$, the above steps S402 to S406 are all completed in a first slicing cycle. When the rescue terminal fails to establish the connection with the another help-seeking terminal in the first slicing cycle, the reason why the link cannot be successfully established may be that the surrounding rescue terminal in the basic rescue mode is just in a dormant period when the terminal in the low power consumption help-seeking mode intercepts a signal. Therefore, because in the second slicing cycle, the help-seeking terminal in the low power consumption help-seeking mode will offset its operation backward for one segment of duration, namely, the aforementioned duration $T_1$, the rescue terminal may successfully establish the link with the help-seeking terminal in the low power consumption rescue mode in a second slicing cycle of a subsequent search and rescue working cycle after several cycles. For details, refer to the foregoing related descriptions of FIG. 8. Details are not described herein again.

S410: The rescue terminal determines whether the link is successfully established.

After the second slicing cycle with the duration $T_1$ ends, that is, after the rescue terminal performs continuous interception again for the duration $T_1$, if the rescue terminal fails to establish the connection with the another help-seeking terminal, it means that rescue personnel may not approach the trapped person, and then the help-seeking terminal will perform a step S412. If the rescue terminal successfully establishes the link with the help-seeking terminal in the second slicing cycle, the rescue terminal may perform a step S411.

S411: The rescue terminal receives information sent by the help-seeking terminal.

If the rescue terminal successfully establishes the connection with the help-seeking terminal in the first slicing cycle (the first duration $T_1$) or the second slicing cycle (the second duration $T_1$), the rescue terminal may receive help-seeking information sent by the rescue terminal. For details, refer to the foregoing related descriptions of the step S109. Details are not described herein again.

S412: The rescue terminal is in the dormant state until a next cycle starts.

After the second slicing cycle with the duration $T_2$ ends, if the rescue terminal fails to establish the connection with the another help-seeking terminal, it means that rescue personnel may not approach the trapped person, and the rescue terminal may be in the dormant state. For example, as shown in (D) in FIG. 4, the rescue terminal will be in the dormant period for duration $(T_0-2T_2)$ until a next search and rescue working cycle starts.

Next, an embodiment of this application provides a search and rescue system including a help-seeking terminal 1301 and a rescue terminal 1302. The help-seeking terminal 1301 may be the aforementioned electronic device 100; and the rescue terminal 1302 may be the aforementioned electronic device 200. In a search and rescue process, the help-seeking terminal 1301 may work in a strong help-seeking mode or a low power consumption help-seeking mode; and the rescue terminal 1302 may work in a strong rescue mode or a basic rescue mode. When the help-seeking terminal 1301 and the rescue terminal 1302 work in different mode combinations, a process of link establishment between the two terminals may be completed by one or more of link establishment manners shown in (A), (B), and (C) in FIG. 13.

Figure 13:
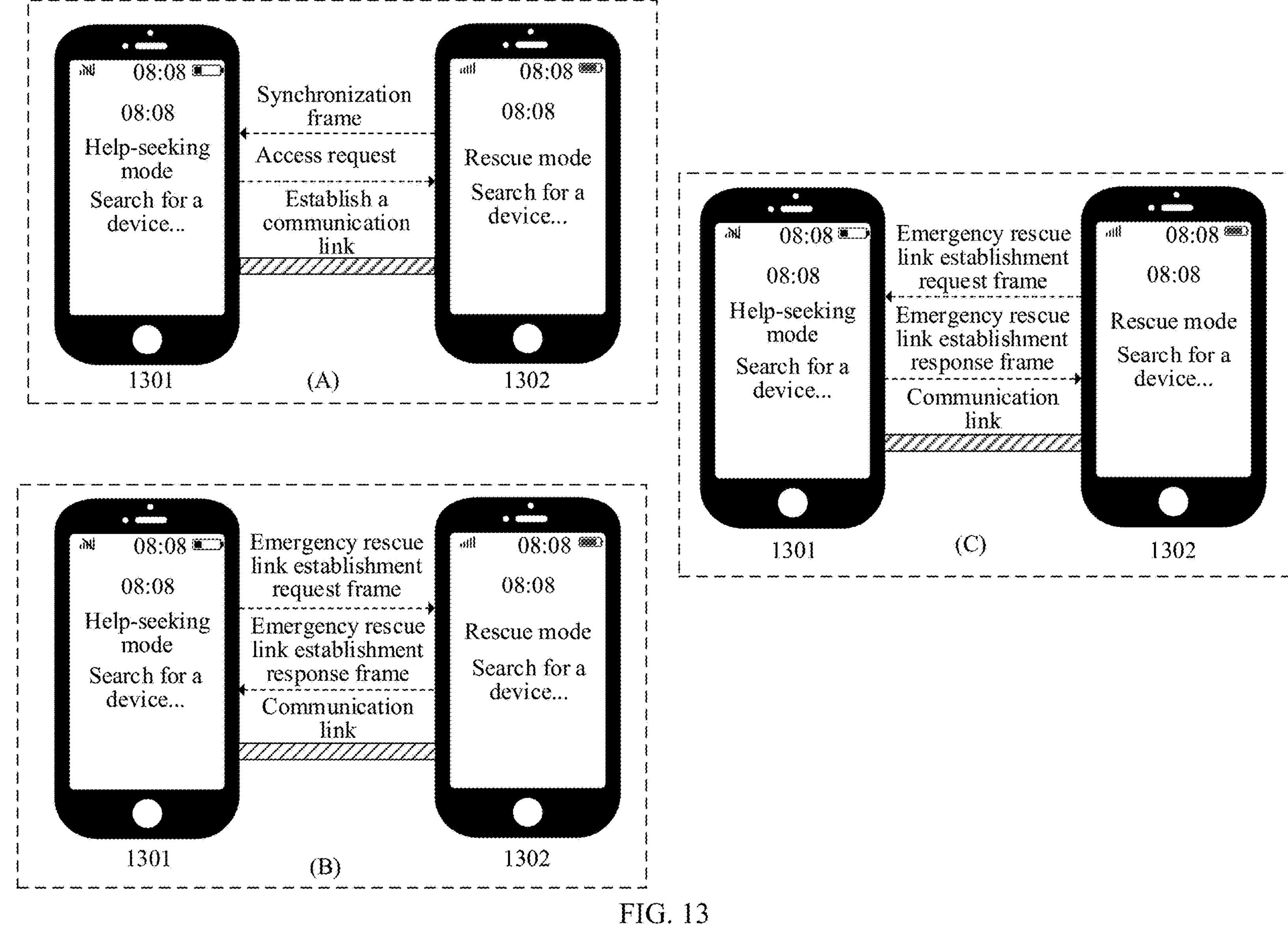
FIG. 13 is a schematic diagram of a manner of establishing a link between two terminals in a search and rescue system according to an embodiment of this application.

In (A) in FIG. 13, after receiving a synchronization frame sent by the rescue terminal, the help-seeking terminal 1301 sends an access request on a random access channel indicated by the synchronization frame. An open system authentication mode is adopted between the help-seeking terminal 1301 and the rescue terminal 1302, includes two steps of open system access request (Msg1) and access response (Msg2), and does not need authentication.

In (C) in FIG. 13, after receiving an emergency rescue link establishment request frame sent by the rescue terminal 1302, the help-seeking terminal 1301 reads a timestamp (timestamp) indicated by the rescue terminal from the emergency rescue link establishment request frame and returns an emergency rescue link establishment response frame to the rescue terminal 1302. After receiving the emergency rescue link establishment response frame, the rescue terminal 1302 performs interception on all access channels and emergency rescue channels thereafter. The help-seeking terminal 1301 calculates positions of the access channel and the rescue channel based on the timestamp, and initiates random access on the access channel and the rescue channel to complete link establishment. In this manner, an open system authentication mode may be adopted for the random access, includes two steps: open system access request (Msg1) and access response (Msg2), and does not need authentication.

In (B) in FIG. 13, after receiving an emergency rescue link establishment request frame sent by the help-seeking terminal 1301, the rescue terminal 1302 returns an emergency rescue link establishment response frame, and a timestamp is included in the emergency rescue link establishment response frame. After receiving the emergency rescue link establishment request frame, the rescue terminal 1302 performs interception on all access channels and emergency rescue channels thereafter. The help-seeking terminal 1301 calculates positions of the access channel and the rescue channel based on the timestamp, and initiates random access on the access channel and the rescue channel to complete link establishment. In this manner, an open system authentication mode may be adopted for the random access, includes two steps: open system access request (Msg1) and access response (Msg2), and does not need authentication.

When the help-seeking terminal 1301 is a strong help-seeking terminal and the rescue terminal 1302 is a strong rescue terminal, the process of link establishment between the two terminals may be completed in manners shown in (A), (B), and (C) in FIG. 13.

When the help-seeking terminal 1301 is a strong help-seeking terminal and the rescue terminal 1302 is a basic rescue terminal, the process of link establishment between the two terminals may be completed in manners shown in (A) and (B) in FIG. 13.

When the help-seeking terminal 1301 is a low power consumption help-seeking terminal and the rescue terminal 1302 is a strong rescue terminal, the process of link establishment between the two terminals may be completed in manners shown in (A) and (C) in FIG. 13.

When the help-seeking terminal 1301 is a low power consumption help-seeking terminal and the rescue terminal 1302 is a basic rescue terminal, the process of link establishment between the two terminals may be completed in the manner shown in (A) in FIG. 13.

For specific processes and steps of the help-seeking terminal 1301 and the rescue terminal 1302 adopting different mode combinations and adopting a corresponding link establishment manner in a given mode combination, refer to the foregoing related descriptions. Details are not described herein again.

An embodiment of this application further provides an electronic device. The electronic device includes: one or more processors and a memory, where the memory is coupled to the one or more processors, the memory is configured to store computer program code, the computer program code includes computer instructions, and the one or more processors invoke the computer instructions to enable the electronic device to perform the methods shown in the foregoing embodiments.

As used in the foregoing embodiments, based on the context, the term "when" may be interpreted as a meaning of "if", "after", "in response to determining . . . ", or "in response to detecting . . . ". Similarly, based on the context, the phrase "when determining" or "if detecting (a stated condition or event)" may be interpreted as a meaning of "if determining . . . ", "in response to determining . . . ", "when detecting (the stated condition or event)", or "in response to detecting . . . (the stated condition or event)".

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device like a server or a data center in which one or more usable mediums are integrated. The usable medium may be a magnetic medium (for example, a soft disk, a hard disk, or a magnetic tape), an optical medium (for example, a DVD), a semiconductor medium (for example, a solid state drive), or the like.

A person of ordinary skill in the art may understand that all or some of the procedures in the methods in embodiments may be implemented by using a computer program instructing relevant hardware. The program may be stored in the computer-readable storage medium. When the program is executed, the procedures in the foregoing method embodiments may be included. The storage medium includes: any medium that can store program code, for example, a ROM, a random storage memory RAM, a magnetic disk, or an optical disc.

The invention claimed is:

1. A communication method, wherein the method is applied to a first terminal, the method comprising:

receiving an operation instruction of a user to determine and start a help-seeking mode of the first terminal, wherein the help-seeking mode comprises a low power consumption help-seeking mode and a strong help-seeking mode; and establishing, by the first terminal, a first network link with a second terminal, wherein the second terminal is in a basic rescue mode or a strong rescue mode; in same working duration, power consumption of the first terminal working in the low power consumption help-seeking mode is less than power consumption of the first terminal working in the strong help-seeking mode; and power consumption of the second terminal working in the basic rescue mode is less than power consumption of the second terminal working in the strong rescue mode.

2. The method according to claim 1, further comprising alternately sending, by the first terminal when the first terminal is in the strong help-seeking mode in a cycle of first duration, a first signal and intercepting a second signal sent by the second terminal, wherein at least two groups of operations of alternately performing interception and sending by the first terminal are comprised in each cycle, there is second duration between the two groups of operations of alternately performing interception and sending by the first terminal, wherein the second duration is less than a sum of duration required for the first terminal to send the first signal and duration required for the first terminal to intercept the second signal, and the first signal and the second signal are used for establishing the first network link with the second terminal; or when the first terminal is in the low power consumption help-seeking mode, intercepting, by the first terminal, whether the second signal sent by the second terminal exists in an environment, wherein duration of the interception performed by the first terminal is third duration; and if the first terminal intercepts no second signal, intercepting again, by the first terminal, whether the second signal exists in the environment at an interval of fourth duration with an offset of fifth duration at the end of the interception, until the first terminal intercepts the second signal.

3. The method according to claim 1, wherein the establishing, by the first terminal, a first network link with a second terminal comprises:

after intercepting the second signal sent by the second terminal in the strong rescue mode, returning, by the first terminal, a response signal to the second terminal; and when the second terminal accesses a channel under an indication of the response signal, establishing, by the first terminal, the first network link with the second terminal, wherein the second signal is a second request signal for requesting the establishment of the first network link with the first terminal; or after intercepting the second signal sent by the second terminal, sending, by the first terminal, an access request to the second terminal in a channel indicated by the second signal; and after the second terminal responds to the access request, establishing, by the first terminal, the first network link with the second terminal, wherein the second signal is a synchronization signal sent by the second terminal; or after the first signal sent by the first terminal in the strong help-seeking mode is intercepted by the second terminal, accessing, by the first terminal, a channel under an indication of a response signal returned by the second terminal, and establishing, by the first terminal, the first network link with the second terminal, wherein the first signal is a first request signal that is sent by the first terminal and is used to request for the establishment of the first network link with the second terminal.

4. The method according to claim 2 or 3, wherein the sending, by the first terminal when the first terminal is in the strong help-seeking mode in a cycle of first duration, a first signal and intercepting a second signal sent by the second terminal comprises: in a corresponding first time period in each cycle, continuously alternately sending, by the first terminal, the first signal and intercepting the second signal for sixth duration; and if the first terminal fails to intercept the second signal in the first time period, and the second terminal fails to receive the first signal in the first time period, entering, by the first terminal, a dormant state at the end of the first time period, and after the second duration, continuously alternately sending, by the first terminal, the first signal and intercepting the second signal in a corresponding second time period of each cycle for seventh duration; and the intercepting again, by the first terminal when the first terminal is in the low power consumption help-seeking mode, whether the second signal exists in the environment at an interval of fourth duration with an offset of fifth duration at the end of the interception comprises: entering, by the first terminal, the dormant state at the end of the interception; and after the fourth duration and the fifth duration, waking up, by the first terminal, from the dormant state and intercepting again whether the second signal exists in the environment, wherein duration of the first terminal performing the interception is the third duration.

5. The method according to claim 4, wherein the sixth duration is equal to the seventh duration, and/or eighth duration is twice the seventh duration; and the eighth duration is a sum of duration required for the first terminal to send the first signal and intercept the second signal in the strong help-seeking mode.

6. The method according to claim 5, wherein the third duration is equal to the fifth duration, and/or the third duration is equal to the eighth duration.

7. A communication method, wherein the method is applied to a second terminal, the method comprising:

receiving an operation instruction of a user to determine and start a rescue mode of the second terminal, wherein the rescue mode comprises a basic rescue mode and a strong rescue mode; and establishing, by the second terminal, a first network link with a first terminal, wherein the first terminal is in a low power consumption help-seeking mode or a strong help-seeking mode; and under same working duration, power consumption of the second terminal working in the basic rescue mode is less than power consumption of the second terminal working in the strong rescue mode, and power consumption of the first terminal working in the low power consumption help-seeking mode is less than power consumption of the first terminal working in the strong help-seeking mode.

8. The method according to claim 7, wherein when the second terminal is in the strong rescue mode, alternately sending, by the second terminal, a second signal and intercepting a first signal in a cycle of first duration, wherein duration of the second terminal alternately sending the second signal and intercepting the first signal within each cycle is ninth duration; and the second signal comprises a second request signal and a synchronization signal; if the second terminal fails to intercept the first signal and the second signal is not intercepted by the first terminal in a corresponding time period, sleeping, by the second terminal, for tenth duration until the end of the current cycle, and alternately sending the second signal and intercepting the first signal again until the second terminal intercepts the first signal or the second signal is intercepted by the first terminal, wherein the second request signal is a signal that is sent by the second terminal and is used to request for the establishment of the first network link with the first terminal; and the first signal is a first request signal that is sent by the first terminal and is used to request for the establishment of the first network link with the second terminal; or when the second terminal is in the basic rescue mode, intercepting, by the second terminal, the first signal in a cycle of the first duration, wherein each cycle comprises at least one time period for the second terminal to intercept the first signal; and if the second terminal fails to intercept the first signal in the corresponding time period, sleeping, by the second terminal, for the tenth duration until the end of the current cycle, and intercepting the first signal again until the second terminal intercepts the first signal.

9. The method according to claim 7, wherein the second terminal is an on-line device, when the second terminal is in the basic rescue mode, the second terminal also sends the synchronization signal in the cycle of the first duration, and each cycle comprises at least one time period for the second terminal to send the synchronization signal.

10. The method according to claim 9, wherein establishing, by the second terminal, a first network link with a first terminal comprises:

after intercepting the first request signal sent by the first terminal in the strong help-seeking mode, returning, by the second terminal, a response signal to the first terminal; and when the first terminal accesses a channel under an indication of the response signal, establishing, by the second terminal, the first network link with the first terminal; or after intercepting the synchronization signal sent by the second terminal, sending, by the first terminal, an access request to the second terminal in a channel indicated by the synchronization signal; and after the second terminal responds to the access request, establishing, by the second terminal, the first network link with the first terminal; or after the second request signal sent by the second terminal in the strong rescue mode is intercepted by the first terminal, accessing, by the second terminal, a channel under an indication of a response signal returned by the first terminal, and establishing, by the second terminal, the first network link with the first terminal.

11. The method according to claim 7, wherein the tenth duration is greater than the ninth duration.

12. A communication system, wherein the communication system comprises a first terminal and a second terminal, wherein when a first trigger condition is met, the first terminal and the second terminal establish a first network link, wherein the first trigger condition is one of the following conditions:

the first terminal is in a strong help-seeking mode and the second terminal is in a strong rescue mode;

the first terminal is in a strong help-seeking mode and the second terminal is in a basic rescue mode;

the first terminal is in a low power consumption help-seeking mode and the second terminal is in a strong rescue mode;

the first terminal is in a low power consumption help-seeking mode and the second terminal is in a basic rescue mode; or under same working duration, power consumption of the second terminal working in the basic rescue mode is less than power consumption of the second terminal working in the strong rescue mode, and power consumption of the first terminal working in the low power consumption help-seeking mode is less than power consumption of the first terminal working in the strong help-seeking mode.

13. The system according to claim 12, wherein when the first terminal is in the strong help-seeking mode, the first terminal alternately sends a first signal and intercepts a second signal sent by the second terminal in a cycle of first duration, wherein at least two groups of operations of alternately performing interception and sending by the first terminal are comprised in each cycle, there is second duration between the two groups of operations of alternately performing interception and sending by the first terminal, wherein the second duration is less than a sum of duration required for the first terminal to send the first signal and duration required for the first terminal to intercept the second signal, and the first signal and the second signal are used for establishing the network link with the second terminal; or when the first terminal is in the low power consumption help-seeking mode, the first terminal intercepts whether the second signal sent by the second terminal exists in an environment, wherein duration of the interception performed by the first terminal is third duration; if the first terminal intercepts no second signal, the first terminal intercepts again whether the second signal exists in the environment at an interval of fourth duration with an offset of fifth duration at the end of the interception, until the first terminal intercepts the second signal; and when the second terminal is in the strong rescue mode, the second terminal alternately sends the second signal and intercepts the first signal in the cycle of the first duration, wherein duration of the second terminal alternately sending the second signal and intercepting the first signal within each cycle is ninth duration; and the second signal comprises a second request signal and a synchronization signal; if the second terminal fails to intercept the first signal and the second signal is not intercepted by the first terminal in a corresponding time period, the second terminal sleeps for tenth duration until the end of the current cycle, and alternately sends the second signal and intercepts the first signal again until the second terminal intercepts the first signal or the second signal is intercepted by the first terminal, wherein the second request signal is a signal that is sent by the second terminal and is used to request for the establishment of the first network link with the first terminal; and the first signal is a first request signal that is sent by the first terminal and is used to request for the establishment of the first network link with the second terminal; or when the second terminal is in the basic rescue mode, the second terminal intercepts the first signal in a cycle of the first duration, wherein each cycle comprises at least one time period for the second terminal to intercept the first signal; and if the second terminal fails to intercept the first signal in the corresponding time period, the second terminal sleeps for the tenth duration until the end of the current cycle, and intercepts the first signal again until the second terminal intercepts the first signal.

14. The system according to claim 12 or 13, wherein that the first terminal and the second terminal establish a first network link comprises:

the second terminal in the strong rescue mode sends the second signal, and the first terminal in the low power consumption help-seeking mode or the strong help-seeking mode returns a first response signal to the second terminal after intercepting the second signal; and after the second terminal accesses a channel under an indication of the first response signal, the first terminal establishes the first network link with the second terminal, wherein the second signal is a second request signal for requesting the establishment of the first network link with the first terminal; or the second terminal sends the second signal, and after intercepting the second signal, the the first terminal in the low power consumption help-seeking mode or the strong help-seeking modeing mode sends an access request to the second terminal in a channel indicated by the second signal; and after the second terminal responds to the access request, the second terminal establishes the first network link; or the second signal is a synchronization signal sent by the second terminal; or the first terminal in the strong help-seeking mode sends the first signal, the second terminal in the low power consumption rescue mode or the strong rescue mode returns a second response signal to the first terminal after intercepting the first signal, the first terminal accesses a channel under an indication of the second response signal, and the first terminal establishes the first network link with the second terminal, wherein the first signal is a first request signal that is sent by the first terminal and is used to request for the establishment of the first network link with the second terminal.

* * * * *